US006877709B2

(12) United States Patent
March et al.

(10) Patent No.: US 6,877,709 B2
(45) Date of Patent: Apr. 12, 2005

(54) INTERIOR REARVIEW MIRROR ASSEMBLY WITH POLYMERIC COMPONENTS

(75) Inventors: Phillip A. March, Holland, MI (US); Andrew D. Weller, Holland, MI (US); Timothy G. Skiver, Holland, MI (US); Mark R. Brummel, Zeeland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 74 days.

(21) Appl. No.: 10/032,401

(22) Filed: Dec. 20, 2001

(65) Prior Publication Data

US 2002/0088916 A1 Jul. 11, 2002

Related U.S. Application Data

(60) Provisional application No. 60/317,701, filed on Sep. 6, 2001, and provisional application No. 60/257,477, filed on Dec. 21, 2000.

(51) Int. Cl.$^7$ ............................................... F16M 13/00

(52) U.S. Cl. ...................................... 248/549; 362/494

(58) Field of Search ................................ 248/549, 481, 248/483, 484, 900, 222.11, 222.13, 223.31, 224.61, 288.51; 362/140, 142, 494; 269/75

(56) References Cited

U.S. PATENT DOCUMENTS

| 1,800,797 | A | 4/1931 | Hoople | |
|---|---|---|---|---|
| 1,857,095 | A | 5/1932 | Glowacki | |
| 2,414,223 | A | 1/1947 | Virgilis | 240/4.2 |
| 2,456,182 | A | 12/1948 | Goble | 285/92 |
| 2,763,188 | A | 9/1956 | Bertell | 88/98 |

(Continued)

FOREIGN PATENT DOCUMENTS

| DE | 2414075 | 3/1974 |
|---|---|---|
| DE | 2947512 A1 | 5/1981 |
| FR | 2210958 | 7/1974 |

(Continued)

OTHER PUBLICATIONS

U.S. Pat. Appln. Pub. No. US 2002/00003571 A1, published Jan. 10, 2002, entitled Video Mirror Systems Incorporating an Accessory Module (claims priority in part from U.S. Ser. Nos. 60/243,986; 60/243,483; 60/237,077; 60/234,412; 60/218,336; and 60/186,520).

Primary Examiner—Leslie A. Braun
Assistant Examiner—Tan Le
(74) Attorney, Agent, or Firm—Van Dyke, Gardner, Linn & Burkhart, LLP

(57) ABSTRACT

An interior rearview mirror assembly for vehicles incorporates a rearview mirror mount, a rearview mirror, and a rearview mirror support. The support is pivotally attached to the mirror mount by a first pivot element, and to the rearview mirror by a second pivot element. The mirror mount, support, a rearview mirror housing, and the pivot elements are each formed by molding from polymeric material having a respective color. In various embodiments, the colors may all be substantially the same, such as black, gray, tan, brown, burgundy, green, or another color, or may be different. In one form, the rearview mirror housing includes at least one electrical accessory. Electrical conductors may extend through the pivot elements and mirror support to the rearview mirror housing to provide an electrical connection for the electrical accessory to the vehicle electrical system. The pivot elements preferably include ball pivot members and sockets on various of the mirror mount, support and rearview mirror housing, and may include surfaces for enhanced frictional resistance to pivotal movement. In one form, the rearview mirror mount preferably includes receiving members which release the assembly from a windshield attachment member when sufficient force is applied such as upon impact.

105 Claims, 32 Drawing Sheets

U.S. PATENT DOCUMENTS

| | | | | |
|---|---|---|---|---|
| 2,856,815 | A | 10/1958 | Ross | 88/98 |
| 2,921,808 | A | 1/1960 | David | 287/12 |
| 3,022,096 | A | 2/1962 | Schwartz | 285/164 |
| 3,104,897 | A | 9/1963 | Berger | 285/166 |
| 3,131,251 | A | 4/1964 | Ryan | 88/98 |
| 3,367,616 | A | 2/1968 | Bausch et al. | 248/483 |
| 3,448,553 | A | 6/1969 | Herr et al. | 52/400 |
| 3,498,579 | A | 3/1970 | Vicary | 248/483 |
| 3,530,495 | A | 9/1970 | Kindle | 287/87 |
| 3,601,352 | A | 8/1971 | Jensen | 248/481 |
| 3,622,112 | A | 11/1971 | Stroh | 248/181 |
| 3,635,435 | A | 1/1972 | Perison, Sr. | 248/475 |
| 3,841,769 | A | 10/1974 | Bowerman | 403/9 |
| 3,928,894 | A | 12/1975 | Bury et al. | 24/73 |
| 4,254,931 | A | 3/1981 | Aikens et al. | 248/549 |
| 4,382,572 | A | 5/1983 | Thompson | 248/484 |
| 4,435,042 | A | 3/1984 | Wood et al. | 350/281 |
| 4,436,371 | A | 3/1984 | Wood et al. | 350/281 |
| 4,492,488 | A | 1/1985 | Warshawsky | 403/113 |
| 4,524,941 | A | 6/1985 | Wood et al. | 248/544 |
| 4,593,878 | A | 6/1986 | Stewart | 248/549 |
| 4,614,412 | A | 9/1986 | Cohen | 350/632 |
| 4,632,348 | A | 12/1986 | Keesling et al. | 248/222.1 |
| 4,646,210 | A | 2/1987 | Skogler et al. | 362/142 |
| 4,733,336 | A | 3/1988 | Skogler et al. | 362/142 |
| 4,807,096 | A | 2/1989 | Skogler et al. | 362/142 |
| 4,930,742 | A | 6/1990 | Schofield et al. | 248/475.1 |
| 4,936,533 | A | 6/1990 | Adams et al. | 248/222.1 |
| 4,948,085 | A | 8/1990 | Mittelhäuser | 248/549 |
| 5,058,851 | A | 10/1991 | Lawlor et al. | 248/549 |
| 5,100,095 | A | 3/1992 | Haan et al. | 248/549 |
| 5,308,247 | A | 5/1994 | Dyrdek | 439/34 |
| 5,330,149 | A | 7/1994 | Haan et al. | 248/549 |
| 5,377,948 | A | 1/1995 | Suman et al. | 248/549 |
| 5,377,949 | A | 1/1995 | Haan et al. | 248/549 |
| 5,439,305 | A | 8/1995 | Santo | 403/76 |
| 5,572,354 | A | 11/1996 | Desmond et al. | 359/265 |
| 5,576,687 | A | 11/1996 | Blank et al. | 340/438 |
| 5,615,857 | A * | 4/1997 | Hook | 248/549 |
| 5,813,745 | A * | 9/1998 | Fant, Jr. et al. | 362/494 |
| 5,820,097 | A | 10/1998 | Spooner | 248/549 |
| 5,820,245 | A * | 10/1998 | Desmond et al. | 362/494 |
| 5,877,897 | A | 3/1999 | Schofield et al. | 359/604 |
| 5,931,440 | A * | 8/1999 | Miller | 248/549 |
| 5,938,321 | A * | 8/1999 | Bos et al. | 362/494 |
| 5,984,482 | A | 11/1999 | Rumsey et al. | 359/871 |
| 6,087,953 | A | 7/2000 | DeLine et al. | 340/815.4 |
| 6,099,131 | A | 8/2000 | Fletcher et al. | 359/604 |
| 6,158,655 | A | 12/2000 | DeVries, Jr. et al. | 235/380 |
| 6,172,613 | B1 | 1/2001 | DeLine et al. | 340/815.4 |
| 6,202,976 | B1 | 3/2001 | Johnson et al. | 248/476 |
| 6,222,460 | B1 | 4/2001 | DeLine et al. | 340/815.4 |
| 6,243,003 | B1 | 6/2001 | DeLine et al. | 340/425.5 |
| 6,278,377 | B1 | 8/2001 | DeLine et al. | 340/815.4 |
| 6,313,454 | B1 | 11/2001 | Bos et al. | 250/208.1 |
| 6,318,870 | B1 | 11/2001 | Spooner et al. | 359/872 |
| 6,420,975 | B1 * | 7/2002 | DeLine et al. | 340/815.4 |

FOREIGN PATENT DOCUMENTS

| | | |
|---|---|---|
| FR | 2354219 | 6/1976 |
| GB | 1132384 | 10/1968 |
| GB | 2046687 | 11/1980 |
| GB | 2048803 | 12/1980 |
| WO | WO 9316900 | 9/1993 |

* cited by examiner

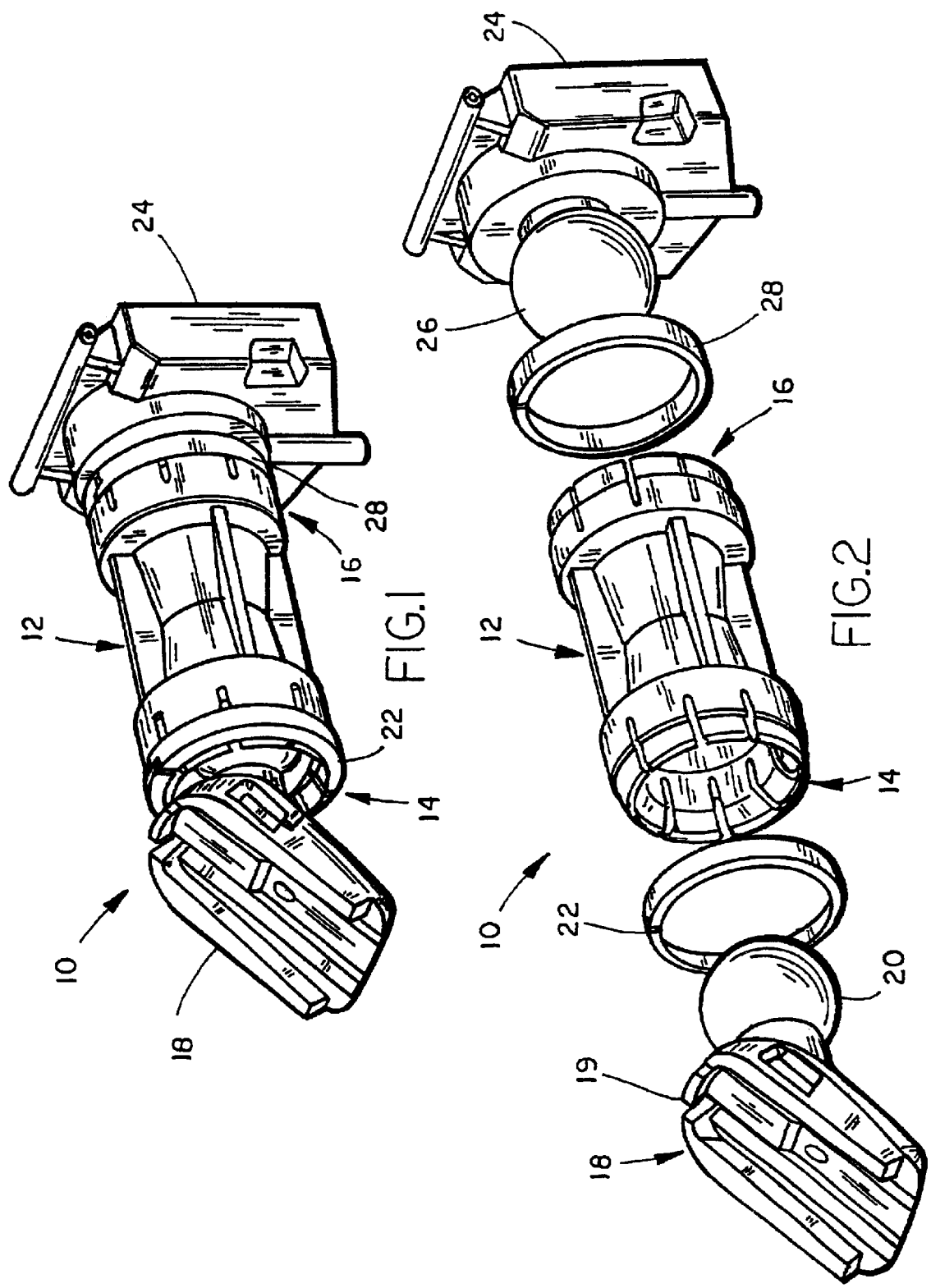

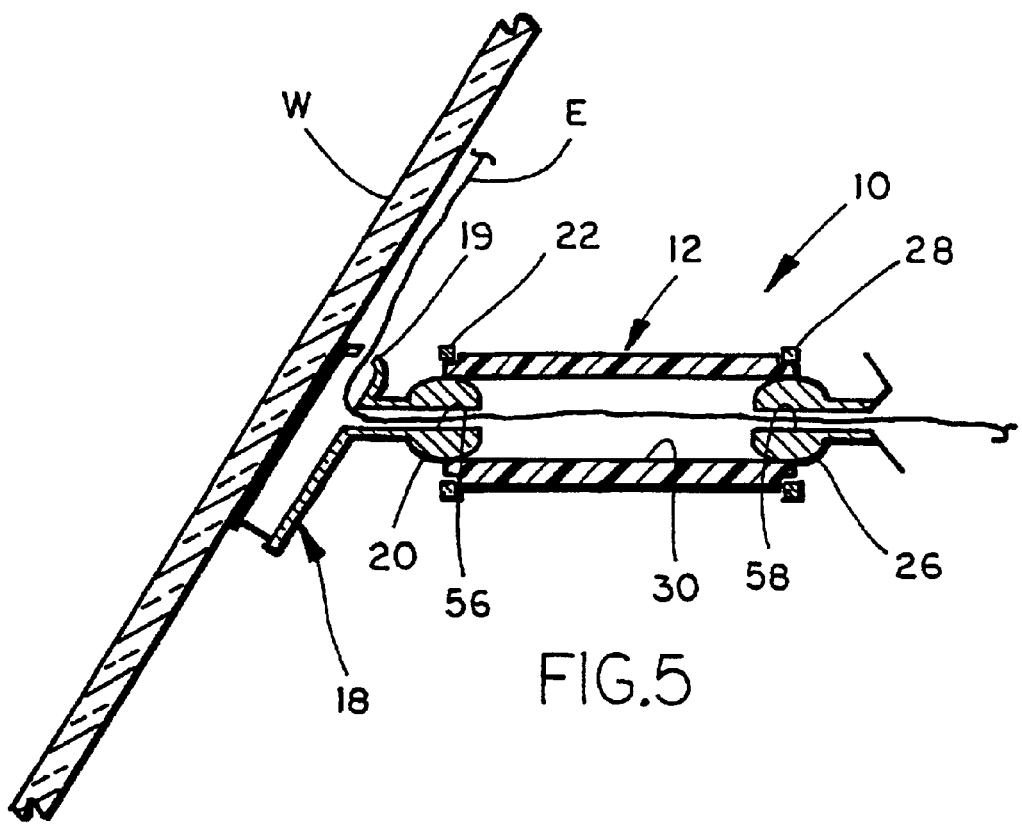
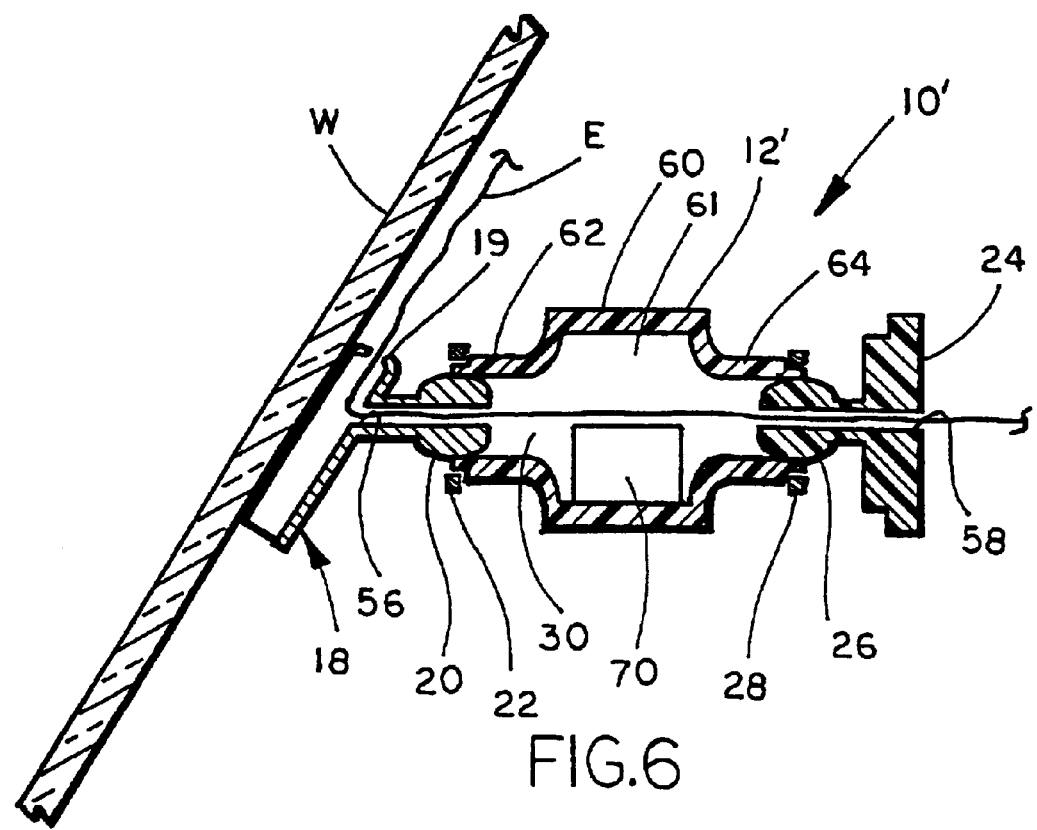

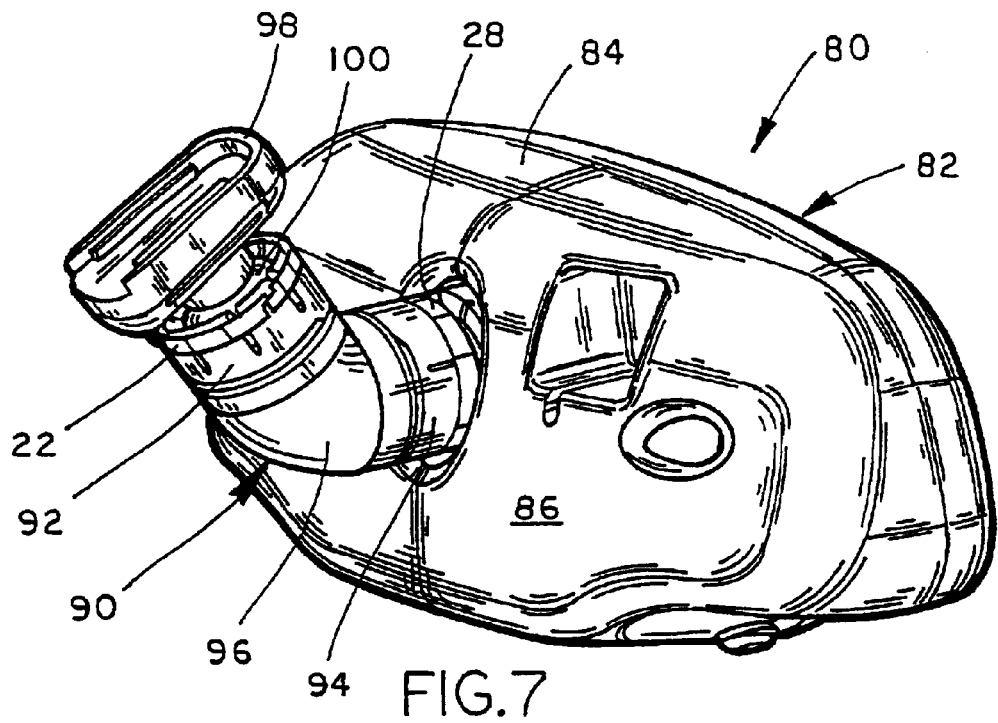
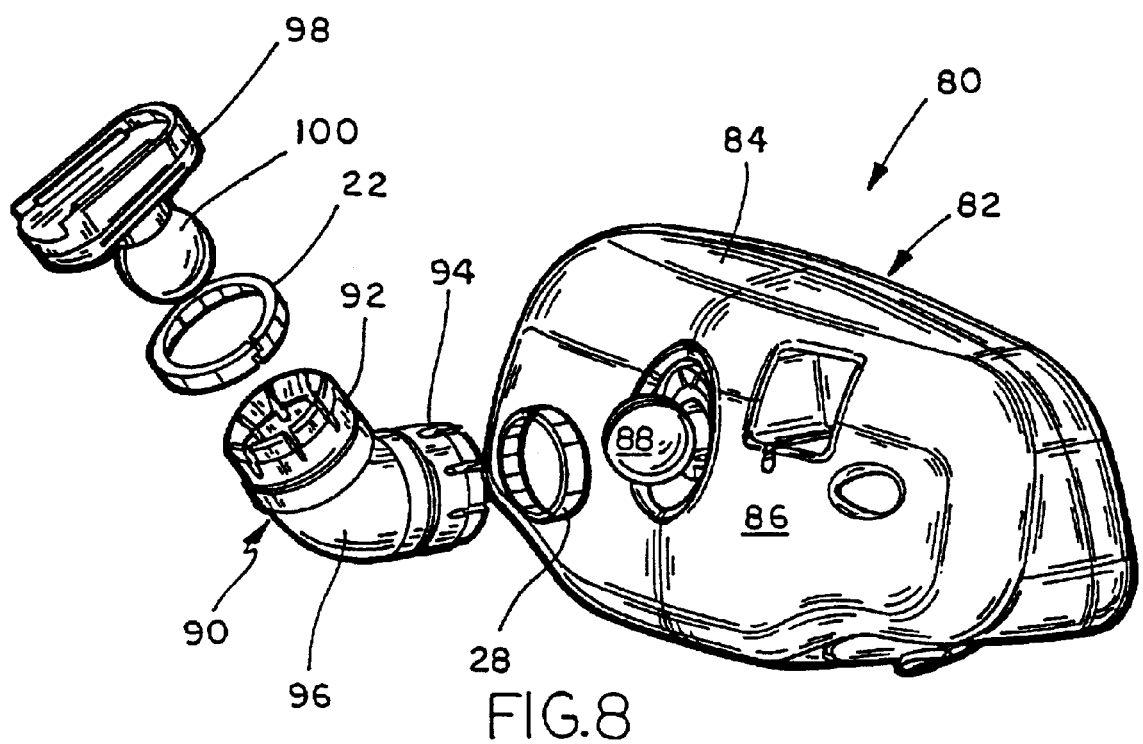

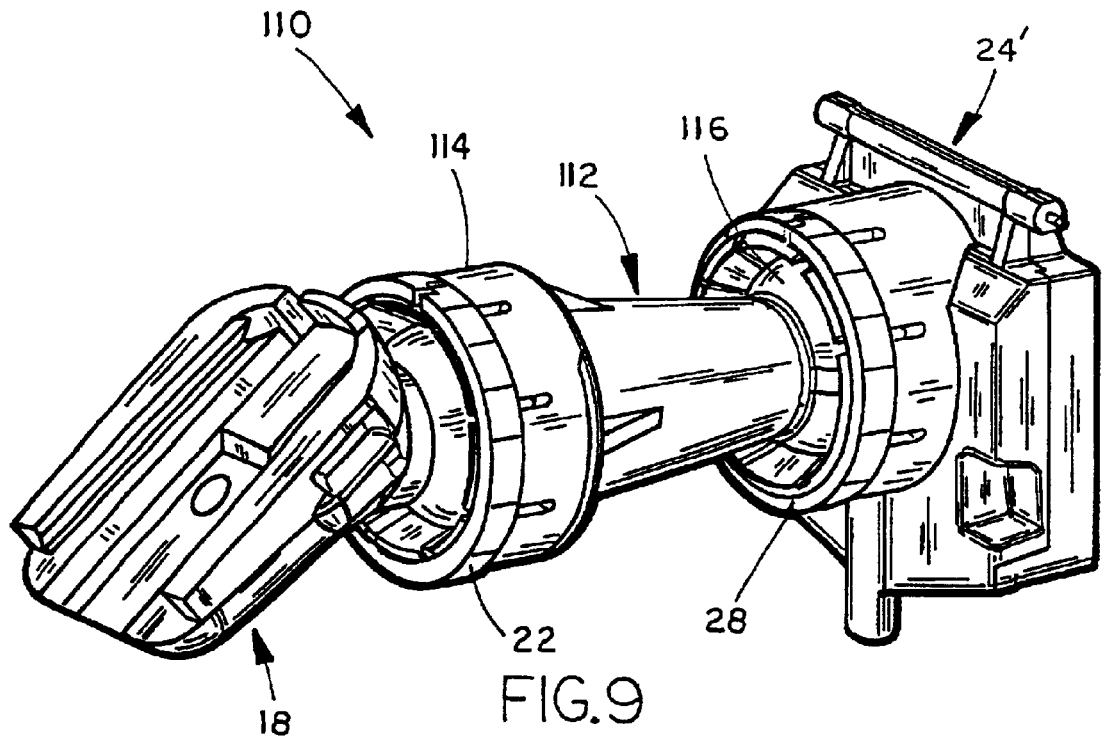
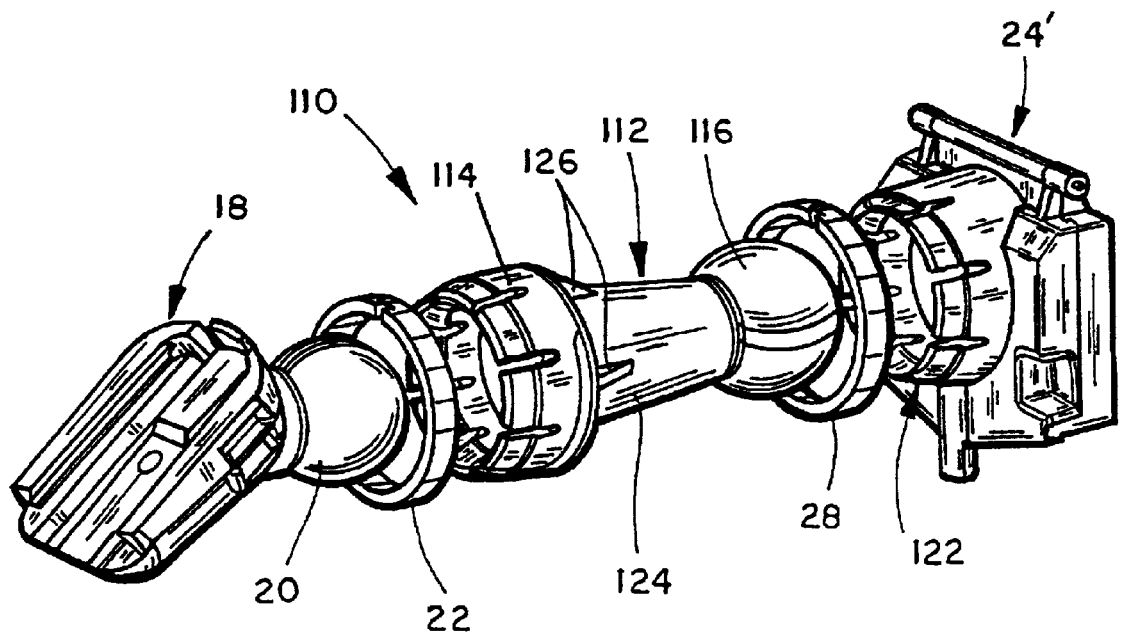

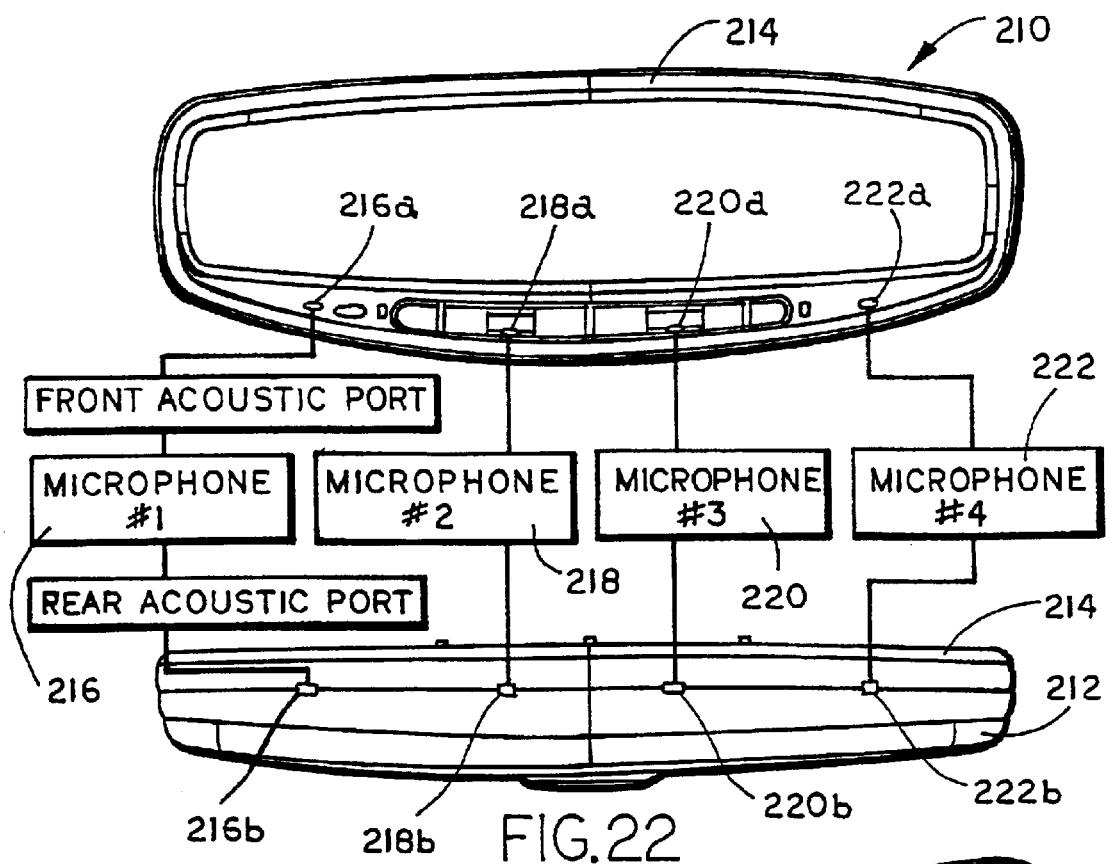
FIG. 22
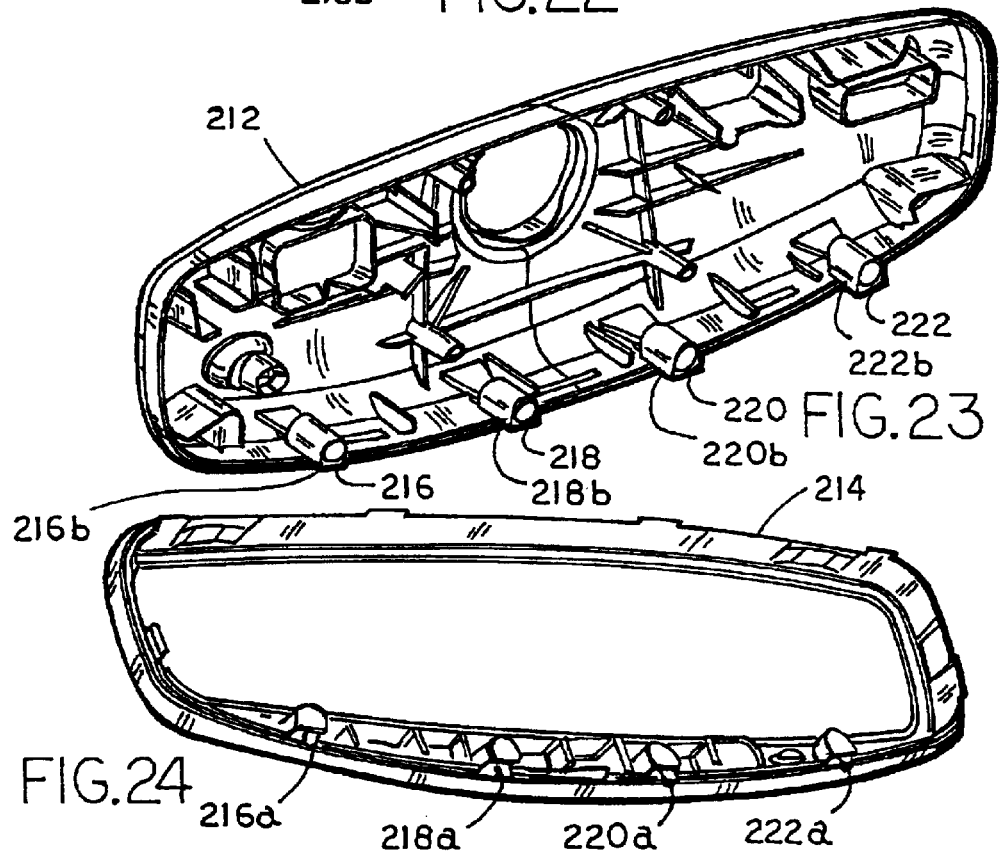
FIG. 23
FIG. 24

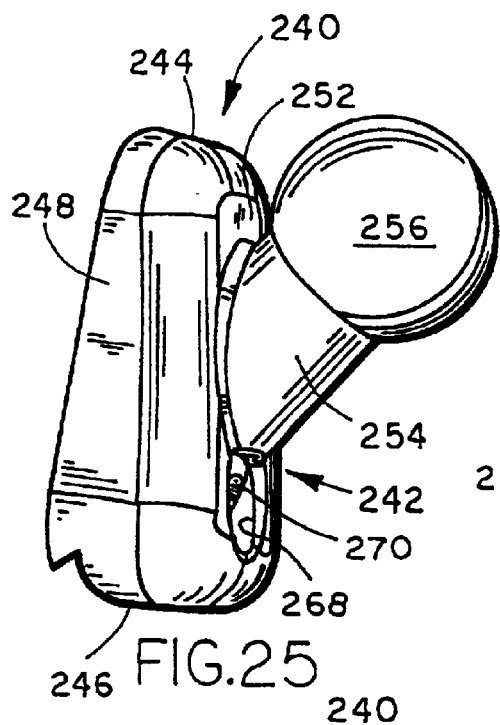
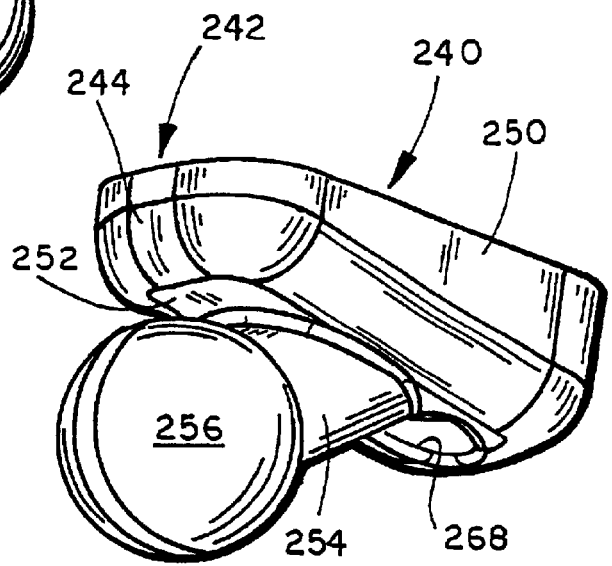
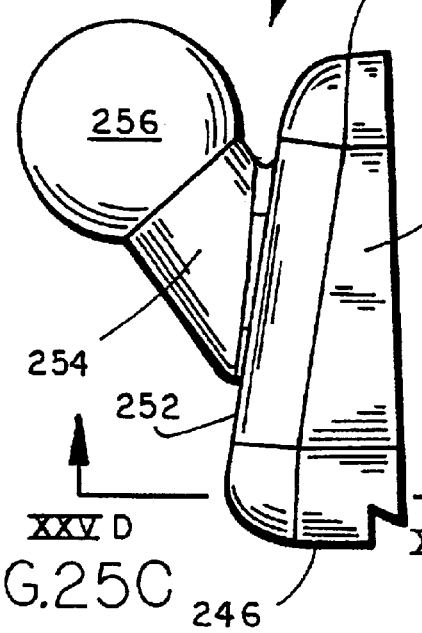
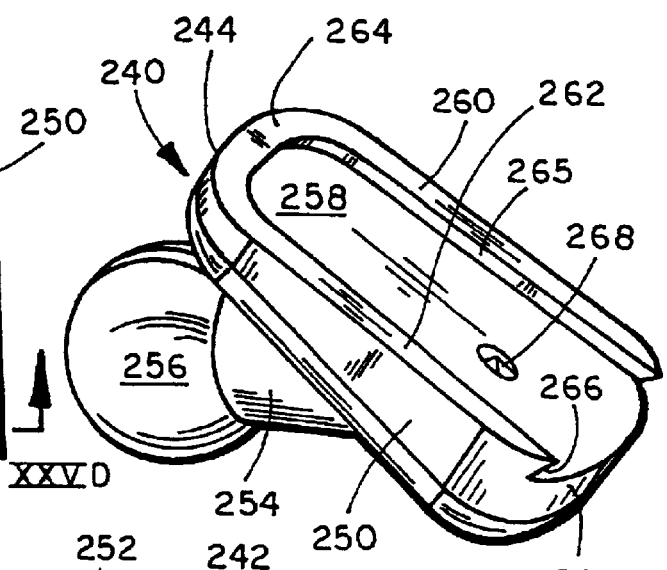
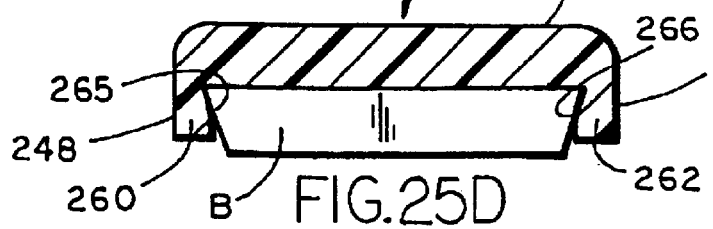

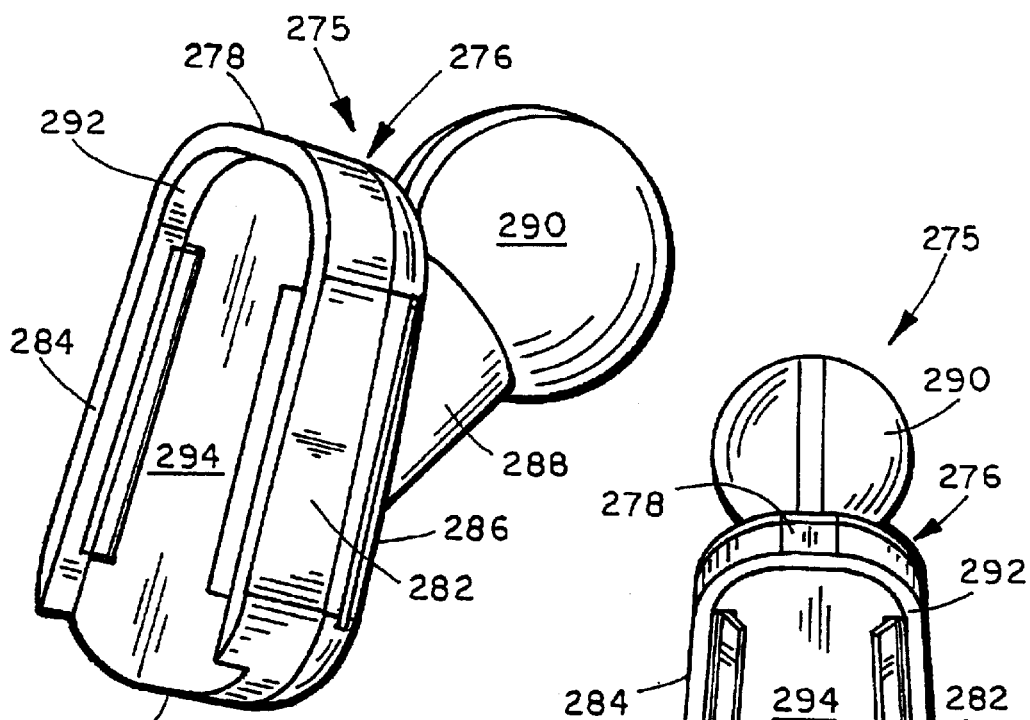
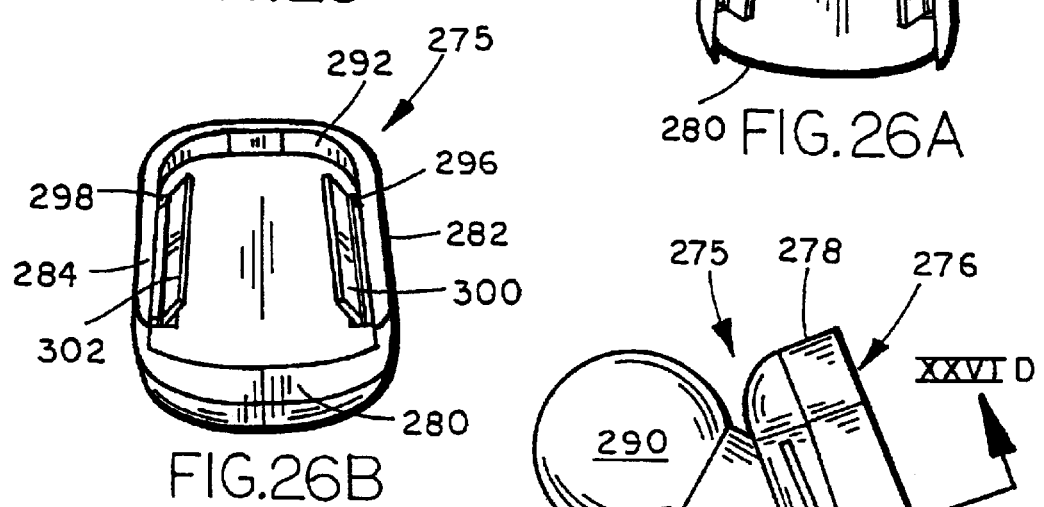
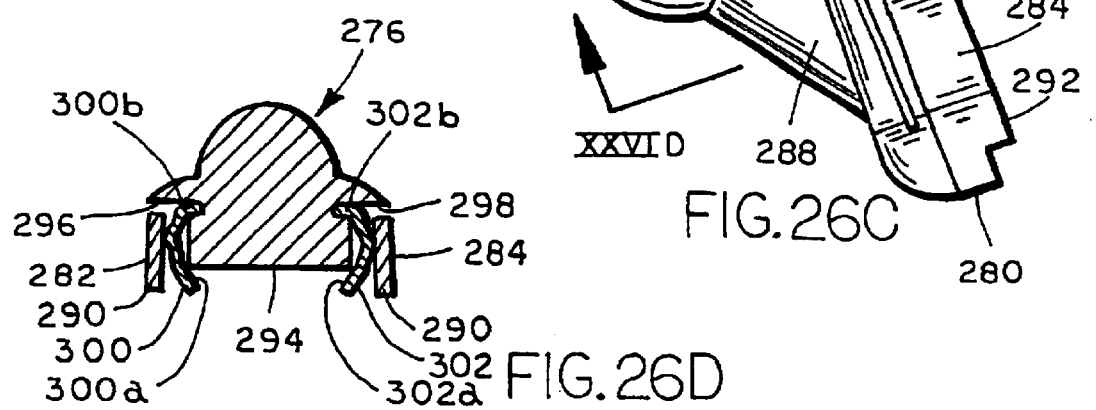

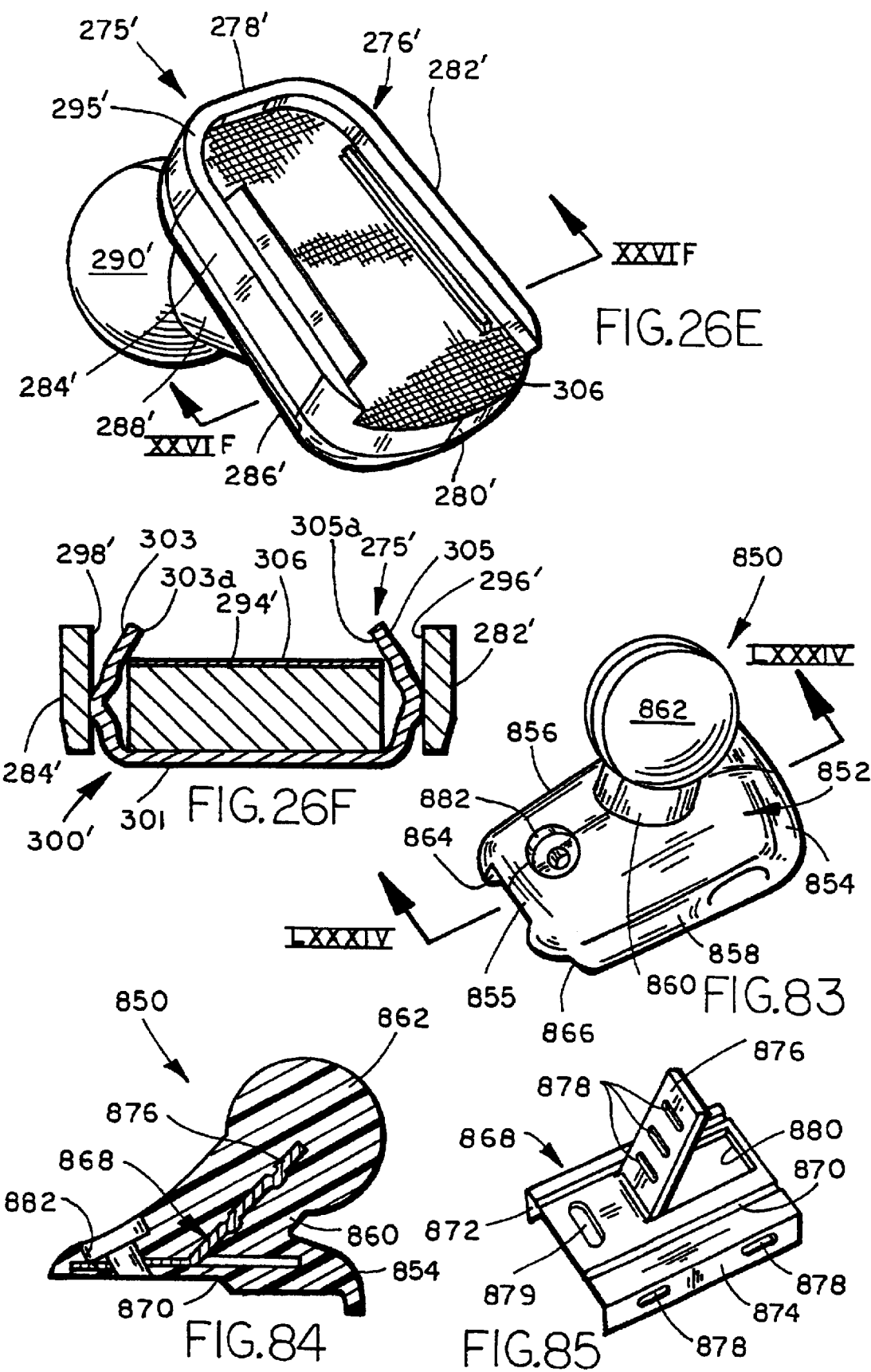

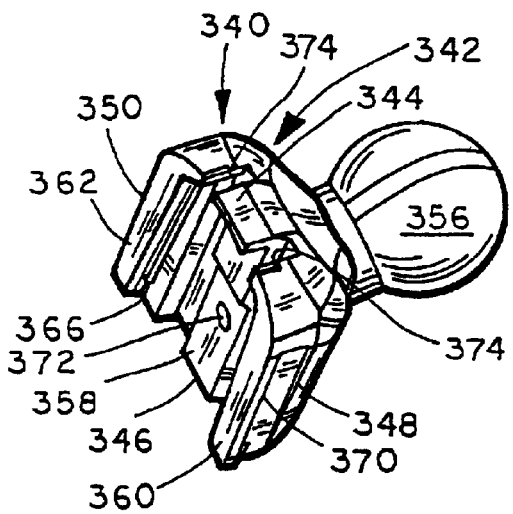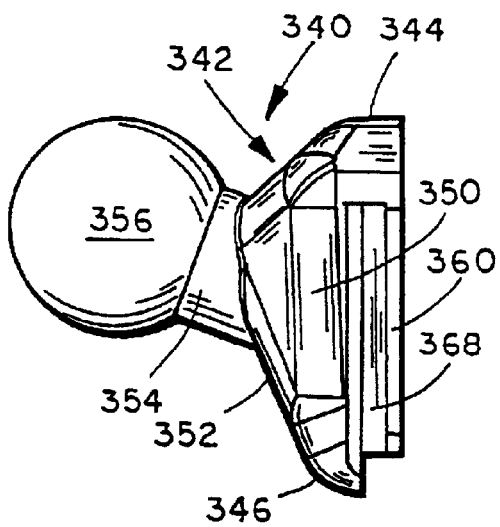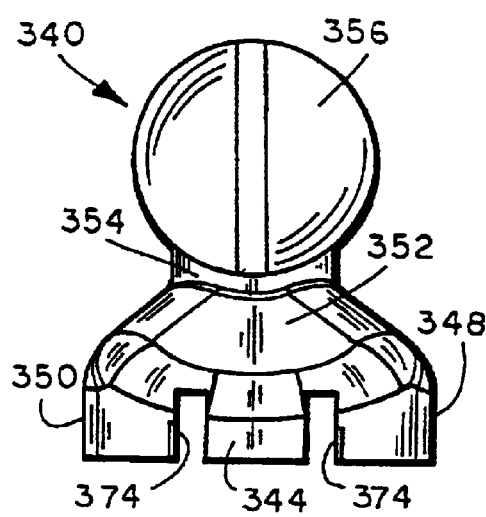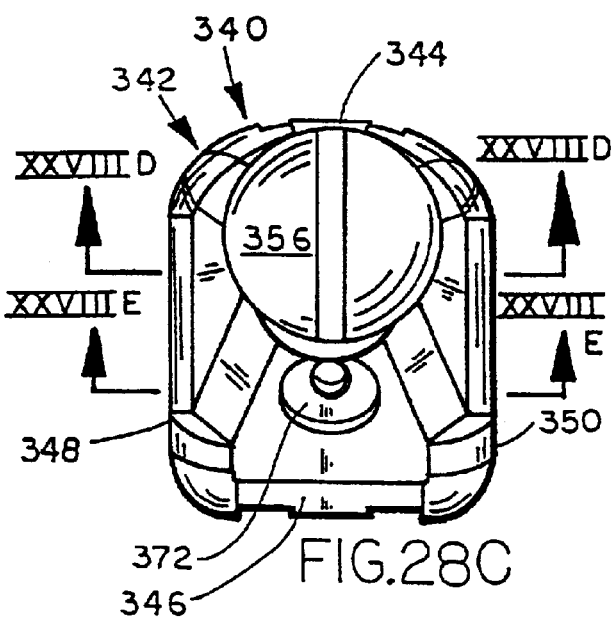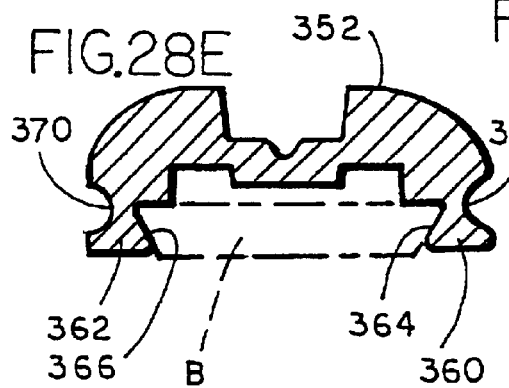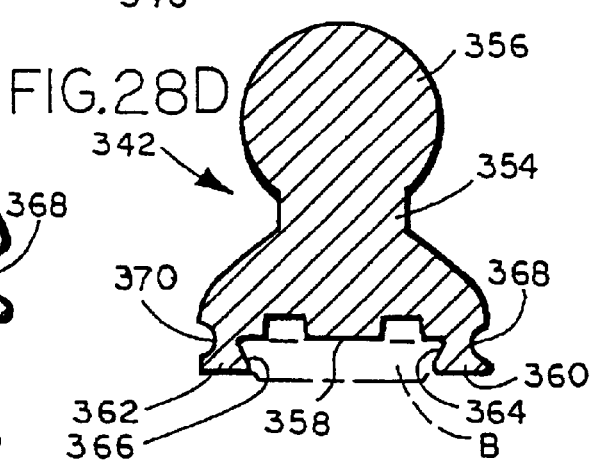

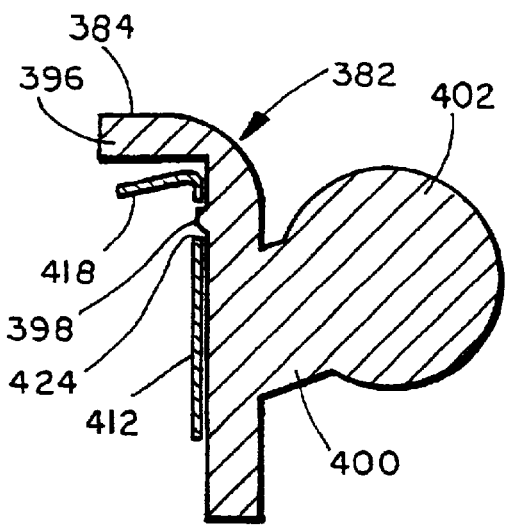 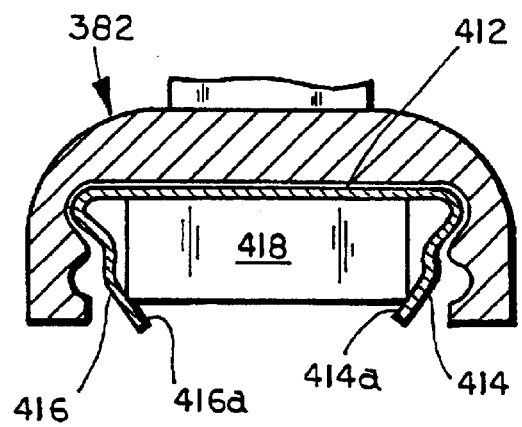 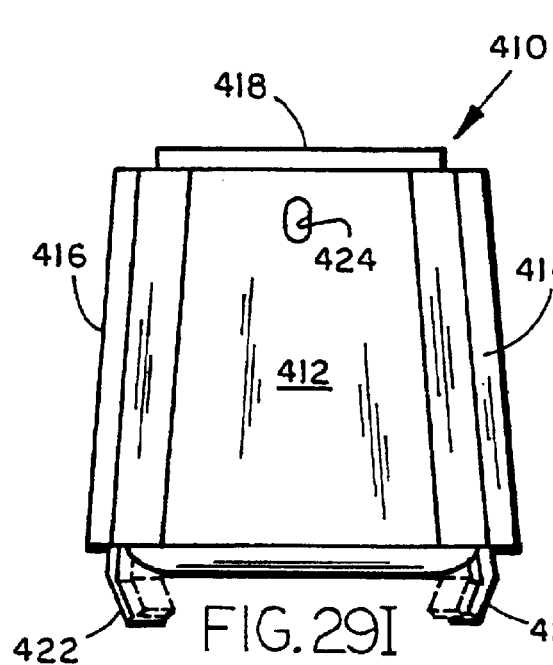 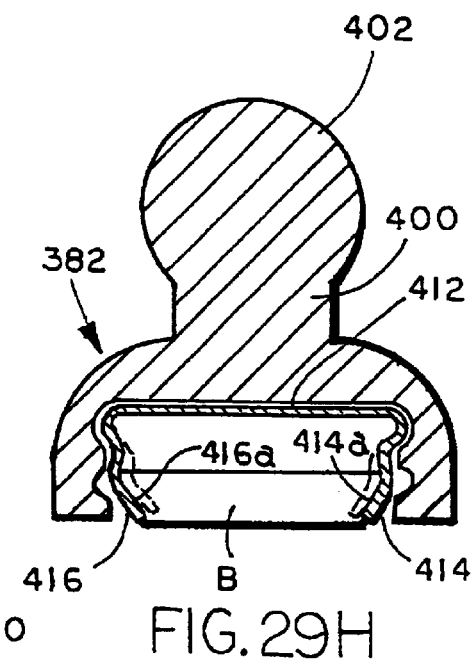
FIG.29F  FIG.29G  FIG.29I  FIG.29H
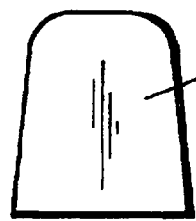 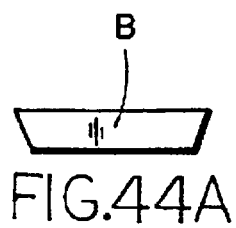 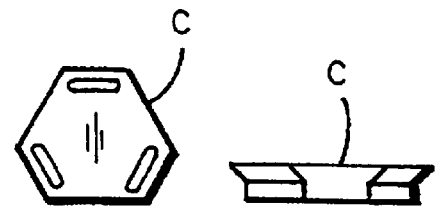
FIG.44  FIG.44A  FIG.45  FIG.45A

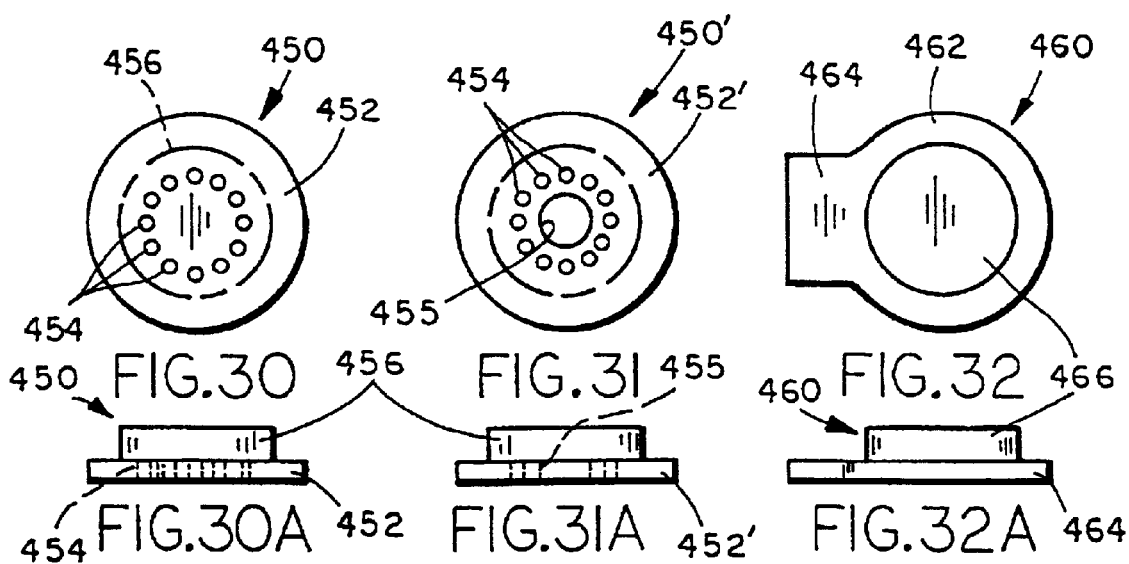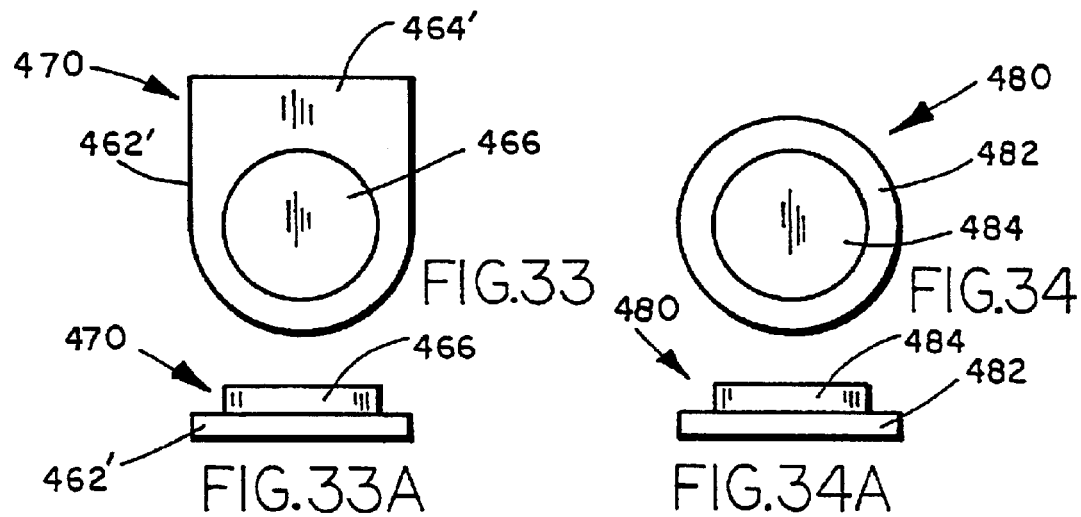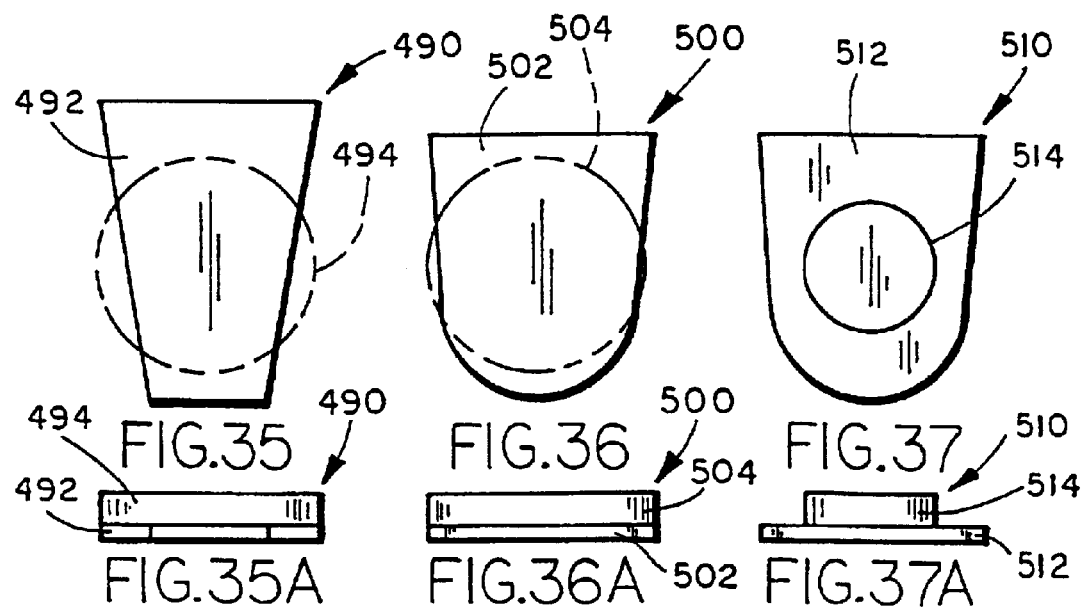

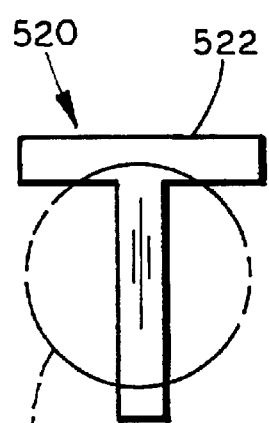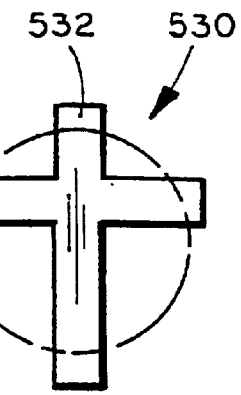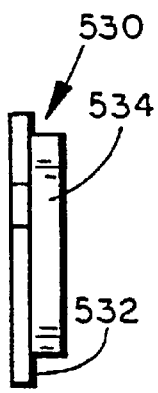
FIG.38  FIG.38A  FIG.39  FIG.39A
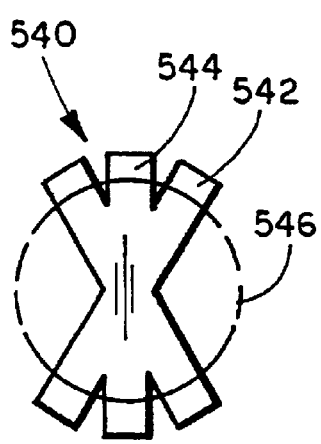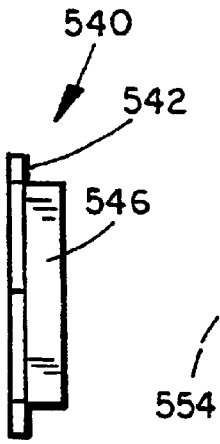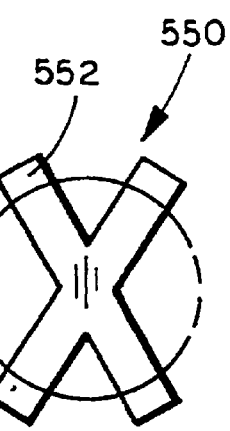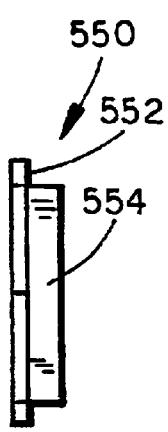
FIG.40  FIG.40A  FIG.41  FIG.41A
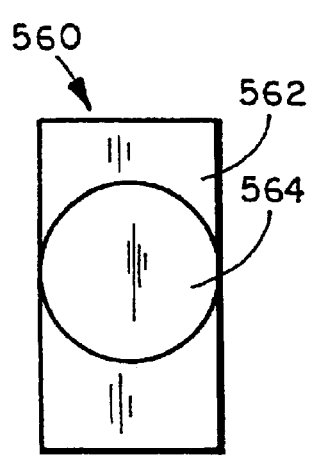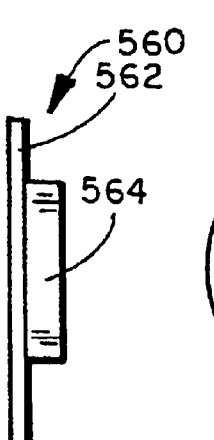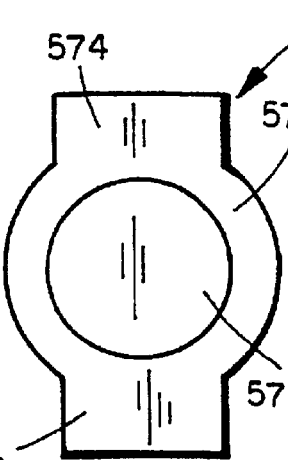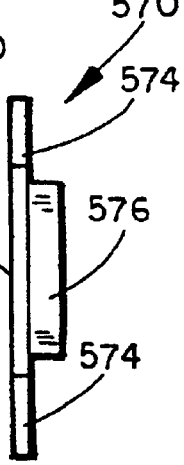
FIG.42  FIG.42A  FIG.43  FIG.43A

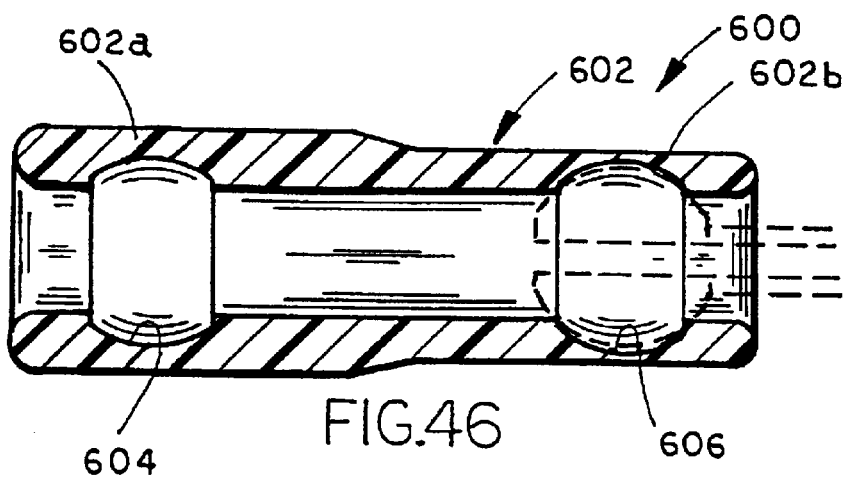
FIG.46
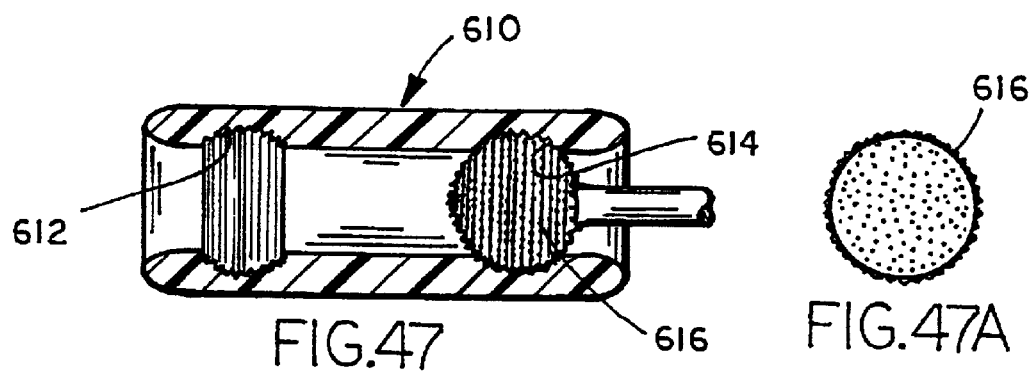 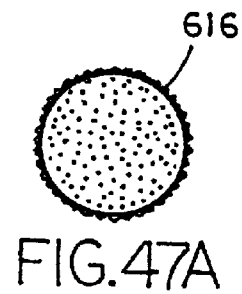
FIG.47    FIG.47A
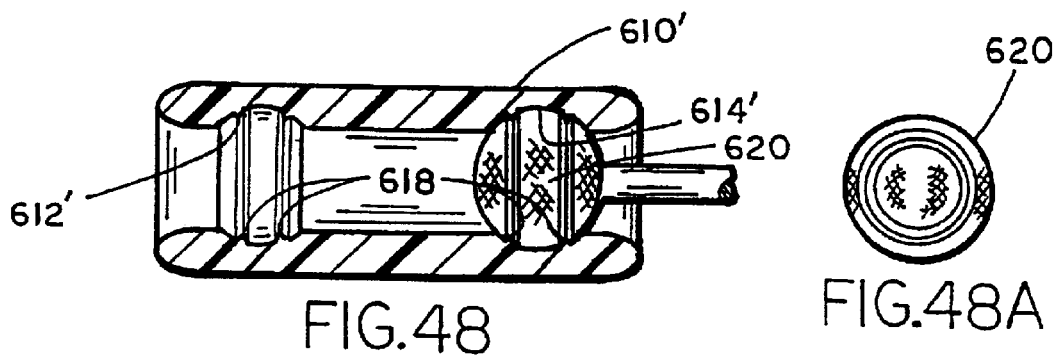 
FIG.48    FIG.48A
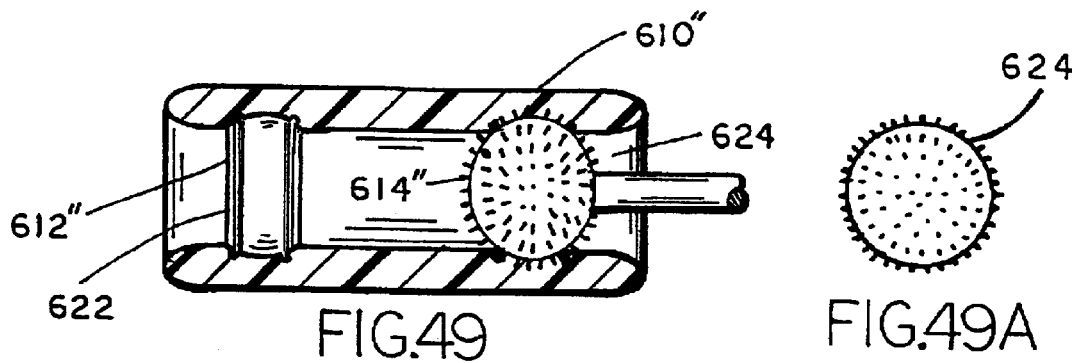 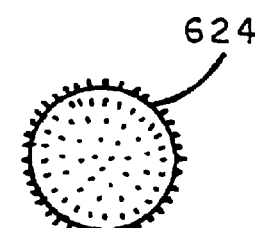
FIG.49    FIG.49A

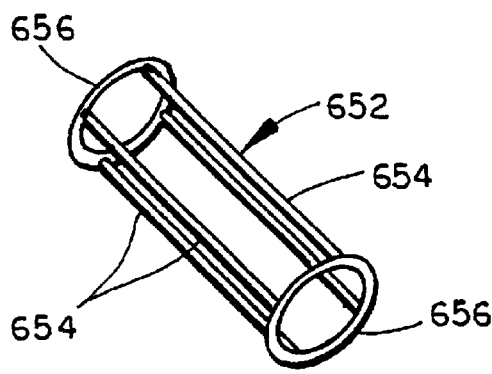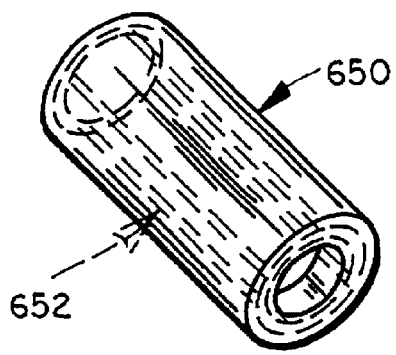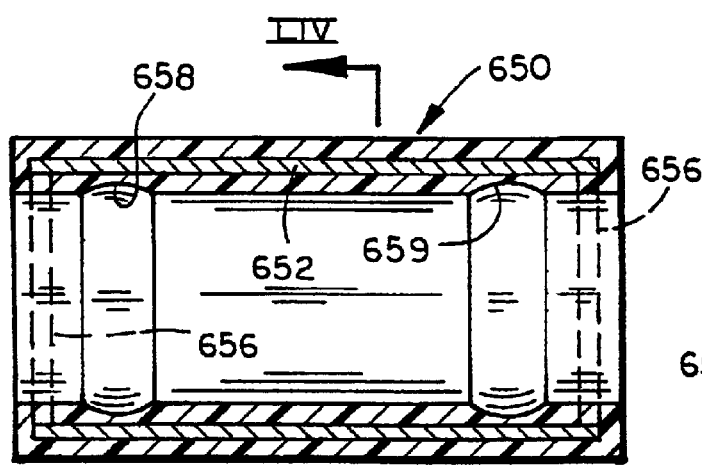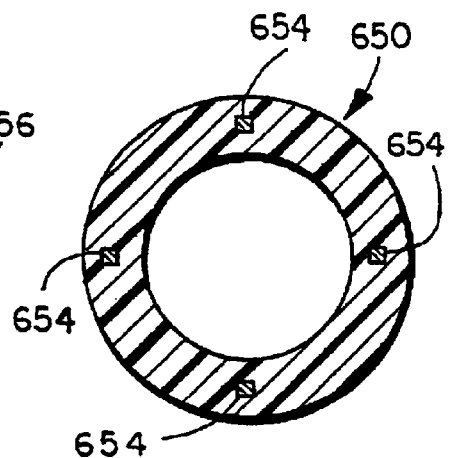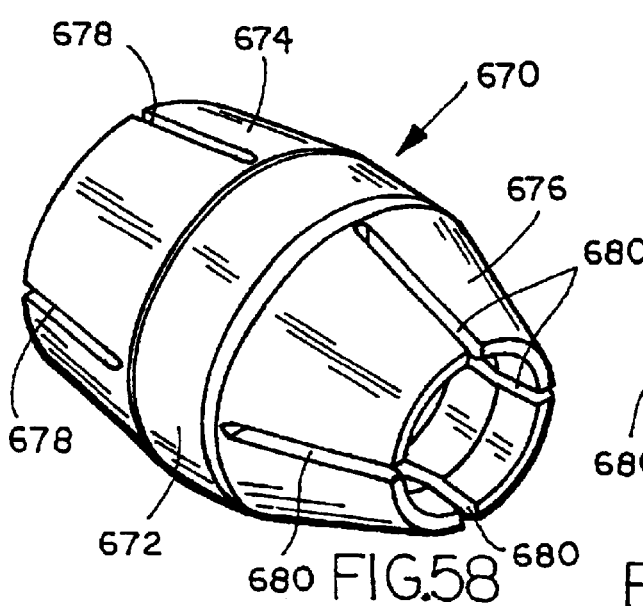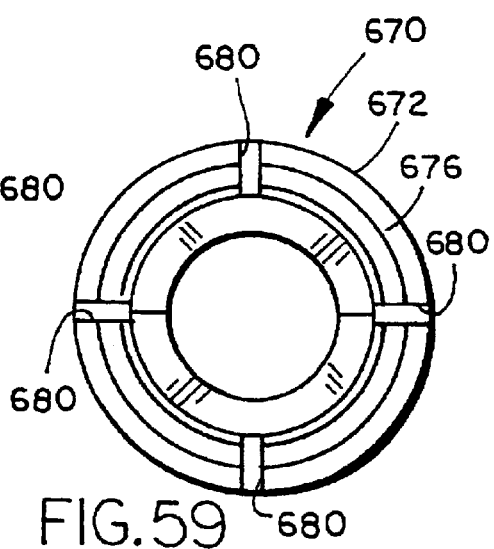

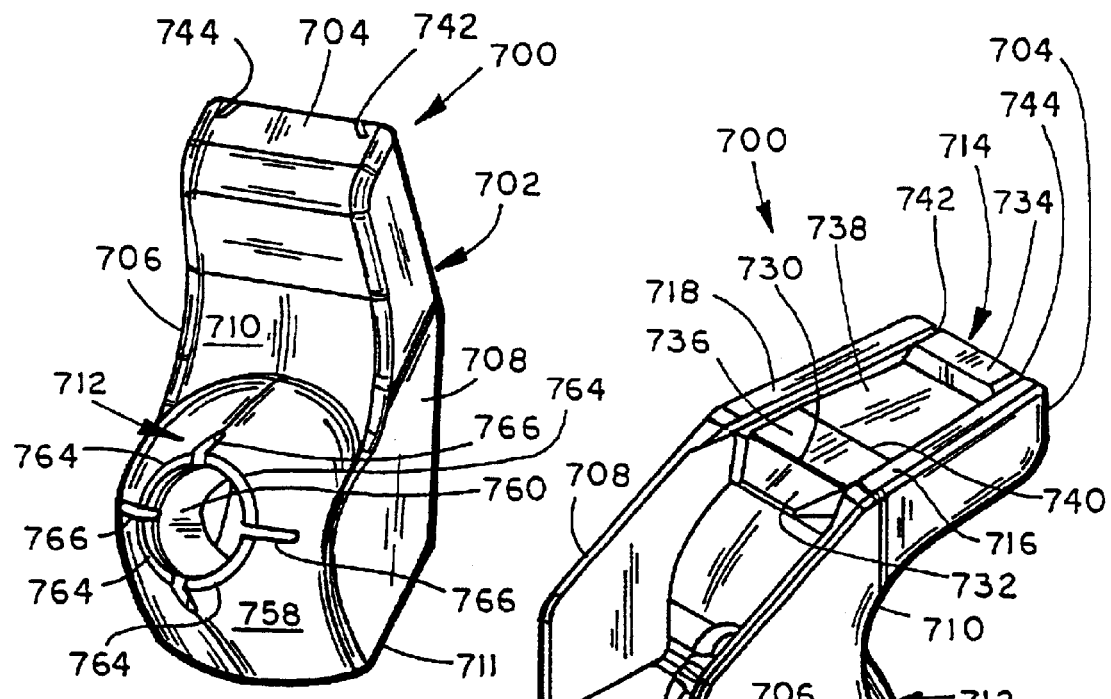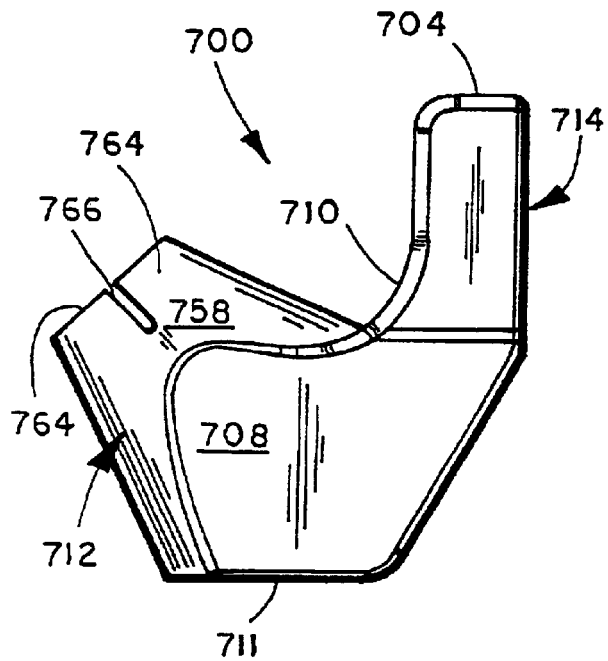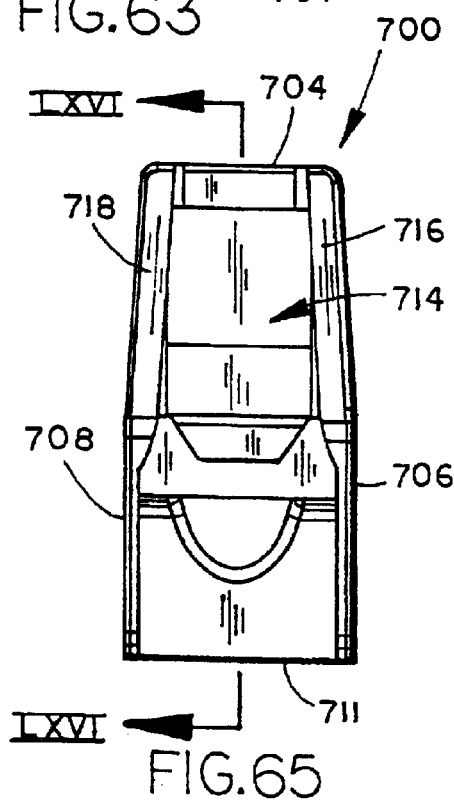

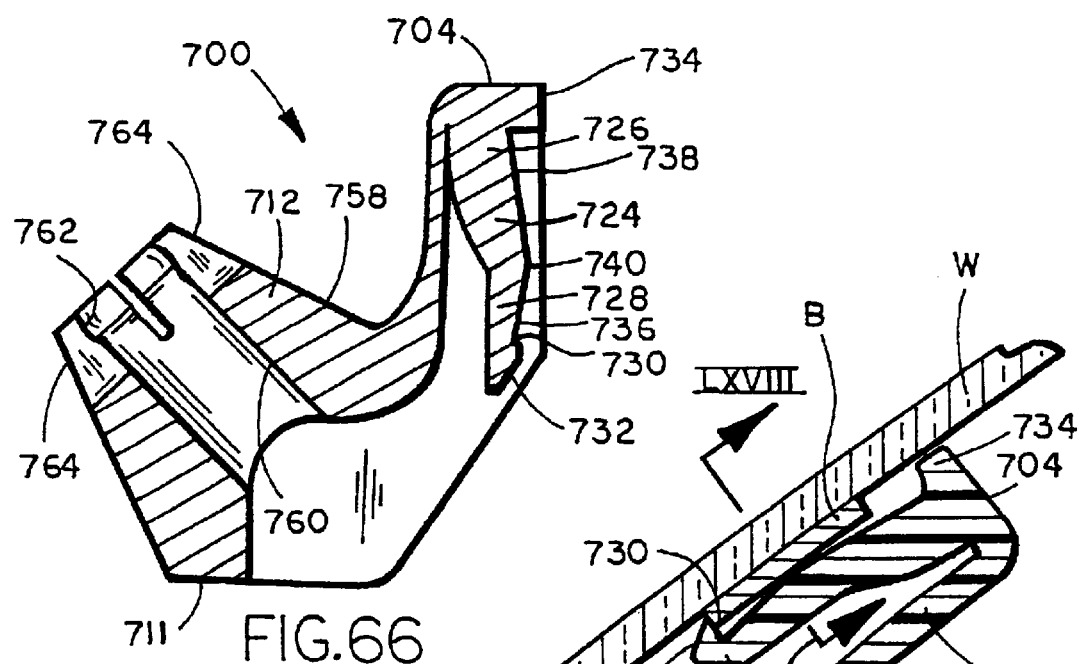
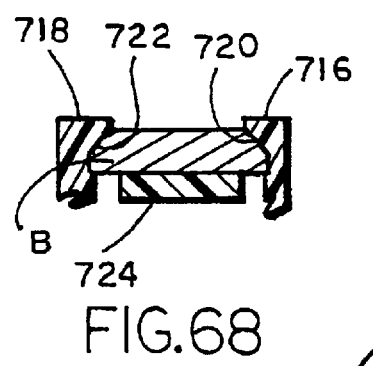
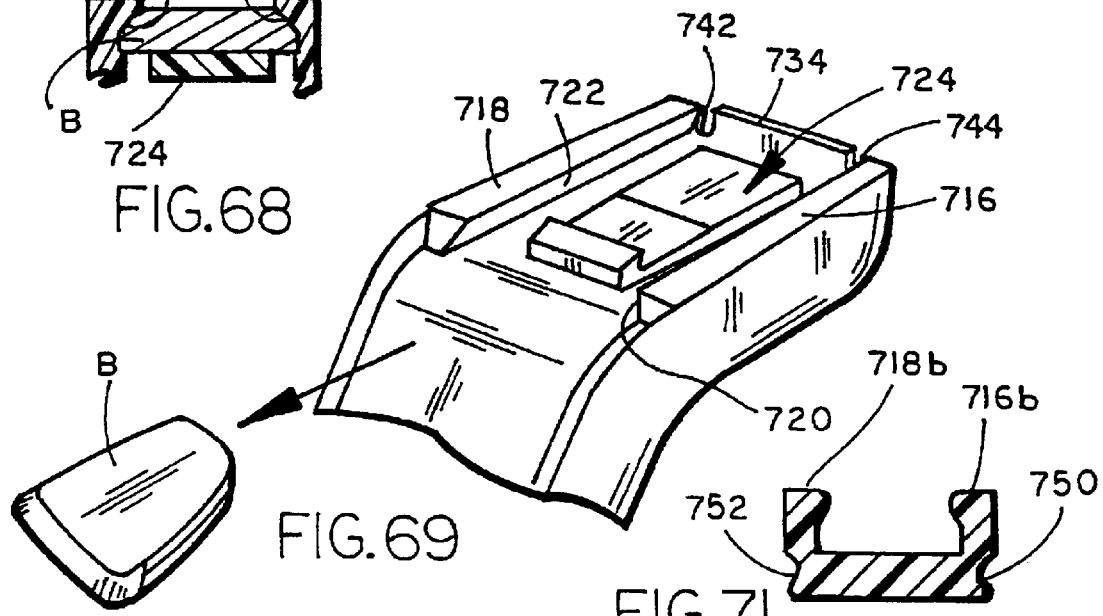
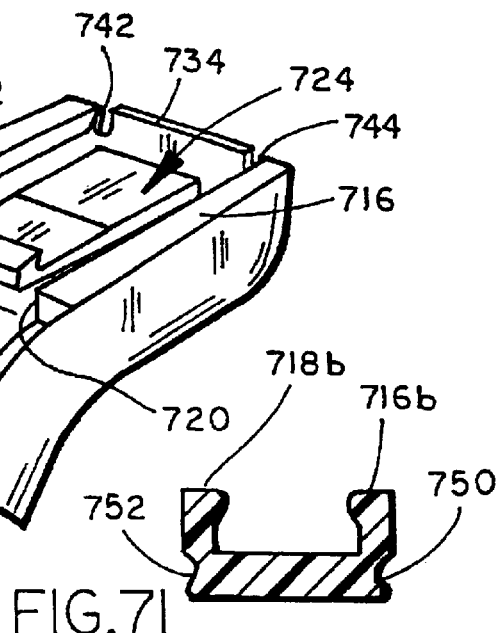
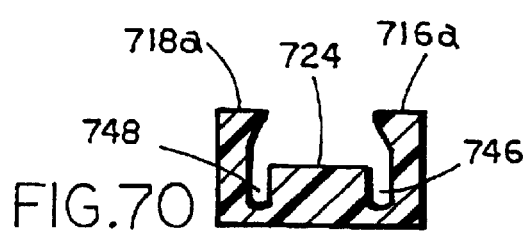
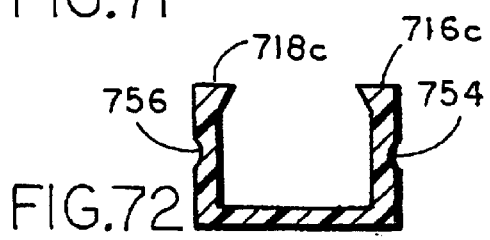

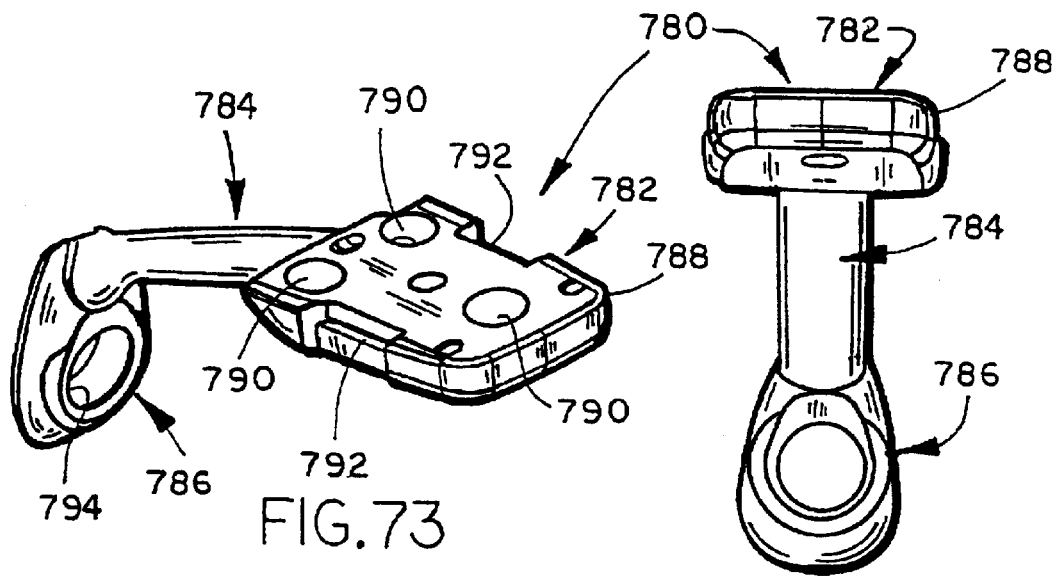
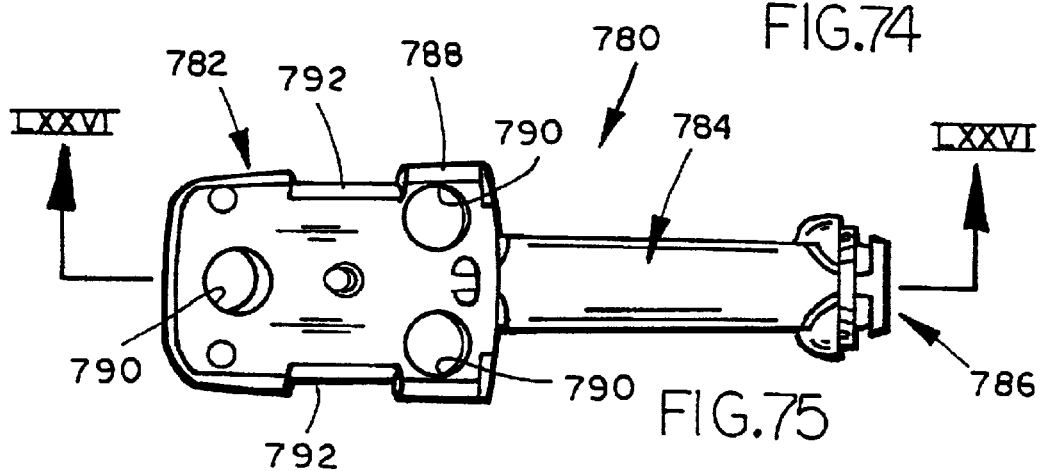
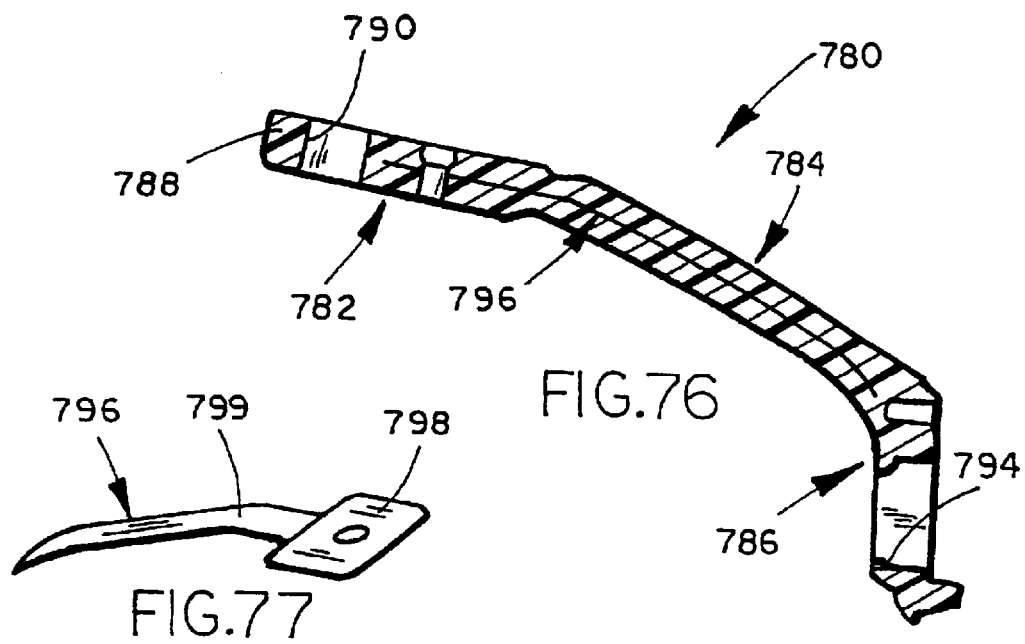

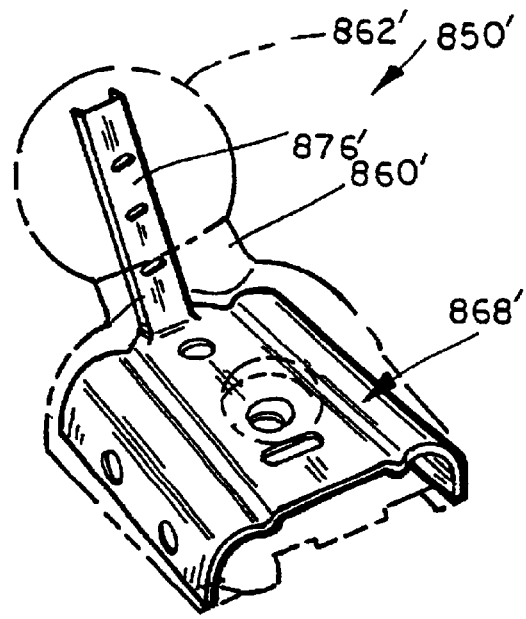
FIG.86
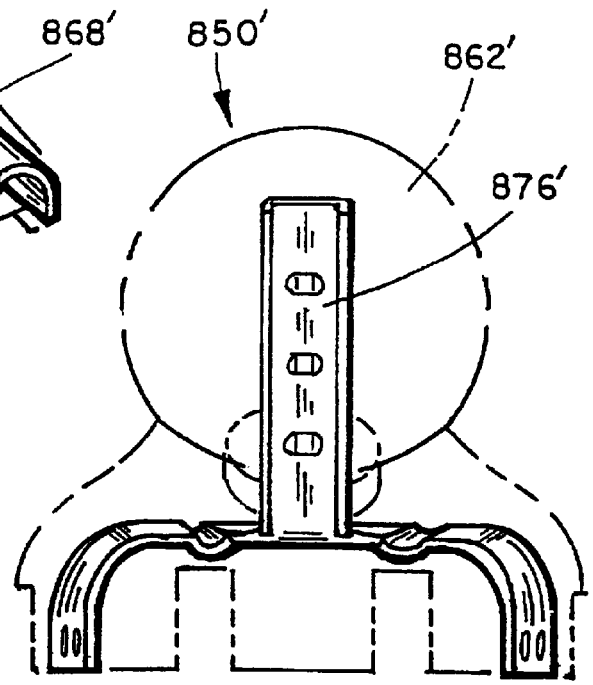
FIG.87
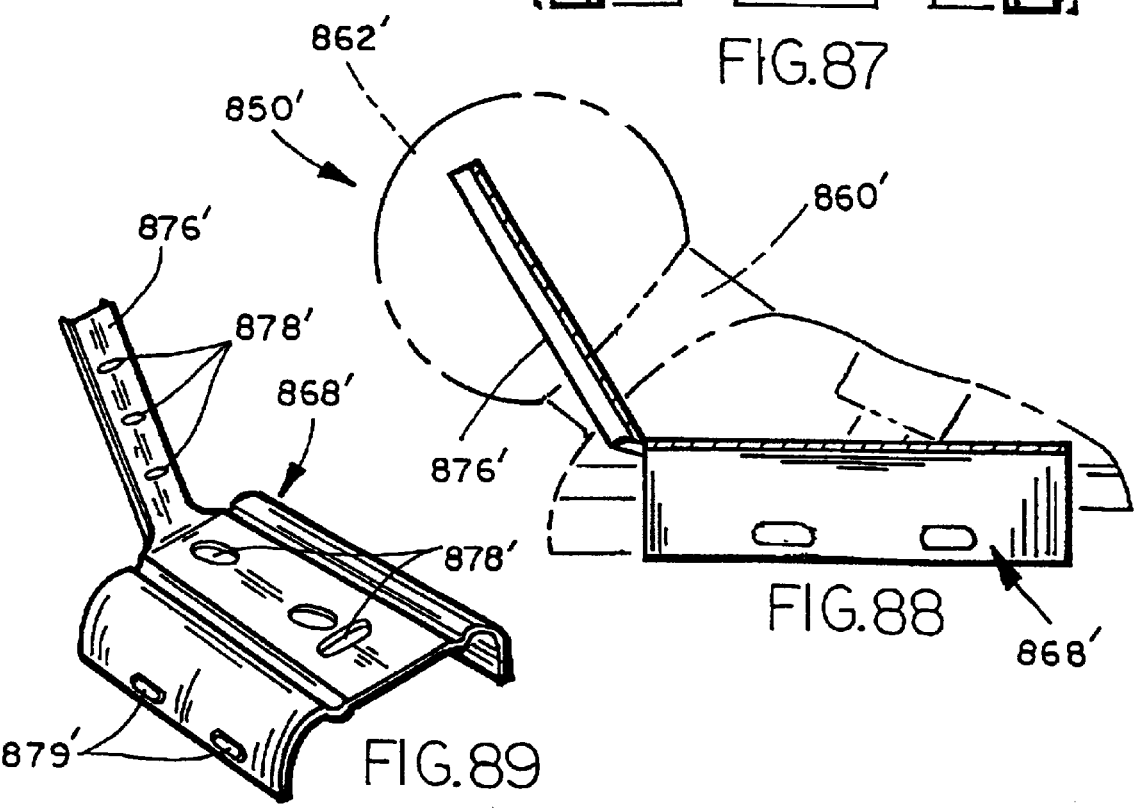
FIG.88
FIG.89

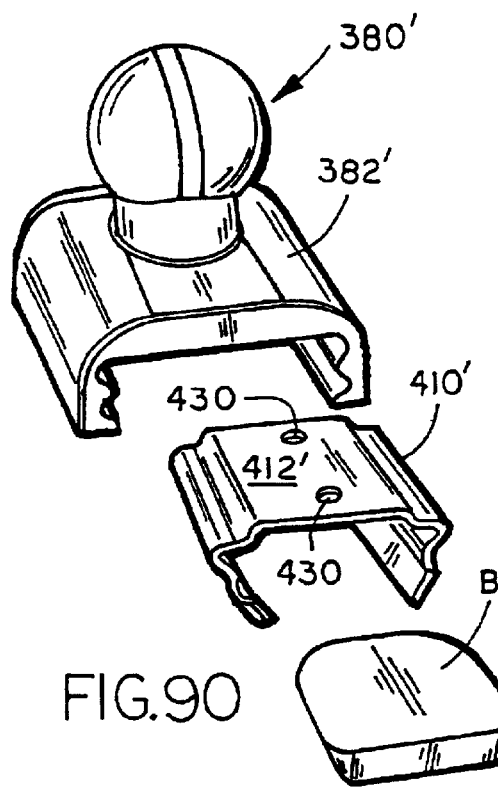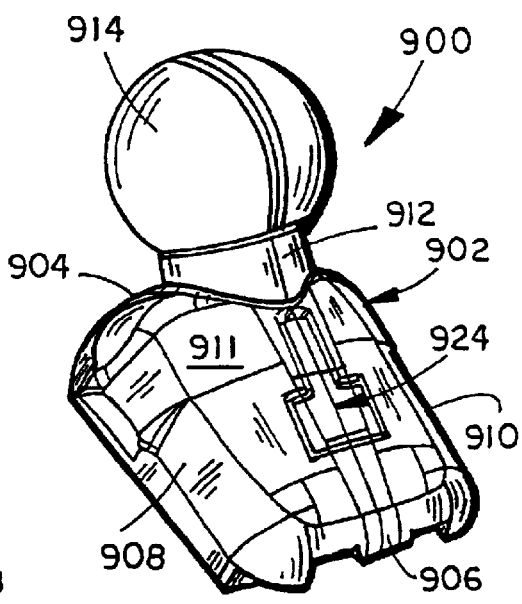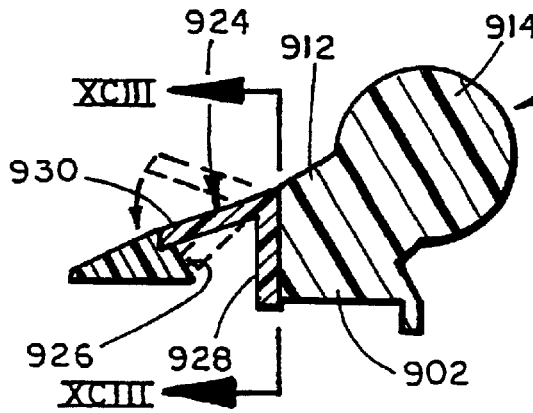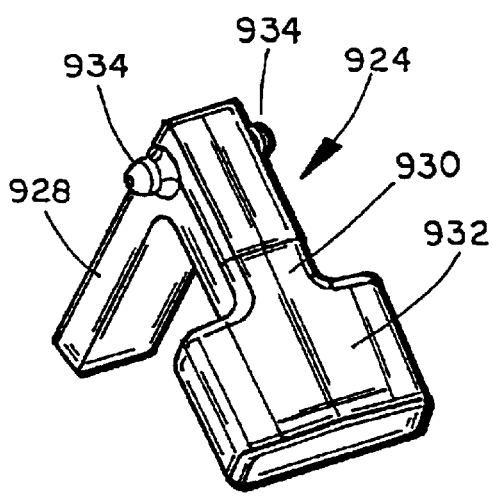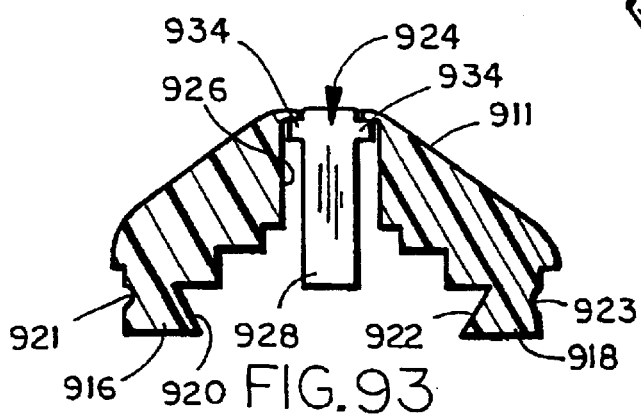

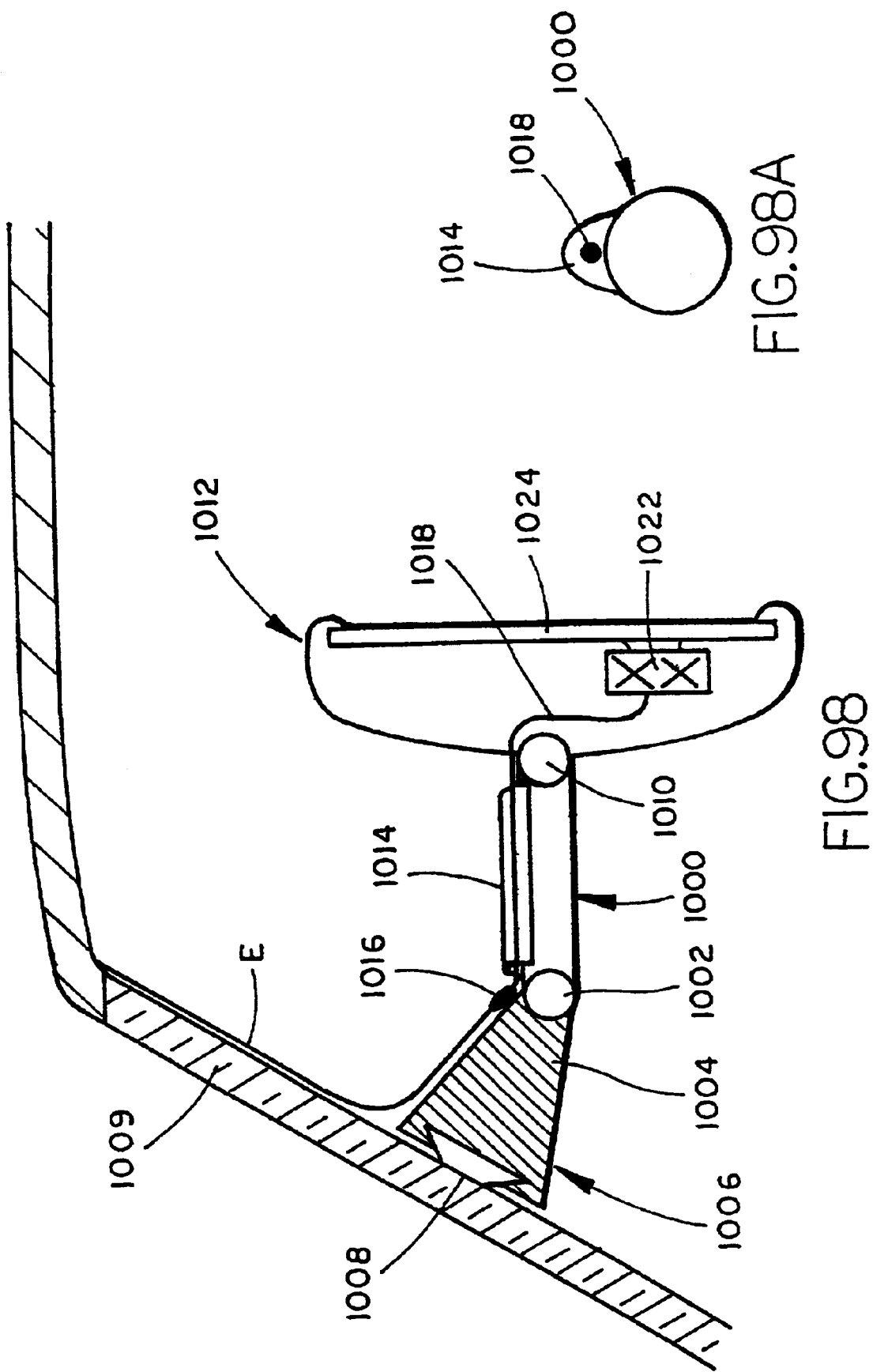

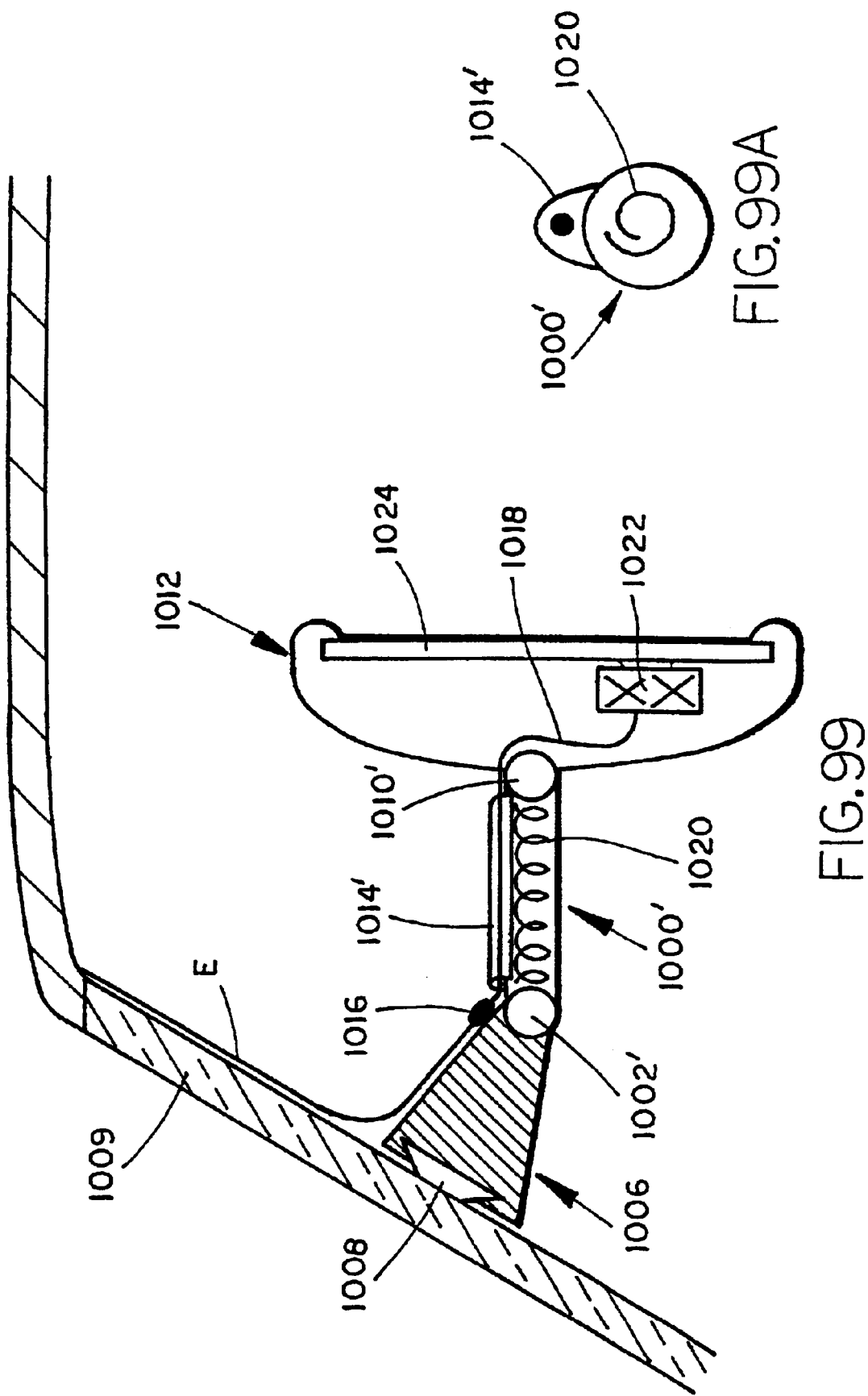

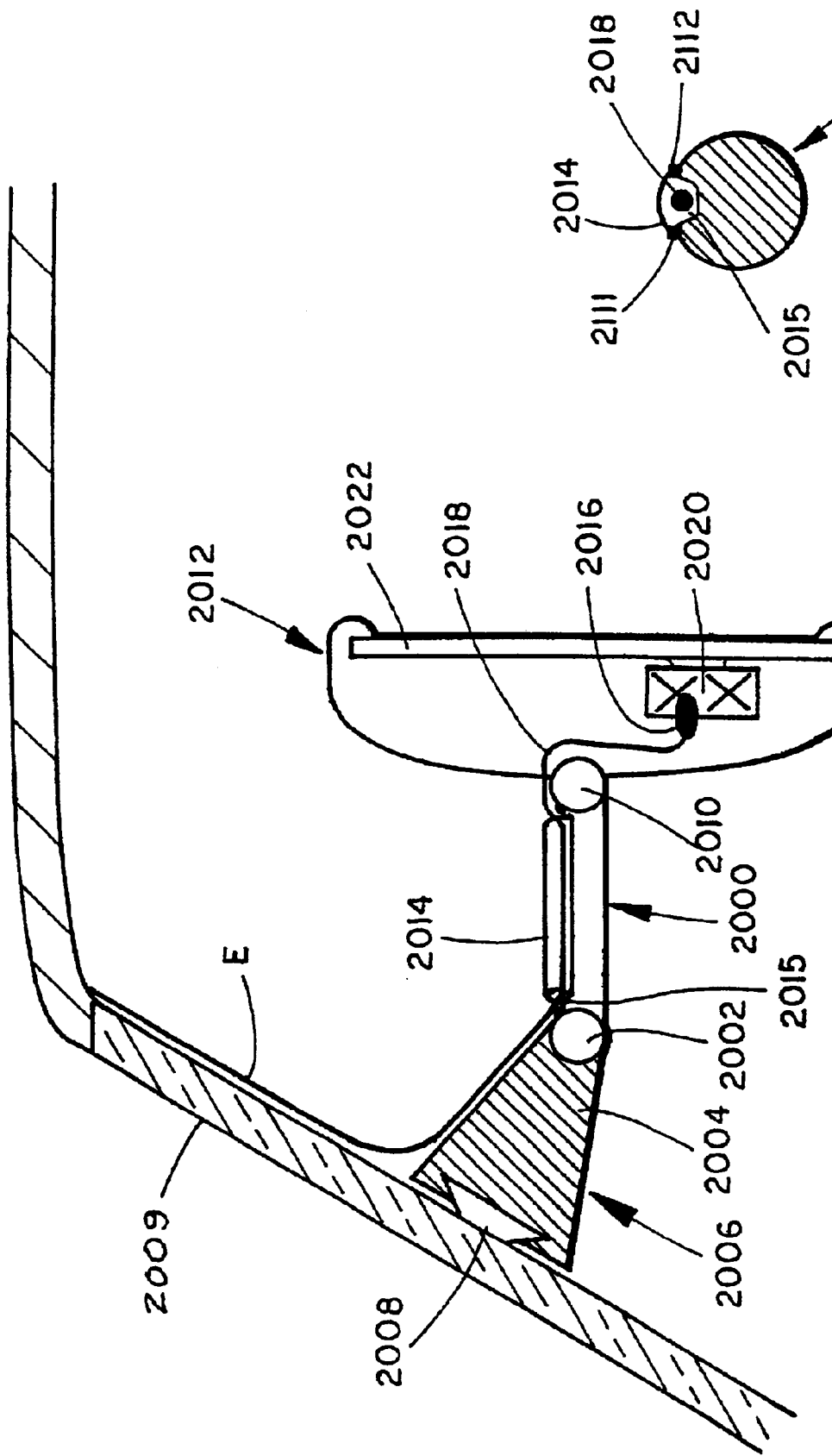

US 6,877,709 B2

INTERIOR REARVIEW MIRROR ASSEMBLY WITH POLYMERIC COMPONENTS

CROSS REFERENCE TO RELATED APPLICATIONS

This application claims priority on U.S. provisional patent applications Ser. No. 60/317,701, filed Sep. 6, 2001, entitled REARVIEW MIRROR SUPPORT ASSEMBLY and Ser. No. 60/257,477, filed Dec. 21, 2000, entitled REARVIEW MIRROR SUPPORT ASSEMBLY, the disclosures of which are hereby incorporated by reference herein.

FIELD OF THE INVENTION

This invention relates to rearview mirrors for vehicles and, more particularly, to interior vehicular rearview mirror assemblies providing improved support capacity, versatility, vibration performance, resistance to damage, and ease of manufacture.

BACKGROUND OF THE INVENTION

Interior rearview mirror assemblies for vehicles are typically supported at the forward portion of the passenger compartment of the vehicle by a support or linkage which is most often secured either to the inside surface of the windshield or to a mounting assembly at the forward edge of the headliner on the interior vehicle roof. In either case, a mounting assembly includes a support arm connected to the rearview mirror assembly, the support arm typically including a pair of ball pivot joints allowing adjustment of the position of the rearview mirror assembly for proper vision by various vehicle drivers. A widely used, conventional support arm is that shown in U.S. Pat. No. 4,254,931 and includes a metallic cylindrical tube receiving a ball member at each end within a polymeric ball receiving cup, the cups and ball members being separated by a coil spring which urges the cups and ball members against the crimped outer ends of the tube for proper frictional engagement. However, these rearview mirror support arms have been difficult to manufacture and have encountered numerous drawbacks in use. For example, during high volume production of such supports, it is difficult to maintain the constant, consistent torque requirements for the ball pivot joints in order to properly support the rearview mirror assembly in its cantilevered position. Once the outer tube of the conventional support arm is crimped over at its ends, it cannot be adjusted. If the frictional resistance or torque required for pivotal movement is not correct, the assembly must be scrapped. Moreover, each support arm requires a relatively large number of parts such that the arm is expensive to manufacture. In addition, since the outer tube of such assemblies is normally formed from metal, it is necessary that the tube be properly painted to match or coordinate with the interior color of the vehicle or mirror assembly or to reduce glare. Once the assembly is properly painted, handling of the assembly during manufacture, shipping and/or installation can often damage the paint, again requiring the assembly to be discarded. Further, since the internal spring of such assemblies causes the frictional resistance at the two ball joints to be interdependent on one another, it is difficult to adjust the frictional resistance of each ball joint without affecting the resistance of the other joint. Also, because of the internal structure of the prior known support arms, it has been difficult to insert electrical wiring therethrough for connection to electrical components mounted in the rearview mirror assembly. Moreover, it has been difficult to use the support arm area for support of any additional components which add weight to the overall assembly.

In addition, for heavier, more complex rearview mirror assemblies, the conventionally known mounting brackets and windshield mounting members which secure the assembly to the interior surface of the vehicle windshield have been subject to failure due to the increased weight which must be supported in cantilever fashion. Over time, during the support of such heavier rearview mirror assemblies, many prior known brackets and mounting members have suffered from adhesive failure causing the assembly to drop from the windshield area.

Accordingly, there is a need in the vehicle industry for improved support capability and versatility for interior rearview mirror assemblies which have increased complexity and weight due to the inclusion of a greater number of added feature components, as well as improved vibration performance and ease and cost of manufacture.

SUMMARY OF THE INVENTION

The present invention provides an improved rearview mirror assembly for vehicles. In particular, this invention provides an interior rearview mirror assembly having polymeric components including a mirror support and mounting elements with improved performance and ease of manufacture.

In one aspect, the invention is an interior rearview mirror assembly suitable for use in a vehicle comprising a rearview mirror mount formed from polymeric material having a first color, said rearview mirror mount adapted for attachment to one of a windshield portion of the vehicle and a header portion of the vehicle. The assembly further includes a rearview mirror housing formed from polymeric material having a second color and a reflective rearview mirror element included in the housing. The assembly further includes a rearview mirror support formed from polymeric material having a third color, as well as a first pivot element formed from a polymeric material having a fourth color, and a second pivot element formed from a polymeric material having a fifth color. The support is pivotally attached to the mirror mount by the first pivot element while the rearview mirror housing is pivotally attached to the support by the second pivot element. Each of the mirror mount, mirror support, rearview mirror housing, and first and second pivot elements is formed in its respective color by molding from polymeric material of that color.

In one form, the rearview mirror housing further includes at least one electrical accessory. The assembly includes electrical conductors for electrically connecting the electrical accessory to the vehicle electrical system. The conductors extend through the first and second pivot elements and the mirror support to the rearview mirror housing.

In other forms, the mirror mount, mirror support and mirror housing, as well as the first and second pivot elements are each formed in substantially the same color. One such color is black. Thus, the first, second, third, fourth and fifth colors may all be substantially the same.

In yet another form, at least two of the mirror mount, mirror support, rearview mirror housing and first and second pivot elements are molded from polymeric materials of different colors.

In other aspects, the support may be a hollow sleeve having a passageway therethrough communicating with openings at the opposite ends of the sleeve. Each of the opposite ends defines a socket, each end including a plurality of slots extending toward the other end and parallel to the axis to define flanges therebetween. A spring-receiving surface is included proximate each end for receiving a spring member thereon. An external spring, such as an annular split ring, is received on each spring-receiving surface to engage the flanges and confine a ball pivot member when received in the socket and to help define a pivot torque for the ball pivot member therein. Two ball pivot members may each include an aperture therethrough in communication with a passageway through the sleeve to provide an electrical wire receiving channel defined internally through the support. Alternately, electrical bus bars may be provided through or molded in the sleeve.

In another aspect, one of the opposite ends of the support may include a socket, the end including a plurality of slots extending toward the other end and parallel to the axis to define flanges therebetween, a spring-receiving surface proximate that end and an external spring member received on the spring-receiving surface to engage the flanges, while the opposite end includes a partially spherical exterior surface defining a ball pivot surface adapted to be received in a socket on another component of the rearview mirror assembly.

In another embodiment, the sleeve may include a socket at each end for receiving a ball pivot member within the passageway, the sleeve being substantially continuous along its length intermediate the opposite ends as well as circumferentially therearound, the sleeve also being sized and formed from a material having sufficient resiliency to frictionally resist pivotal movement of the ball members when received with an interference fit in the first and second sockets.

In any of these versions of the support, the sleeve may have a first lateral exterior dimension measured transverse to the axis at a position intermediate the opposite ends, while each of the opposite ends has a second lateral exterior dimension less than or equal to the first dimension. Preferably, the sleeve is circular in section with the first and second lateral dimensions being diameters of circular sections at spaced positions along the sleeve.

Additionally, in any of the support embodiments, either the sockets or the ball pivot members may include surfaces providing enhanced frictional resistance to movement of the ball pivot member when received in the socket, one example of such a surface being a plurality of micro protrusions. Stiffening inserts and/or dampening members may be included to reduce or dampen vibration. In addition, the sleeve may be rectilinear or angled such that the axis at one end extends at an angle to the axis at the other end.

A vehicle accessory may also be mounted or supported in the internal passageway of any of the sleeves.

In yet another aspect of the invention, an interior rearview mirror assembly for a vehicle includes a reflective mirror element housed in a mirror housing, a first mount on the mirror housing for pivotally engaging a rearview mirror support, a second mount spaced from the first mount on the mirror housing for pivotally engaging a second rearview mirror support, and at least two rearview mirror supports, a first of the mirror supports pivotally engaging the first mount, and a second of the mirror supports pivotally engaging the second mount. Thus, the mirror housing and reflective element are adjustably supported in cantilevered position by the first and second mirror supports when mounted on the interior of a vehicle. The mirror support used in this aspect of the invention may comprise those of the invention described above, or other mirror supports. In addition, three or more mirror supports may be included and pivotally engaged with the mirror housing for greater support of the housing on the vehicle.

In a further aspect of the invention, a vehicle accessory mounting member or rearview mirror mount for supporting a rearview mirror assembly or other vehicle accessory includes a base having a top end, a bottom end, opposing sides, and front and rear surfaces. A pair of cooperating receiving members on the rear surface of the base slidably mount the mounting member on an attachment member secured to the interior portion of a vehicle, such as a windshield. A arm projects from the base, the mounting arm extending outwardly from a central position on the front surface of the base intermediate the top and bottom ends and having an engaging member for pivotally engaging a vehicle accessory such as a rearview mirror. A retainer or fastener for engaging and holding the mounting member to the adjustment member may be included, such as a set screw.

Preferably, the receiving members may include a pair of spaced slide surfaces which preferably extend from adjacent the top end to adjacent the bottom end of the rear base surface, the slide surfaces being spaced closer together at the top end and inclined inwardly toward one another for engagement with the outwardly tapered side surfaces of a wedge shaped attachment member. The slide surfaces preferably comprise a pair of spring flanges projecting outwardly from the rear base surface for resiliently engaging the attachment member. Alternately, a spaced pair of spring bands extend around the front surface of the base, one spring band mounted between the support end and top end of the base, while the other spring band is mounted between the support arm and the bottom end of the base. Each spring band has two free ends which project outwardly of the rear base surface, the free ends of said spring bands together defining said slide surfaces.

In a yet further embodiment of the mount, the receiving members may include frangible portions adapted to release upon application of a sufficient force to the mounting member whereby the mounting member will be released from the attachment member.

In another embodiment of the mount, the spring flanges may be formed on a one-piece spring member which is slidably mounted on the rear base surface and includes a top flange positioned between the spring flanges, the top flange adapted to be flexed from between the spring flanges upon mounting on the attachment member whereby the spring flanges snap into engagement with the side surfaces of the attachment member.

In further embodiments, the mounting member or mount and/or the mirror support/stay and the pivot joints incorporated therein may be molded from a resinous, polymeric material and include a metallic or other stiffening insert to help reduce vibration. The mounting member may also include a pivotal, securing lever for retention on the windshield attachment member.

Various forms of mirror stays for supporting rearview mirror assemblies or other vehicle accessories from a windshield attachment member or the header area above the windshield are provided in other aspects of the invention. These stays include a socket or ball pivot member and may include breakaway mounts for attachment to the vehicle.

In yet another aspect of the invention, an attachment member for supporting a rearview mirror assembly or other vehicle accessory on a windshield or other surface includes a body having front, back, top and bottom surfaces and opposing side edges. The back surface is adapted to be secured to a vehicle support surface such as a windshield. The front surface has at least one raised projection thereon defining raised contact areas for engaging mating surfaces on an accessory support member. The body is larger than the raised projection and has a shape selected from the group including a rectangle, a circle, truncated triangle, a keyhole shape, a rectangle with one rounded end, a truncated triangle with one rounded corner, a circle with oppositely extending rectangular flanges, a T, a cross, an X and an X with an additional cross member. The base may also include a series of apertures for decreasing its weight, while the raised projection may have a shape selected from the group including a circle, wedge having outwardly tapered sides, and a polygon with multiple side surfaces.

Accordingly, the present invention significantly eases manufacturing and lowers costs by eliminating a number of parts from the interior rearview mirror support assembly while enhancing the ability to maintain desired resistance to pivotal movement incorporated in the ball pivot joints on a high production basis. The support may be formed in many shapes, configurations and lengths, and may be solid or hollow, while the pivot force of the joint at one end of the support may be set independently of the pivot force at the opposite end by incorporating different strength external springs, different materials and different engaging surfaces on the sockets and ball pivot members. The invention further provides a greater choice of materials including resinous polymeric materials which may be molded in a desired color without requiring conventional painting procedures, or decorated and/or coated during or after molding. Moreover, the ball pivot members can be formed from differing materials such as polymeric resinous material in a desired color which may optionally match the color of the support sleeve. In addition, the present invention provides a rearview mirror support having increased stability and vibration resistance including the simultaneous use of two or more mirror support assemblies at spaced positions on the housing for the rearview mirror assembly. Further, the present invention resists adhesive failure of the support from the vehicle interior surface on which it is mounted, such as the interior windshield surface, by including an enlarged attachment member or windshield mounting button having an increased footprint for attachment to the windshield. Moreover, a vehicle accessory mounting member adapted to cooperate with such an attachment member provides a centrally located support arm which decreases the tensile or peeling force acting on the attachment member while also including a variety of forms of frangible or resilient, spring-type receiving members which engage the attachment member yet break away upon impact.

These and other objects, advantages, purposes and features of the invention will become more apparent from a study of the following description taken in conjunction with the drawings.

BRIEF DESCRIPTION OF THE DRAWINGS

FIG. 1 is a perspective view of a first embodiment of the rearview mirror support for vehicles of the present invention;

FIG. 2 is an exploded, perspective view of the rearview mirror support of FIG. 1;

FIG. 5 is a schematic sectional view of the rearview mirror support of FIGS. 1 and 2 illustrating the internal electrical wire channel therethrough;

FIG. 6 is a schematic sectional view of a modified form of the rearview mirror support showing the internal electrical wire channel therethrough;

FIG. 7 is a rear perspective view of a third embodiment of the rearview mirror support of the present invention mounted on a rearview mirror assembly;

FIG. 8 is an exploded perspective view of the rearview mirror support of FIG. 7;

FIG. 9 is a perspective view of a fourth embodiment of the rearview mirror support of the present invention;

FIG. 10 is an exploded perspective view of the rearview mirror support of FIG. 9;

FIG. 22 is a combined front elevation and bottom plan view of one form of rearview mirror housing adapted for use with the present invention;

FIG. 23 is a perspective view of the rear portion of the rearview mirror housing of FIG. 22;

FIG. 24 is a rear perspective view of a front bezel or rim taken from the bottom and inside for incorporation on the rear housing portion of FIG. 23;

FIG. 25 is a perspective view of one form of a vehicle accessory mounting member for supporting a rearview mirror or other vehicle accessory of the present invention;

FIG. 25A is another perspective view of the mounting member of FIG. 25;

FIG. 25B is a rear perspective view of the mounting member of FIG. 25;

FIG. 25C is a side elevation of the mounting member of FIG. 25;

FIG. 25D is a sectional end elevation taken along plane XXV(D)—XXV(D) of FIG. 25C illustrating mounting on a wedge shaped attachment member/windshield mounting button;

FIG. 26 is a rear perspective view of a second embodiment of a vehicle accessory mounting member of the present invention;

FIG. 26A is a rear elevation of the mounting member of FIG. 26;

FIG. 26B is a rear perspective view of the mounting member of FIG. 26;

FIG. 26C is a side elevation of the mounting member of FIG. 26; and

FIG. 26D is a sectional end elevation taken along plane XXVI(D)—XXVI(D) of FIG. 26C;

FIG. 26E is a rear perspective view of third embodiment of a vehicle accessory mounting member of the present invention;

FIG. 26F is a sectional view of the mounting member of FIG. 26E taken along plane XXVIF—XXVIF;

FIG. 28 is a top perspective view of a fifth embodiment of a vehicle accessory mounting member of the present invention;

FIG. 28A is a side elevation of the mounting member of FIG. 28;

FIG. 28B is a top plan view of the mounting member of FIG. 28;

FIG. 28C is a front elevation of the mounting member of FIG. 28;

FIG. 28D is a sectional end elevation taken along plane XXVIII(D)—XXVIII(D) of FIG. 28C;

FIG. 28E is a sectional end elevation taken along plane XXVIII(E)—XXVIII(E) of FIG. 28C;

FIG. 29F is a sectional side elevation of the mounting member assembly of taken along plane XXIX(F)—XXIX(F) of FIG. 29C;

FIG. 29G is a sectional end elevation of the mounting member assembly taken along plane XXIX(G)—XXIX(G) of FIG. 29C;

FIG. 29H is a sectional end elevation f the mounting member assembly of FIG. 29C when mounted on of a wedge-shaped attachment member/windshield mounting button received between the resilient flanges of the spring member of FIG. 29B;

FIG. 29I is a subassembly of the spring member of FIG. 29B incorporating the attachment member/windshield button shown in FIG. 29H to illustrate the assembled position of the rear flanges of the spring member;

FIGS. 30–43A are plan views and corresponding side elevations of various embodiments of a vehicle accessory attachment member/windshield mounting button of the present invention illustrating different shapes for both the attachment body and raised projection thereon;

FIGS. 44 and 44A are a plan view and a corresponding end elevation of a wedge shaped projection for use on the vehicle accessory attachment members of FIGS. 30–43A; and FIGS. 45 and 45A are a plan view and a corresponding side elevation of a hexagonal projection for use on the vehicle accessory attachment members of FIGS. 30–43A;

FIG. 46 is a sectional side elevation of a further embodiment of the support sleeve for use in a rearview mirror support of the present invention;

FIGS. 47 and 47A, 48, 48A and 49, 49A are sectional side elevations and perspective views of further embodiments of the support sleeve for use in a rearview mirror support of the present invention and the textured pivot ball members adapted for providing increased frictional resistance to pivoting;

FIG. 54 is a sectional side elevation of a further embodiment of the support sleeve for use in a rearview mirror support of the present invention;

FIG. 55 is a sectional end elevation of the support sleeve of FIG. 54;

FIG. 56 is a perspective view of the support sleeve of FIGS. 54 and 55;

FIG. 57 is a perspective view of a reinforcing insert incorporated in the support sleeve of FIGS. 54–56;

FIG. 58 is a perspective view of another embodiment of the support sleeve for use in a rearview mirror support of the present invention;

FIG. 59 is an end view of the support sleeve of FIG. 58;

FIG. 62 is a front perspective view of a windshield mounted stay of the present invention for supporting a rearview mirror assembly or other vehicle accessory;

FIG. 63 is a rear perspective view of the stay of FIG. 62;

FIG. 64 is a side elevation of the stay of FIG. 62;

FIG. 65 is a rear elevation of the stay of FIG. 62;

FIG. 66 is a sectional view of the stay of FIG. 65 taken along plane LXVI—LXVI of FIG.65;

FIG. 67 is a partial sectional view of the stay of FIG. 62 mounted on the inside surface of a windshield button of a vehicle;

FIG. 68 is a sectional view taken along plane LXVIII—LXVIII of FIG. 67;

FIG. 69 is a perspective view with portions broken away showing the mounting of the stay on a windshield button;

FIGS. 70–72 are alternate forms of the mounting portions of the stay of FIG. 62;

FIG. 73 is a perspective view of another embodiment of a stay for supporting a rearview mirror assembly or other vehicle accessory incorporating the present invention;

FIG. 74 is a front elevation of the stay of FIG. 73;

FIG. 75 is a plan view of the stay of FIG. 73;

FIG. 76 is a sectional view of the stay taken along plane LXXVI—LXXVI of FIG. 75;

FIG. 77 is a perspective view of the stiffening insert incorporated in the stay of FIGS. 73–76;

FIG. 83 is a front perspective view of a sixth embodiment of a rearview mirror assembly or vehicle accessory mounting member of the present invention;

FIG. 84 is a sectional view of the mounting member of FIG. 83 taken along plane LXXXIV—LXXXIV;

FIG. 85 is a perspective view of an insert to be integrally molded in the mounting member of FIG. 84;

FIG. 86 is a perspective view of a seventh embodiment of a rearview mirror assembly or vehicle accessory mounting member of the present invention;

FIG. 87 is an end elevation of the mounting member of FIG. 86;

FIG. 88 is a side elevation of the mounting member of FIG. 86;

FIG. 89 is a perspective view of an insert to be integrally molded within the mounting member of FIG. 86;

FIG. 90 is a perspective view of an ninth embodiment of a rearview mirror assembly or vehicle accessory mounting member of the present invention;

FIG. 91 is a perspective view of a tenth embodiment of a rearview mirror assembly or vehicle accessory mounting member of the present invention;

FIG. 92 is a sectional side elevation of the mounting member of FIG. 91;

FIG. 93 is a sectional end elevation of the mounting member taken along plane XCIII—XCIII of FIG. 92;

FIG. 94 is a perspective view of the retaining lever incorporated in the mounting member of FIG. 91;

FIG. 98 is yet another embodiment of the rearview mirror support of the present invention incorporating an electrical cable or wire housing therein;

FIG. 98A is an end view of the rearview mirror support of FIG. 98;

FIG. 99 is a modified embodiment of the rearview mirror support of FIG. 98 incorporating an electrical cable or wire housing therein on an alternate type of mirror support arm;

FIG. 99A is an end view of the rearview mirror support of FIG. 99;

FIG. 100 is a further modified embodiment of the rearview mirror support of the present invention incorporating a cable or wire housing; and FIG. 100A is an end view of the rearview mirror support of FIG. 100.

DESCRIPTION OF THE PREFERRED EMBODIMENTS

Figure 3:
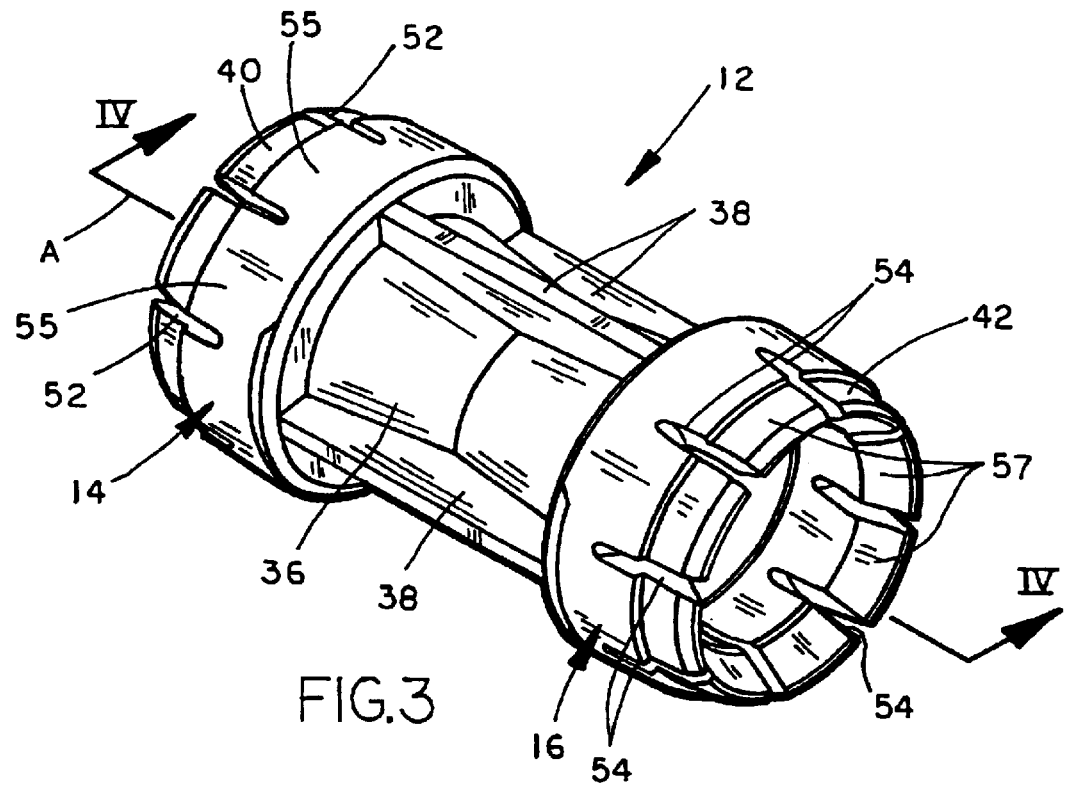
FIG. 3 is a perspective view of the support sleeve of the rearview mirror support of FIGS. 1 and 2.

Referring now to the drawings in greater detail, FIGS. 1–5 illustrate a first embodiment 10 of the rearview mirror support of the present invention. Rearview mirror support 10 includes a support member preferably comprising a hollow, substantially continuous sleeve 12 having a pair of spaced sockets 14, 16, one at each opposing end of the sleeve. Each socket is adapted to receive a spherical ball pivot member from a component of the overall rearview mirror assembly.

For example, socket 14 is adapted to receive ball pivot member 20 formed integrally with a rearview mirror mounting member or channel mount 18 which can be of a variety of forms as explained more fully below. A spring member 22 is received on the exterior of socket 14 to help retain ball pivot member 20 in the socket and provide a predetermined frictional resistance to pivotal movement, i.e., a predetermined torque force required for pivoting the ball member in the socket. Similarly, at the opposite end of sleeve 12, socket 16 is adapted to receive ball pivot member 26 formed integrally with a toggle actuator 24 which is adapted to be pivotally received within a rearview mirror housing of a rearview mirror assembly. Once again, an external spring member 28 is adapted to be received on the exterior of socket 16 to help retain ball member 26 within the socket and provide a predetermined frictional resistance to pivotal movement or torque force for pivoting.

Figure 4:
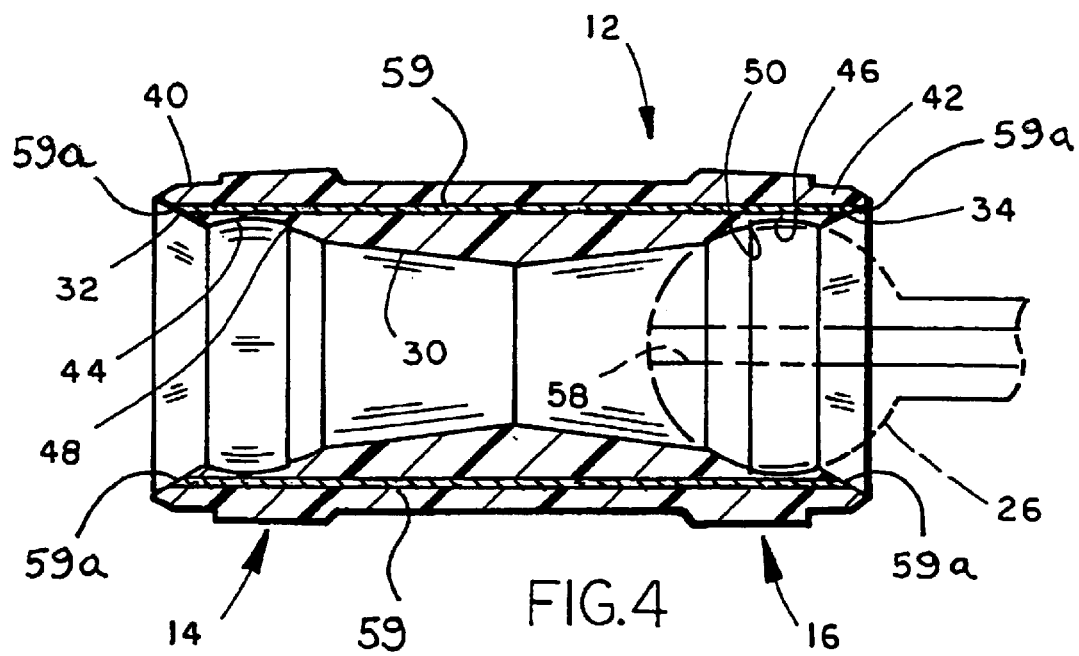
FIG. 4 is a sectional view of the support sleeve of FIG. 3.
Figure 11:
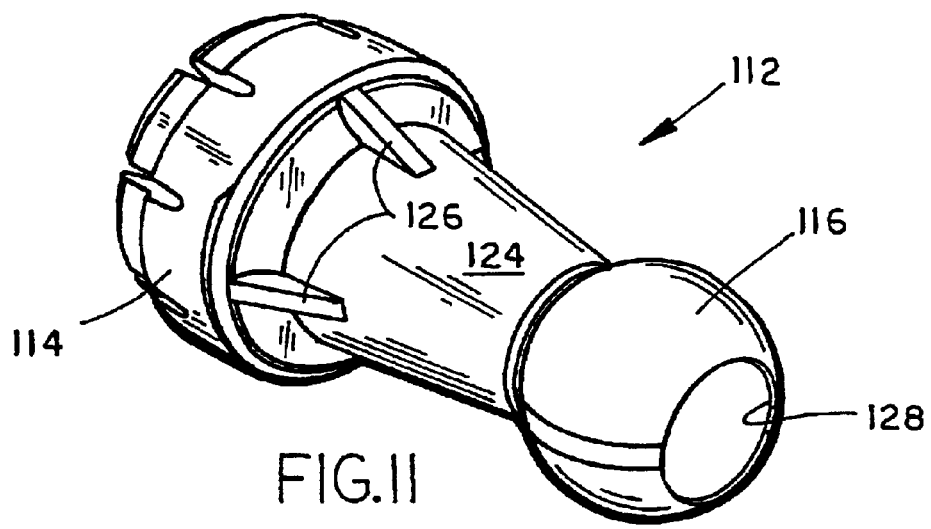
FIG. 11 is a perspective view of the support sleeve of the rearview mirror support of FIGS. 9 and 10.
Figure 12:
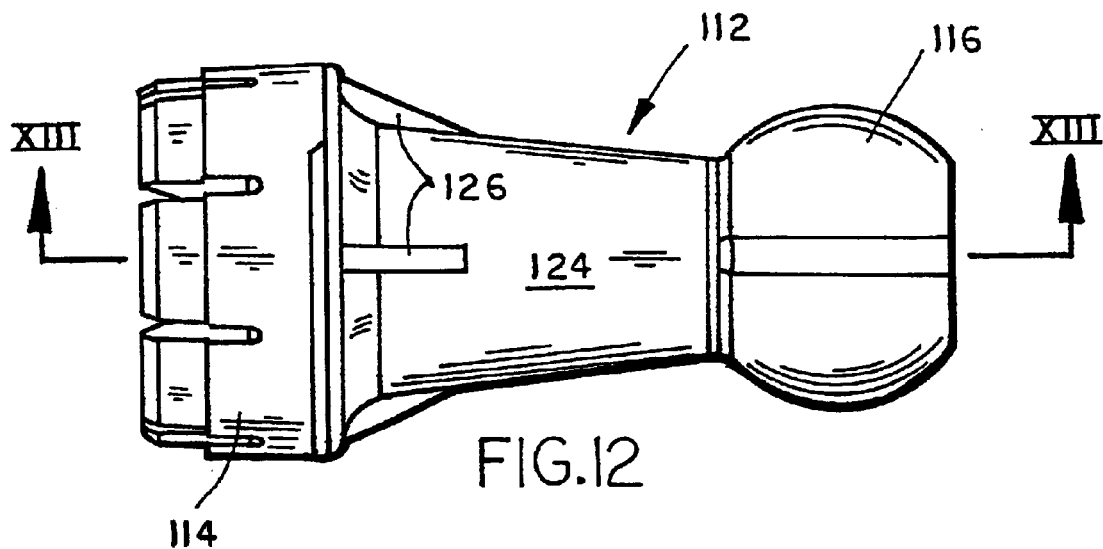
FIG. 12 is a side elevation of the support sleeve of FIG. 11.
Figure 13:
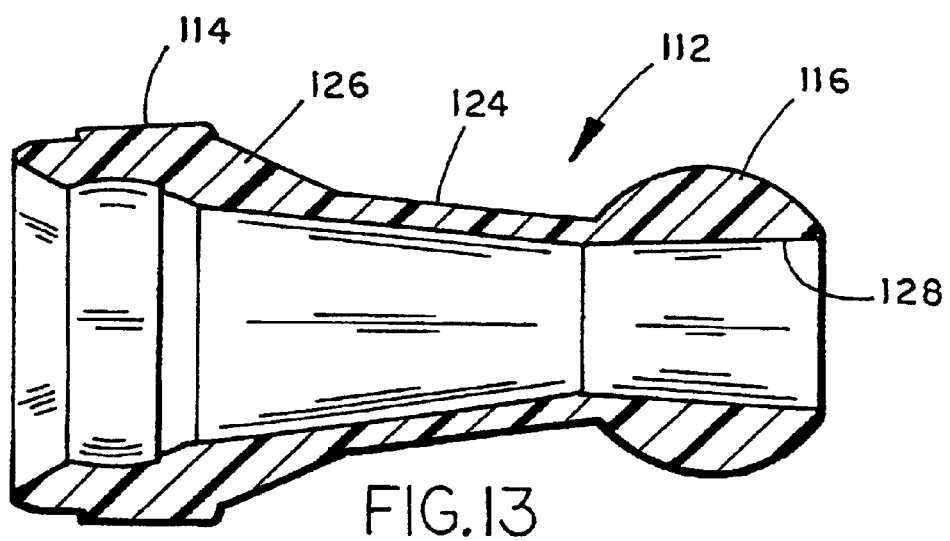
FIG. 13 is a side section of the support sleeve taken along plane XIII—XIII of FIG. 12.
Figure 14:
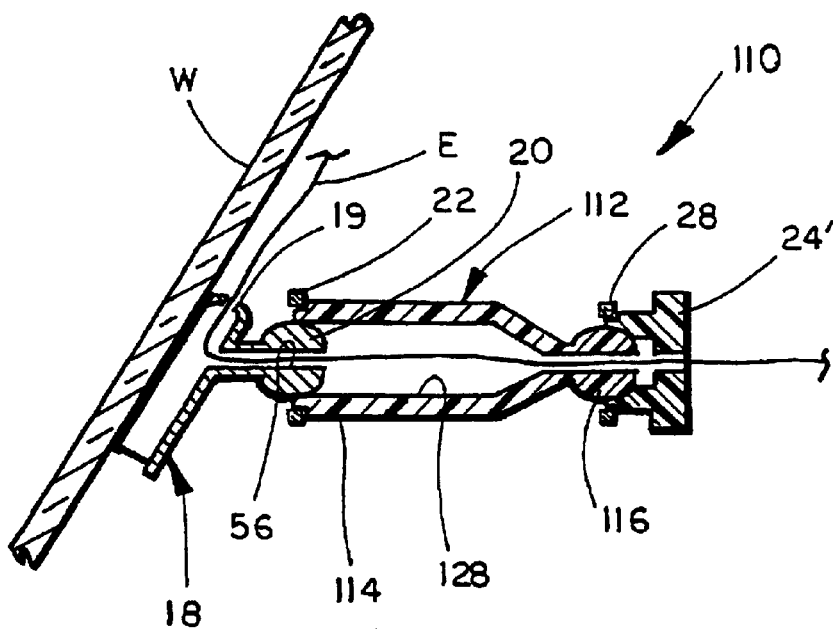
FIG. 14 is a schematic sectional view of the rearview mirror support of FIGS. 9 and 10 illustrating the internal electrical wire channel therethrough.

As is best seen in FIG. 3, sleeve 12 is preferably molded in one piece from a resinous polymeric material to provide strength and rigidity such as glass filled nylon (preferably comprising within the range of between about 5 and 30 percent glass), glass filled polypropylene (preferably comprising within the range of between about 5 and 30 percent glass), and Delrin acetal. Sleeve 12 is preferably tubular and generally cylindrical in shape and has a central axis A extending through a central passageway 30 which communicates with conically shaped end openings 32, 34 at the opposite ends of the sleeve. As shown in FIG. 4, passageway 30 may be formed with two conically shaped sections each joining the other at the midpoint of the sleeve with each section narrowing from its respective opening to the mid section. The exterior surface of sleeve 12 includes generally cylindrical sockets 14, 16 of a predetermined exterior diameter and a recessed central section 36 having a series of preferably four longitudinally extending strengthening ribs 38 extending parallel to central axis A. At a position proximate the end edge of each conically shaped opening 32, 34, on the exterior surface of each respective socket 14, 16, is a recessed external, spring-receiving surface 40, 42, respectively, which is preferably annular and is adapted to receive an annular spring member such as split ring 22 or 28 mentioned above. On the interior of each socket member 14, 16, is a partially spherical surface 44, 46 which may optionally include an annular raised rib or ridge 48, 50 in order to increase the frictional resistance to movement when a ball pivot member such as that shown in phantom at 26 in FIG. 4 is received in the socket.

Preferably, each socket 14, 16 also includes a series of preferably eight slots 52, 54 extending inwardly from the outer edges of end openings 32, 34 in a direction parallel to central axis A, as is best seen in FIG. 3. Slots 52, 54 allow the individual segments or flanges 55, 57 at the ends of sockets 14, 16 which are separated by such slots to flex outwardly to receive pivot ball member 20 or 26 and to flex inwardly under the tight engagement of annular spring member 22, 28 to retain the ball pivot member in the socket and to tightly engage the socket with the ball member for proper frictional resistance to pivotal movement.

Preferably, annular spring members 22, 28 are received on annular surfaces 40, 42 after ball pivot members 20, 26 on adjacent components of the rearview mirror assembly are pressed into sockets 14, 16, respectively. Spring members 22, 28 can be flat, round or circular in section and are preferably circular in overall shape, although spring members having a polygonal shape, such as hexagonal, or other shapes could also be used. Preferably, each spring member is split and has a predetermined compression force which acts on the ends of the socket flanges between slots 52, 54 when the split ring is received thereover. Preferably, split ring spring members 22, 28 are formed from metal including steel, or a polymeric material such as nylon, glass-filled nylon, acetal, or ABS plastic. A suitable spring is a clamp ring formed from rounded edge, flat, low carbon steel wire (SAE 1075 steel) obtained from Grand Rapids Spring and Stamp Company of Grand Rapids, Mich., under Part No. 4000573.

When ball pivot members 20, 26 are of the same size or diameter, sockets 14, 16 are identical in size and split rings 22, 28 will be identical. However, sockets 14, 16 may be of different sizes with one being oversized to provide additional surface area to frictionally resist pivotal movement for support of heavier rearview mirror assemblies, if desired. Likewise, the materials of sleeve 12 and ball pivot members 20, 26 may be altered to increase or decrease the torque force or frictional resistance to pivotal movement as desired for support of the rearview mirror assembly in question, while the socket size may also be determined for an interference fit with the ball size. In addition, the surfaces 44, 46 of sockets 14, 16 and the exterior surfaces of the ball pivot members 20, 26 may be altered for enhanced frictional resistance to movement of the ball pivot member when received in the socket, such as by providing a plurality of micro protrusions on either the socket surface 44, 46 or the exterior surface of the ball pivot member itself. In addition, ball pivot members 20, 26 may be either formed from metal, such as die cast zinc or sintered powdered metal, or molded from a resinous polymeric material, such as nylon, glass-filled nylon, ABS plastic, or glass-filled polypropylene, and formed integrally with either mounting member 18 or toggle actuator 24 from a day/night rearview mirror assembly. When ball pivot members 20, 26 are molded with their respective rearview mirror assembly components, they may be color matched to the color of sleeve 12 such that all three are black or another desired color or substantially similar color such as gray, tan, brown, burgundy, green, or other colors, thereby obviating the need for painting any of these components. Avoiding the painting step not only reduces cost for manufacture of the present rearview mirror support, but reduces the risk of damage to the support during manufacture, shipping, or installation, thereby reducing the number of assemblies which must be discarded or scrapped. Likewise, mounting member 18, toggle actuator 24 as well as any rearview mirror housing in which the toggle actuator is mounted, such as housings 84 or 210 described below, may each be molded from a resinous polymeric material of a desired color, and color matched to sleeve 12 and ball pivot members 20, 26 such that all are black or another desired color or substantially similar color such as those mentioned above, or others. Alternately, if desired, one, two or more of these various components may be molded or formed from polymeric material of a color or colors different from one or more of the remaining components. For example, the mounting member 18, support or sleeve 12 and rearview mirror housing 84 or 210 can be tan while ball pivot members 20, 26 and toggle actuator 24 can be black or burgundy. Alternately, as a further example, mounting member 18 and sleeve 12 can be tan while the remaining components are brown, or black or another color. Further, each component may be molded from a polymeric material having a color different from each other component. Alternately, the sleeve may be coated and/or decorated during or after molding as desired. Use of split spring members 22, 28 also allows the rearview mirror support 10 to be disassembled for repair or service as desired by removing the split ring and withdrawing the ball pivot members 20 and 26 from their respective sockets for repair or replacement.

As will also be understood from FIGS. 4 and 5, ball pivot members 20, 26 may include apertures 56, 58 extending therethrough which communicate not only with passageway 30 extending through sleeve 12 but also the interior of the rearview mirror assembly through toggle actuator 24 and through the interior of mounting member or channel mount 18. Thus, one or more electrical conductors or wires E (FIG. 5) can be extended from the vehicle electrical system downwardly from the interior header or roof area of the vehicle along windshield W to opening 19 in the upper end of mounting member 18 (FIGS. 2 and 5) through mounting member 18, aperture 56, passageway 30 and aperture 58 to the interior of the rearview mirror assembly being supported for supplying electricity to one or more electrical components secured within the mirror assembly. It will, therefore, be understood that rearview mirror support 10 defines an internal electrical wire or conductor channel which is concealed from the exterior of the support while confining and protecting the electrical conductors therein even while ball pivot members 20, 26 are pivoted for adjustment of the position of the rearview mirror assembly.

Alternately, sleeve 12 may include one or more brass, metallic, or other electrically conductive electrical bus bars 59 which, preferably, are insert molded within the sleeve to extend from one end to the other either internally or externally (FIG. 4). Such bus bars preferably would have a surface 59a exposed at each end of sleeve 12 for connection to another component of the rearview mirror assembly, or to an electrical connector and wire/conductor to provide electricity through the sleeve.

With reference to FIG. 6, an alternate embodiment 10' of the rearview mirror support is shown which is similar in substantially all respects to embodiment 10 and wherein like numerals indicated like parts. However, support 10' includes a modified sleeve 12' which is tubular but has differing cross sections at the central and end portions. More specifically, sleeve 12' includes a central section 60 having a lateral exterior dimension of a predetermined size measured transverse to the central axis which is preferably larger than that of sleeve 12 and provides an interior space 61 which may be used to house or support other vehicle accessories as described below. In addition, sleeve 12' includes recessed opposing ends 62, 64 which may be of the same or differing lateral exterior dimension as compared to one another. Preferably, sleeve 12' is circular in section such that the dimensions of sections 60, 62, and 64 are diameters. Alternately, the sleeve may have varying sectional shapes such as triangular, square, pentagonal, hexagonal, octagonal or the like. In addition, as shown in phantom in FIG. 6, the inside dimensions of the sockets at either end may extend substantially continuously across the entire length of sleeve 12' such that the walls of central section 60 are thicker than recessed sections 62, 64 for added strength and rigidity such that internal passageway 30 is substantially uniform across the entire length of sleeve 12'. As mentioned above, the materials from which sleeve 12' is preferably molded may be selected to enhance the rigidity, natural resiliency and/or strength of the sleeve member as desired.

Support 10 or 10' also provides a suitable support area to which other vehicle accessories may be attached or secured such as microphones, camera systems, antennas, cell phone connections or plugs, magneto/compasses, theft alarm systems, headlight dimming sensors, rain sensor systems, and other electronic equipment. As shown in FIG. 6, a vehicle accessory 70 may be mounted or secured within interior area 61 of central section 60. For example, a radio or cell phone antenna, one of various sensors, a video accessory or another electrical accessory could be included. Suitable video accessories, which could be used with the supports of the present invention, are disclosed in copending, commonly owned, U.S. provisional applications entitled "VIDEO MIRROR SYSTEMS INCORPORATING AN ACCESSORY MODULE", Ser. No. 60/243,986, filed Oct. 27, 2000 "VIDEO MIRROR SYSTEMS, Ser. No. 60/238,483, filed Oct. 6, 2000 "VIDEO MIRROR SYSTEMS", Ser. No. 60/237,077, filed Sep. 29, 2000; "VIDEO MIRROR SYSTEMS", Ser. No. 60/234,412, filed Sep. 21, 2000 "INTERIOR REARVIEW MIRROR ASSEMBLY INCORPORATING A VIDEO SCREEN", Ser. No. 60/218,336, filed Jul. 14, 2000; and "INTERIOR REARVIEW MIRROR ASSEMBLY INCORPORATING A VIDEO SCREEN", Ser. No. 60/186,520, filed Mar. 2, 2000, which were consolidated into one application and have now issued as U.S. Pat. No. 6,690,268, the disclosure of which are hereby incorporated by reference herein.

As shown in FIGS. 7 and 8, a further modified embodiment 80 of the rearview mirror support is shown wherein like numerals indicate like parts to those in embodiments 10 and 10'. In embodiment 80, a rearview mirror assembly 82 including a molded resinous plastic housing 84 of a desired color includes a rear surface 86 through which extends a generally spherical ball pivot member 88 projecting outwardly from a toggle actuator similar to that shown at 24 in embodiments 10 and 10' which is pivotally mounted within the housing. A modified sleeve 90 is included in the rearview mirror support for rearview mirror assembly 82 and includes sockets 92, 94 which are substantially similar to sockets 14, 16 described above. In this case, however, sleeve 90 includes a curved or bent central section 96 such that the central axis of sockets 92, 94 extend at an obtuse angle to one another. Accordingly, when socket 92 receives ball pivot member 100 from mounting member/channel mount 98 therein, and ball pivot member 88 is received in socket 94 with split rings 22, 28 received over sockets 92, 94 for retention of the ball pivot member therein as explained above for embodiments 10 and 10', socket 92 will extend parallel to the support for ball pivot member 100 on mounting member 98 while rearview mirror assembly 82 will be supported in an upright, cantilevered position for viewing by the driver of the vehicle on ball pivot member 88 taking into account the angle of incline of the windshield from which mounting member 98 is supported. Like sleeve 12, 12', sleeve 90 may be solid or include an internal passageway for electrical conductors, or include integral, molded in or other electrical bus bars.

Referring now to FIGS. 9–14, a fourth embodiment 110 of the rearview mirror support is shown wherein like numerals indicate like parts to those set forth in embodiments 10, 10' and 80. Support 110 includes a hollow, substantially continuous sleeve 112 preferably molded from the same resinous polymeric materials set forth above for embodiment 10 and includes a socket 114 at its forward end and a partially spherical exterior surface 116 at its opposite rearward end forming a ball pivot member. Socket 114 is substantially similar in all respects to sockets 14 and 16 described above and is adapted to receive ball pivot member 20 formed integrally with mounting member/channel mount 18 therein with split ring 22 received over socket 14 for retention of the ball pivot member therein in the manner described above. Ball pivot member 116 is adapted to be received in a socket 122 formed integrally with a modified toggle actuator 24'. Socket 122 is similar in all respects to sockets 14, 16 described above and receives a split ring 28 thereover for retention of ball pivot member 116 within the socket. Sleeve 112 includes a center or intermediate section 124 which is conically shaped and extends from a first diameter at the inside end of socket 114 to a smaller diameter at ball pivot member 116 as is best seen in FIGS. 10–13. A series of gussets or ribs 126 may be included between socket 114 and central section 124 for added strength. A through passageway 128 extends from the opening at ball pivot member 116 through the entire length of sleeve 112 to the opening at socket 114 for receipt of electrical wires or conductors in the manner described above and as shown in FIG. 14. In this regard, the electrical conductors E will pass through passageway 128 from a through aperture in toggle actuator 24' into passageway 56 in mounting member 18 and out of the mounting member through opening 19 to the vehicle electrical system in the manner described above. Alternately, molded in electrical bus bars may be included in sleeve 112. Accordingly, in its various embodiments, the sleeve of the rearview mirror support invention herein my include sockets or a socket and ball member on opposite ends or combinations thereof as desired for the particular rearview mirror assembly to be supported.

Figure 15:
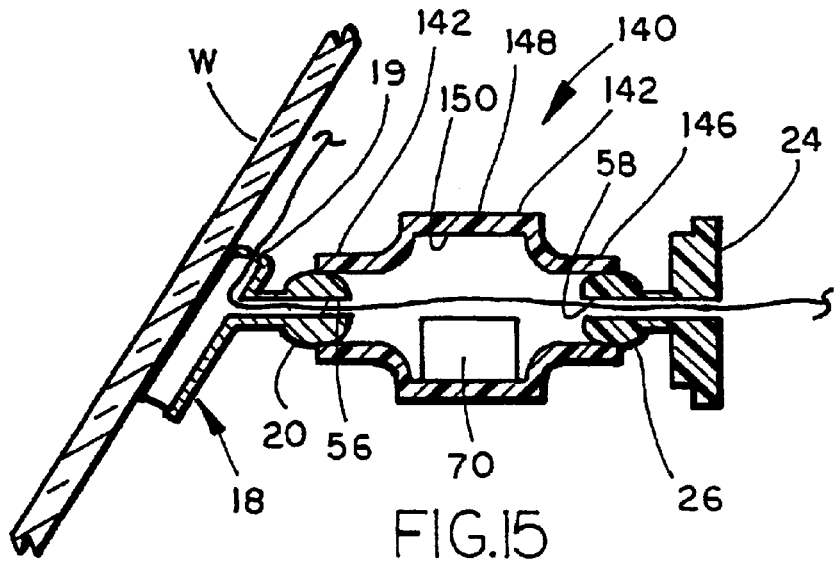
FIG. 15 is a modified form of the rearview mirror support of FIGS. 1, 2 5 and 6 also illustrating the internal electrical wire channel therethrough.

As shown in FIG. 15, a fifth embodiment 140 of the rearview mirror support of the present invention is shown wherein like parts are indicated by like numerals to those described above in connection with previous embodiments. Support 140 includes a modified continuous sleeve 142 similar to sleeve 12' described above in connection with embodiment 10' but eliminating the annular surfaces on the exterior of end sections 144, 146 and eliminating the use of an external spring member or split ring as in the previous embodiments. Sleeve 142 includes a central section 148 having a predetermined diameter with end sections 142, 146 having reduced diameters. Each end section 142, 146 includes a socket of the type shown in FIG. 16 for receiving a ball pivot member such as 20 or 26 therein but without the need for a split ring or annular spring member therearound for retention purposes. In this regard, the material of sleeve 142 is selected to be sufficiently stiff but naturally resilient to allow the pivot ball member to be pressed into the partially spherical surfaces 143, 147 formed within the sockets for retention of the ball pivot members and providing sufficient frictional resistance to pivotal movement for proper retention of rearview mirror assemblies thereby. Sleeve 142 includes a central passageway 150 therein through which an electrical conductor or wire E may be passed from mounting member 18 and ball pivot member 20 to ball pivot member 26 and toggle actuator 24 to the interior of the supported rearview mirror assembly in the manner described above. Alternately, sleeve 142 may include electrical bus bars which preferably are molded in the sleeve.

The interior area of central section 148 which defines a portion of passageway 150 may also house or support a vehicle accessory 70 as described above in support 10' of FIG. 6.

Figure 16:
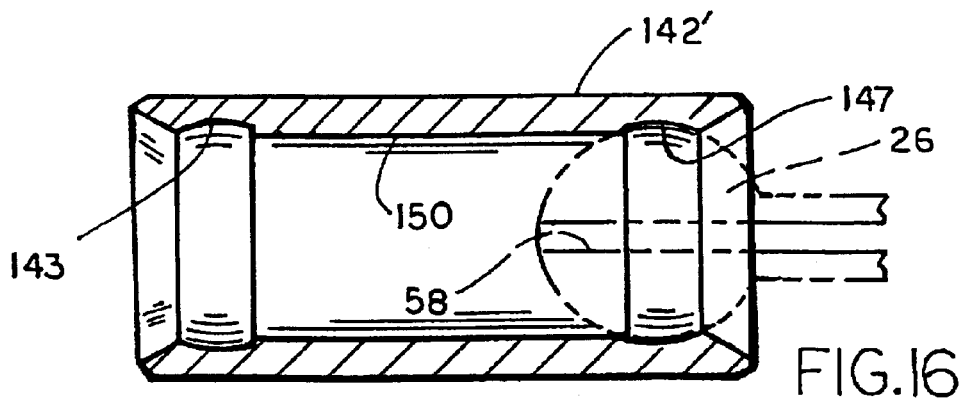
FIG. 16 is a sectional side elevation of yet another embodiment of the support sleeve for use in a rearview mirror support of the present invention.

As shown in FIG. 16, an alternate version 142' of sleeve 142 is substantially cylindrical and tubular in form and includes a substantially rectilinear inner passageway 150' in which socket surfaces 143, 147 are formed in the manner described above. Again, the material, wall thickness, shape and overall size of the sleeve are selected to provide the proper frictional resistance to pivotal movement and support for the rearview mirror assembly as needed.

In any of the support embodiments, described herein, sleeve 12, 12', 90, 112, 142 or 142' may also be solid with the passageway 30, 128, 150 therethrough eliminated. In such case, sockets in one or both ends such as at 14, 16, or ball pivot surfaces such as that at 116 at one or both ends, or a socket at one end and a ball pivot surface at the other end, may be included. When sockets are included in the solid support, they preferably would include internal spherical surfaces such as 44, 46, and may optionally include external spring members 22, 28, slots 52, 54, flanges 55, 57, and conical openings 32, 34.

As shown in FIG. 46, a further embodiment 600 of the rearview mirror support (that is preferably formed of a polymeric resin such as by injection molding) of the present invention is shown including a modified continuous sleeve 602 including a socket 604 adjacent one end for receiving a ball pivot member preferably compression fitted therein for an interference fit within the socket as described above, and a socket 606 at the other end for similarly receiving a ball pivot member from a rearview mirror assembly component as shown in phantom. Preferably, as shown in FIG. 46, sockets 604, 606 each have a cross-sectional shape which is slightly different from that of a generally spherical ball pivot member. The diameter of sleeve 602 at left end 602*a* is larger than the diameter of end 602*b* such that that the wall thickness of the tube adjacent socket 604 is greater than the wall thickness adjacent socket 606. This provides a difference in torque or frictional resistance to pivotal movement of the ball member based on an interference fit between the ball pivot member received in socket 604 and that received in socket 606. Assuming end 602*a* of the sleeve 602 is mounted closer to the windshield when the support is used in a vehicle, the wall thickness will be greater adjacent the windshield to provide a greater torque for the ball pivot member received in socket 604 than that received in socket 606. Accordingly, adjustment of the ball pivot member in socket 606 is easier than that for socket 604 thereby preventing undesired adjustment of the major position of sleeve 602 at the windshield end when the rearview mirror assembly is adjusted by means of the ball pivot member received in socket 606.

Another way of achieving a desired pivotal resistance and adjustment torque is through the provision of textured ball pivot members and/or socket surfaces having a textured functionality such as by having textures, stipples or protrusions therein. For example, as shown in FIG. 47, a molded plastic sleeve 610, such as any of those described above, may include sockets 612, 614 at opposite ends, each socket including a saw tooth surface comprising small, rigid, upstanding ridges or sharp protrusions. The pivot ball member 616 adapted to be received within socket 612 or 614 has a corresponding saw tooth surface as shown in FIGS. 47 and 47A. Each ridge or protrusion preferably has a height of from about 0.0001 to about 0.05 inches; more preferably from about 0.005 to about 0.01 inches; most preferably from about 0.001 to about 0.005 inches.

Alternately, as shown in FIGS. 48 and 48A, a modified rearview mirror support sleeve 610' may include sockets 612' and 614', each of which includes a pair of spaced, annular ridges or sharp projections 618. In this version, a ball pivot member 616' includes cross hatching on its surface as best seen in FIG. 48A for mating with the sharp protrusions 618 to provide greater resistance to pivotal movement of the ball member within the socket as desired. In this embodiment, annular ridges 618 preferably have a height of from about 0.005 to about 0.01 inches; most preferably from about 0.001 to about 0.005 inches.

As shown in FIGS. 49 and 49A, yet another version of rearview mirror support sleeve 610" includes sockets 612" and 614" each of which includes annular recesses 622 therein adapted to mate with small protrusions or micro texturing of the surface of ball pivot member 624. Once again, receipt of the protrusions on ball pivot 624 in the recesses 622 of socket 612", 614" provides increased frictional resistance to pivotal movement of the ball member in the socket. The amount of resistance is dependent upon the size of the protrusions or micro protrusions and recesses formed on the ball member and in the sockets. Preferably, the protrusions have a height of from about 0.005 to about 0.01 inches; most preferably from about 0.001 to about 0.005 inches, and a diameter or width in the range of from about 0.0005 to about 0.01 inches, and are spaced apart by a distance in the range of from about 0.0005 to about 0.01 inches.

The above techniques for modifying and adjusting the frictional resistance to pivotal movement of the ball pivot members in the sockets of the rearview mirror support sleeves may be used in any of the embodiments of the support sleeve described herein. Preferably, the torque or frictional resistance to pivotal movement at the end of the support sleeve at the windshield or channel mount end of the sleeve is higher than the frictional resistance to pivotal movement at the end adjacent the rearview mirror assembly. For example, the ratio of the torque at the windshield or channel mount end to the torque at the mirror assembly end is preferably at least about 2 to 1, and more preferably at least about 3 to 1. The desired torque ranges for the windshield/channel mount end are in the range of about 0.8 to about 3.6 Newton-meters. For the mirror assembly end of the sleeve, the desired torque range is from about 0.6 to about 3.2 Newton-meters. The channel mount or windshield end preferably has a minimum of 0.11 Newton-meter greater torque than the mirror assembly end. The difference in torque allows adjustment of the ball pivot member at the mirror assembly end without necessarily adjusting the position of the channel mount or windshield end of the sleeve.

Other methods for increasing or decreasing the frictional resistance to pivotal movement in the interference fit between the ball pivot member and sockets of the sleeves of the present invention are by providing one or both surfaces with different materials such as co-injected materials, or by providing coatings such as a grease coating or titanium nitride coating for modifying the frictional resistance to pivotal movement.

As an example, the rearview mirror support sleeve or tube may be an extruded tube from Ultraform H4320 or Ultraform N2320003, available from BASF of Mount Olive, N.J., which comprises a nylon resin material. Other polymeric (including copolymer) materials can be used, including those with additives included. Through the addition of additives to such materials, the smoothness of the material can be reduced. Acetals which are smooth and self lubricating, may also be used to form the mirror support sleeve. Alternately, the tube may be formed from polypropylene or a polyphenylene oxide (PPO). Further, the tube may be extruded from a material such as Delrin available from I.E. DuPont of Wilmington, Del., that comprises an acetal resin material.

Figure 50:
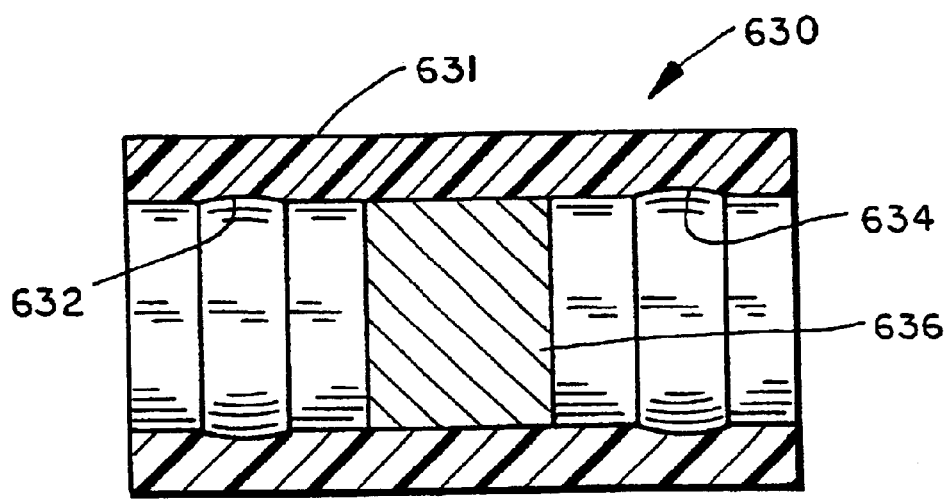
FIG. 50 is a sectional side elevation of a modified form of the support sleeve for use in a rearview mirror support of the present invention including a vibration dampening member therein.

With reference to FIG. 50, a further embodiment 630 of the rearview mirror support of the present invention includes a molded plastic, rectilinear, cylindrical sleeve or tube 631 having a socket 632 at the windshield or channel mount end and a socket 634 at the mirror assembly end. Sockets 632, 634 are designed to receive ball pivot members therein with an interference fit and a desired frictional resistance to pivotal movement using one or more of the methods described above. In addition, sleeve 631 includes a vibration reducing or dampening element inserted or incorporated in the tube such as a cork, foam (such as polystyrene foam), thermoplastic elastomer, or urethane dampening plug or member 636 press-fitted within the inner diameter of the tube or adhered therein centrally between sockets 632, 634 with a suitable adhesive and/or mechanically. Alternately, dampening member 636 could be co-injected with sleeve 631 from the same or a different material rather than separately formed and inserted into the tube after formation of the tube.

Support 631 is adapted to provide improved vibration performance. For example, the natural frequency of the mirror assembly to be supported is preferably either less than or greater than the natural frequency of the overall vehicle in which it is mounted. As an example, the natural vibration frequency of a vehicle traveling down a highway is often within the range of between about 40 hertz to 50 hertz. If the natural frequency of the mirror assembly is different than that of the vehicle, the mirror assembly will not vibrate in unison with the vehicle. Preferably, the mirror assembly has a higher frequency, such as at least in the range of between about 50 hertz to 60 hertz, preferably greater than 60 hertz, more preferably greater than 80 hertz, and most preferably greater than 100 hertz. However, with the provision of a dampener 636 in sleeve 631, vibration is reduced due to the inclusion of the vibration absorbing material.

Figure 52:
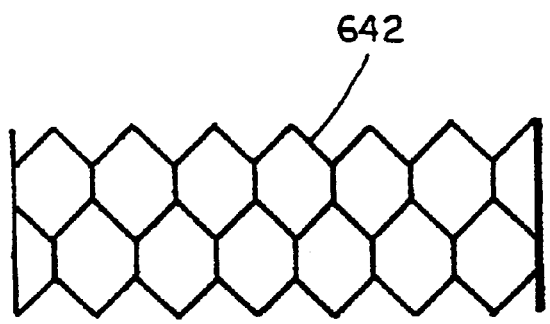
FIG. 52 is a side elevation of an insert included in the support sleeve of FIG. 51.
Figure 53:
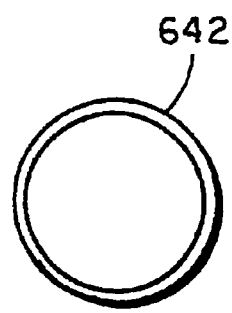
FIG. 53 is an end elevation of the insert shown in FIG. 52.
Figure 51:
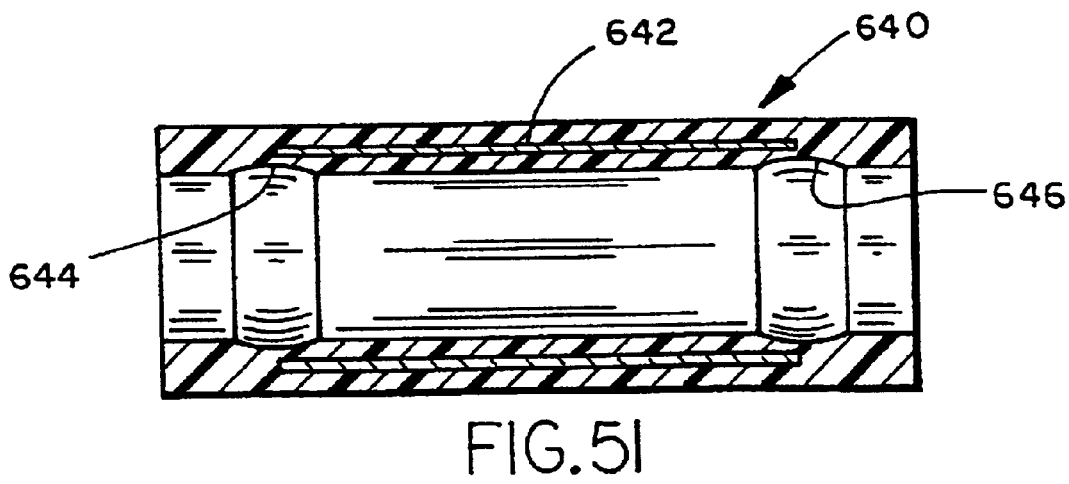
FIG. 51 is a sectional side elevation of yet another embodiment of the support sleeve for use in a rearview mirror support of the present invention.
Figure 60:
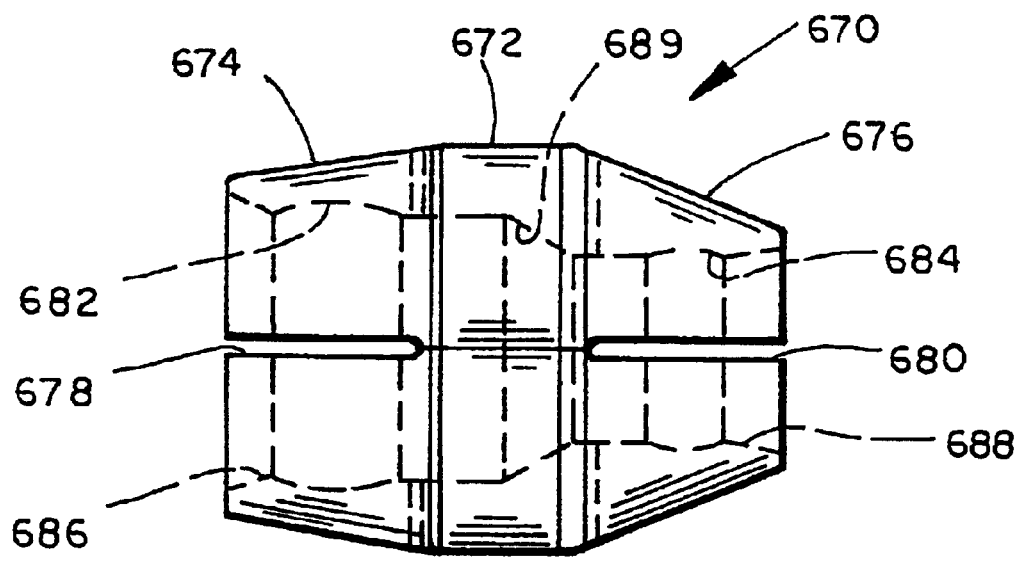
FIG. 60 is a side elevation of the support sleeve of FIGS. 58 and 59.
Figure 61:
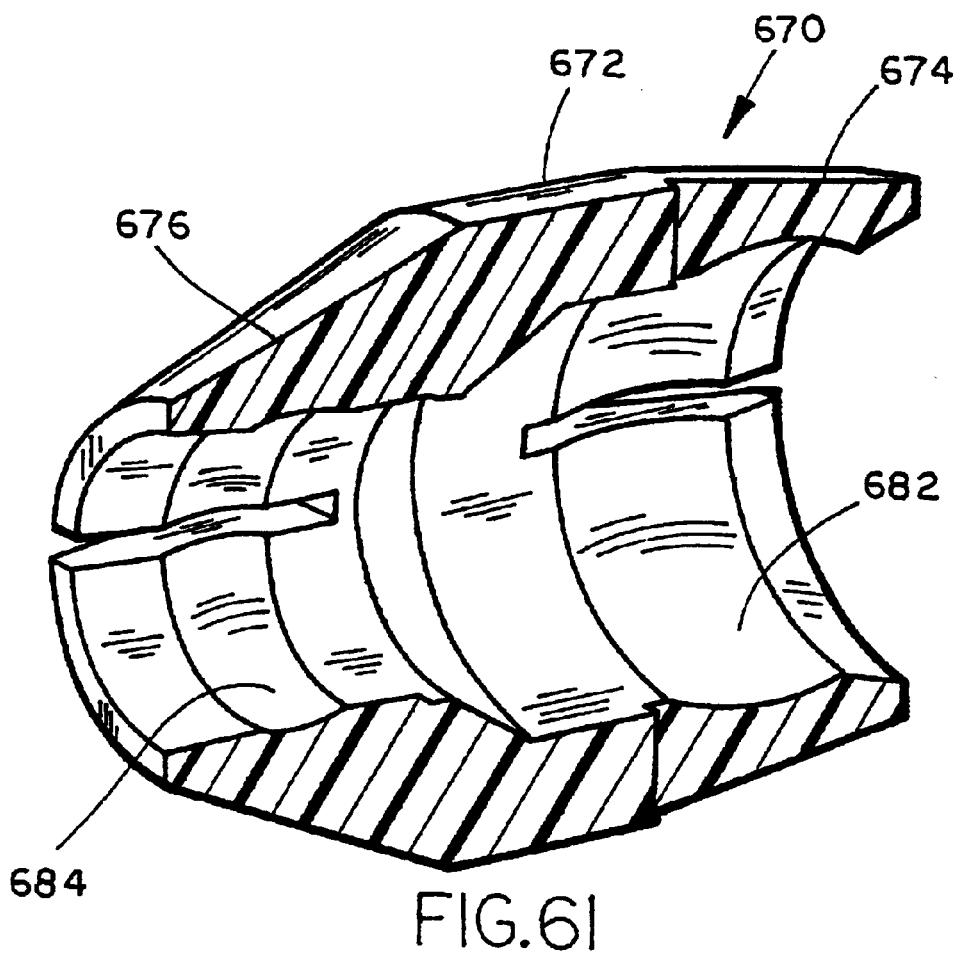
FIG. 61 is a perspective sectional view of the support sleeve of FIGS. 58–60.

Alternately, the stiffness of the rearview mirror support can be increased thereby reducing vibration by including metal or other inserts molded within the support sleeve. As shown in FIGS. 51, 52 and 53, a molded plastic rearview mirror support sleeve 640 similar to the support sleeves described above, may include a metallic, cylindrical honeycomb sleeve 642 insert molded centrally within the wall of the tube as shown in FIG. 51. In this example, honeycomb sleeve 642 has a length sufficient to extend from approximately the midpoint of socket 644 to the midpoint of socket 646 along the central portion of sleeve 640. Alternately, insert 642 may be formed from magnesium, zinc, steel or the like and may be solid or have an open, framework design. Molded in inserts such as the honeycomb insert 642 dampen the amplitude of the vibration of the sleeve. For a given frequency, reduction in the amplitude causes the vibration to be less noticeable. In addition, the sleeve itself may be formed from an engineered material such as mineral filled resin, including mineral filled nylon having a filler of glass or carbon.

An alternate form of the rearview mirror support sleeve is shown at 650 in FIGS. 54–57. Like sleeve 640, sleeve 650 is a molded plastic tube which incorporates an insert 652 molded therein and formed from metallic or other rods having a generally cylindrical shape as shown in FIG. 57. Insert 652 may be made from steel, brass, aluminum, magnesium or zinc and includes a plurality of longitudinally extending rods 654 secured such as by welding to annular rings 656 at opposite ends of the rods 654. Like the other sleeves described above, support 650 includes sockets 658, 659 at opposite ends thereof for receipt of ball pivot members with an interference fit. Insert ring 656 at either end are positioned adjacent the ends of the sleeve outward of the sockets 658, 659 in order to help retain ball pivot members within the sockets when fitted therein.

With reference to FIGS. 58–61, yet another embodiment 670 of the rearview mirror or vehicle accessory support sleeve of the present invention is shown. Sleeve 670 is preferably molded from a polymeric material such as those described above, including polybutylene terepthalate (PBT), calcium carbonate polypropylene or polypropylene. Sleeve 670 is molded in one piece and includes a center section 672 having a cylindrical outer surface, a windshield or channel mount end 674 having a conical outer surface, and a tapered mirror assembly end 676 also having a conical outer surface having a taper which is larger than that for section 674. Conical, tapered end section 674 includes plurality of four axially extending slots 678 spaced equidistantly therearound, while conical end 676 includes four equidistantly spaced slots 680. Just as in other embodiments of the support sleeve, slots 678, 680 divide conical sections 674, 676 into segments or flanges which can individually flex and pivot to allow the compression fitting therein of ball pivot members for an interference fit in sockets 682, 684, respectively. As in other sleeve embodiments, the inside diameter of the end openings 686, 688, are flared or tapered outwardly to facilitate compression fitting of the ball pivot members within the sockets. As will be best seen in FIGS. 59–61, sleeve 670 includes an internal passageway 689 extending between sockets 682, 684 having a varied diameter which reduces from the size of the larger socket 682 to that of the smaller socket 684. Socket 682 is adapted to receive a larger pivot ball member from a channel mount or header mount at the windshield end of the sleeve while smaller socket 684 is adapted to receive a smaller ball pivot member projecting outwardly from the back of a rearview mirror assembly. The larger size of socket 682, receiving the correspondingly larger sized ball pivot member, provides a greater frictional resistance to pivotal movement than does the smaller socket 684, thereby allowing adjustment of the mirror assembly in socket 684 without changing the position of the sleeve on the ball pivot member received in the windshield end of the sleeve, and also enabling support of heavier, more complex rearview mirror assemblies.

Any of the materials described above can be used for sleeve 670 which is preferably molded in one piece. The continuous internal passageway 689 allows the passage of electrical wiring therethrough as in other embodiments of the sleeve for connection to electrical accessories within the mirror assembly from the electrical wiring of the vehicle on which it is mounted. By changing the length of slots 678, 680, in addition to selecting the material of the sleeve 670, the clamping force on each of the pivot ball members received in sockets 682, 684 maybe adjusted as desired. The oversized central section 672 intermediate conical sections 674, 676 increases the overall stiffness of the sleeve to help reduce vibration amplitude and increase vibration performance.

As shown in FIG. 98, any of the above-described rearview mirror supports such as those of embodiments 10, 10', 80, 110, 140, 142', 600, 610, 610', 610", 630, 640, 650 or 670 may include an integral wire-way or wiring conduit (such as an integral electrical wiring or cable housing) thereon as shown in embodiment 1000 of the rearview mirror support. In this version, embodiment 1000 includes a mirror support arm of the type described above herein extending between a ball pivot joint 1002 at the interior end 1004 (i.e. closest to windshield 1009) of a mirror mount 1006 adapted to be removably mounted on mirror mounting button 1008 on the interior surface of windshield 1009. The opposite end of mirror support arm 1000 includes or receives a ball pivot member 1010 allowing a rearview mirror assembly 1012 similar to those described above to be adjustably mounted at the interior end of support arm 1000. Support arm 1000 is preferably hollow and includes a pair of sockets at opposite ends as described above or, alternately, a socket and a formed ball member thereon also as described above. In either case, the exterior surface of the support arm includes an elongated, hollow cable-way or housing 1014 attached to the exterior of the support arm or integrally molded therewith. As shown in FIG. 98, electrical wiring E from a conventional wire harness in a vehicle extends downwardly from the roof or header area at the top of the windshield to the position of the mirror mount 1006 and along the exterior of the mirror mount to the location of an electrical connector 1016. A separate cable or electrical wire 1018 extends from an electronic circuit board within rearview mirror assembly 1012 out of the rear of the mirror housing through the hollow cableway or housing 1014 to connector 1016 where it is joined to the electrical system of the vehicle for operation of the electrical circuit board 1022, electrochromic rearview mirror element 1024, and any other electrical accessories within the mirror assembly. Alternately, wires E and 1018 could also extend through mount 1006 and/or pivot joints 1002, 1010 as described above, as well as through housing 1014. Thus, housing 1014 shields, hides from view, protects and locates the electrical wiring therewithin along the exterior of the mirror support arm and provides a location for convenient connection to the electrical system of the vehicle.

As shown in FIG. 99, where like numerals indicate like parts to those in FIG. 98, a modified form of the mirror support arm 1000' may also include an integral, hollow cable housing or cableway 1014'. In this version, mirror support arm 1000' is of the type including ball pivot members 1002' and 1010' inserted within the opposing ends of the hollow tube forming the support arm, which tube ends are crimped or formed over against the ball members to retain them therein. A spring 1020 is included on the interior of the support arm between the ball pivot members to urge them outwardly against the crimped ends of the tube so that the ball members will have a sufficient frictional resistance to pivotal movement. Cable/wire housing 1014' shields, guides and locates the electrical wiring extending therethrough in the same manner as described above for housing 1014.

Note that the integral wire-way of the present invention (such as cable/wire housing 1014 or 1014') can be, preferably, molded integrally with the injection molding of a polymeric mirror support arm (or the hollow tube thereof). Optionally, this integral wire-way can be molded of a different polymeric resin than that of the mirror support arm (such as, for example, molding the wire-way housing from polypropylene resin and molding the support arm from acetal or filled-nylon, preferably in a co-injection molding operation). Also, the wire-way housing can include a flap element that comprises a living hinge, as known in the polymer design arts, allowing the integral cableway housing to be opened along its length along the mirror support arm, and allowing the wiring/cables to be inserted, and then closing the flap portion of the housing along and around the wiring/cable (preferably, with a mechanical snap-closure, that is reopenable should it be desired to remove the wiring/cabling).

Alternately, a wiring/cabling receiving trough or recess can be molded along the length of a polymeric mirror support arm that is adapted to receive wiring/cabling, and a separate cover element (preferably molded of a thermoplastic polymer resin such as polypropylene or polyethylene) can be provided that attaches (such as by detachable snaps or similar mechanical fasteners) to the mirror support arm in order to further retain the wires/cables in the trough/recess, and to at least substantially hide them from view.

Thus, and referring to FIG. 100 a mirror support arm 2000 of the type described above herein extends between a ball pivot joint 2002 at the interior end 2004 (i.e., closest to the windshield 2009) of a mirror mount 2006 adapted to be removably mounted on mirror mounting button 2008 on the interior surface of windshield 2009. Support arm 2000 typically will be solid and molded from resinous polymeric material. The opposite end of mirror support arm 2000 includes or receives a ball pivot member 2010 allowing a rearview mirror assembly 2012 similar to those described above to be adjustably mounted at the interior end of support arm 2000. Support arm 2000 preferably includes a pair of sockets at opposite ends as described above, or alternately, a socket and a formed ball member thereon also as described above. In either case, the exterior surface of the support arm includes an elongated trough or recess 2015 molded in support 2000, defined by side walls and a bottom surface, and into which an electrical cable or wire 2018 is fitted. An elongated, hollow cableway, wire cover, or housing 2014 is removably attached to the exterior of the support arm over recess 2015. Wire cover 2014 includes a snap fastener 2011 on one edge extending along and attaching to one edge of recess 2015, and another snap fastener 2012 on its opposite edge extending along and attaching to the opposing edge of recess 2015. Cover 2014 may thus be snap fitted over recess 2015 after wiring 2018 is placed in the trough and removed as desired for repair and the like. Alternately, cover 2014 may be pivotally attached over trough 2015 such as by a living hinge as described above.

As also shown in FIG. 100, electrical wiring 2018 from a conventional wire harness E in a vehicle extends downwardly from the roof or header area at the top of the windshield to the position of the mirror mount 2006 and along the exterior of the mirror mount, into trough 2015, and into the back of rearview mirror assembly 2012 through the hollow cableway or housing 2014 to a connector 2016 inside mirror assembly 2012 for connection to electronic circuit board 2020, electrochromic rearview mirror element 2022, and/or other electrical accessories. Housing 2014 is fitted over recess 2015 and shields, hides from view, protects and locates the electrical wiring therewithin along the exterior of the mirror support arm, and may also provide a location for convenient connection to the electrical system of the vehicle.

Figure 17:
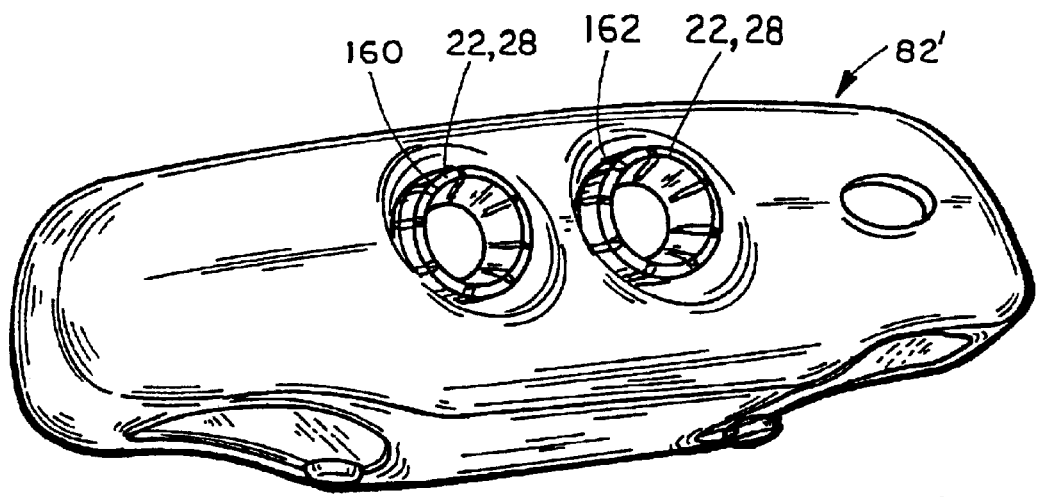
FIG. 17 is a rear perspective view of a rearview mirror housing incorporating a pair of ball pivot sockets for receiving a pair of rearview mirror supports for supporting the housing on a vehicle.
Figure 18:
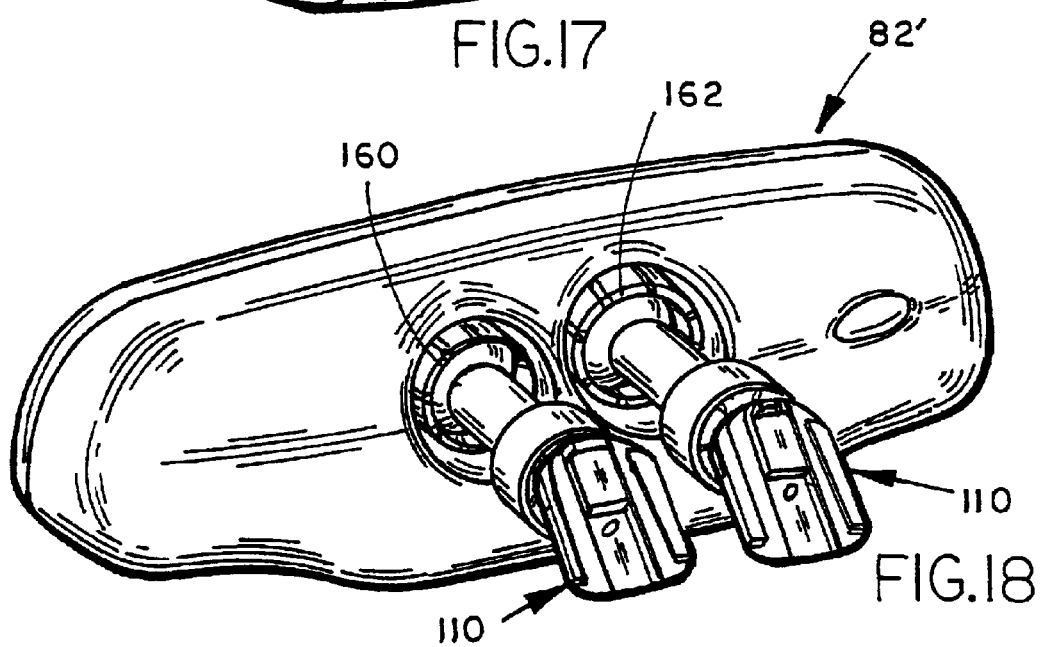
FIG. 18 is a rear perspective view of the mirror housing of FIG. 17 incorporating a pair of rearview mirror supports thereon in side-by-side fashion.

With reference to FIGS. 17 and 18, a plurality of rearview mirror supports such as those described above in embodiments 10, 10', 80, 110, 140, 142', 600, 610, 610', 610", 630, 640, 650, 670, 1000, 1000' or 2000 may be used to support a rearview mirror assembly. As shown in FIG. 17, a modified rearview mirror assembly 82' may include a pair of horizontally aligned, side-by-side molded polymeric sockets, each of which is substantially similar to sockets 14, 16 described above. Sockets 160, 162 are each adapted to receive an annular spring member such as split ring 22 or 28 as shown in FIG. 18. Each socket 160, 162 is adapted to receive the ball pivot member 116 of a rearview mirror support 110 therein after which split rings 22 or 28 are assembled over the sockets to retain the ball members therein. Rearview mirror supports 110 are then each secured to a suitable attachment member mounted side-by-side on an interior windshield surface for increased support of the rearview mirror assembly 82' which may include a number of electrical or other added-feature components therein increasing its weight over conventionally known rearview mirror assemblies. The dual support provided by the pair of rearview mirror supports 110 increases vibration performance and stability of the overall assembly as compared to single rearview mirror support assemblies.

Figure 19:
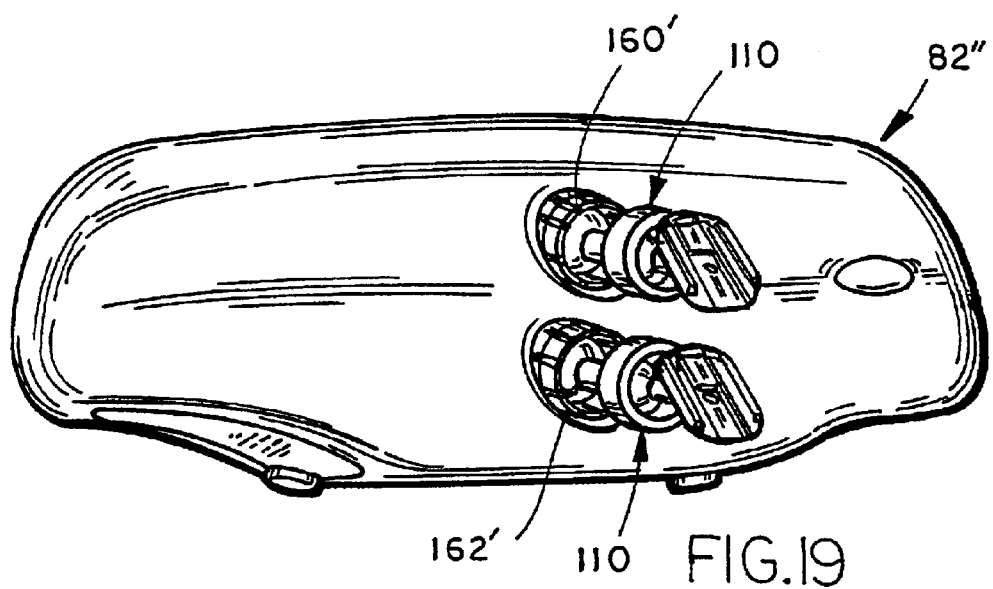
FIG. 19 is a modified version of the rearview mirror housing and support assemblies shown in FIGS. 17 and 18 incorporating a pair of rearview mirror supports in over/under configuration.

As shown in FIG. 19, a further modified rearview mirror assembly 82" may likewise include a pair of rearview mirror supports 110 for supporting the assembly on the interior surface of a windshield in the manner described above. However, in mirror assembly 82", the sockets 160', 162' are vertically aligned and positioned over and under one another on the rear surface of the mirror housing. As in embodiment 82', however, each socket is adapted to receive a rearview mirror support 110 in the manner described above for combined support of the overall assembly.

Figure 20:
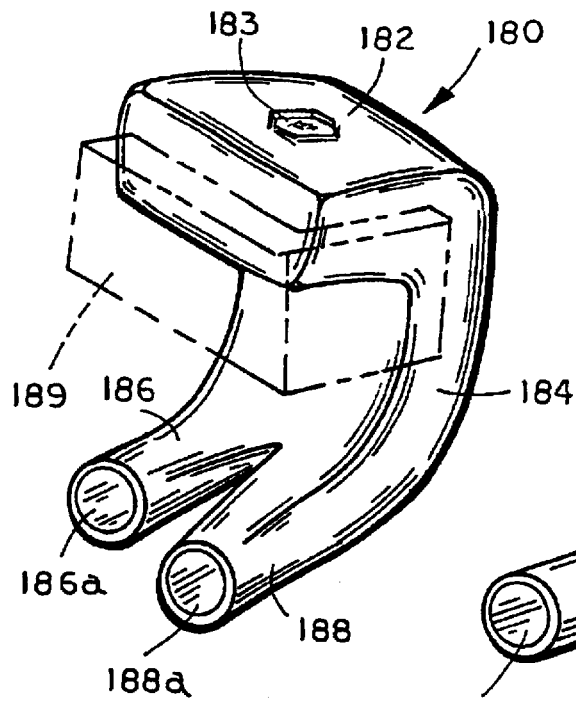
FIG. 20 is a perspective view of a modified form of rearview mirror support adapted for use with a rearview mirror housing of the type shown in FIGS. 17 and 18.

As shown in FIG. 20, a modified rearview mirror support 180 suitable for use with the side-by-side sockets 160, 162 of rearview mirror assembly 82' in FIGS. 17 and 18 is illustrated. Support 180 is a rigid mirror stay adapted to be secured to the header area of the interior of a vehicle above the upper edge of the front windshield by a mounting recess 183 in mounting section 182. Rigid support section 184 extends downwardly along the interior surface of the windshield and curves rearwardly into the passenger compartment and diverges into a pair of rearview mirror support arms 186, 188 positioned side-by-side with one another. Each support arm 186, 188 includes a socket 186a, 188a of the type described above at 14, 16 and wherein rearview mirror assembly 82' would include outwardly projecting ball pivot members instead of sockets. Alternately, arms 186, 188 could include ball pivot members thereon in side-by-side position for insertion in sockets 160, 162 for appropriate pivotal adjustment. Mounting section 182 is suitable for receipt of other accessories for use in the vehicles such as that shown in phantom at 189 representing a pod for mounting a clock or other instrument for viewing by the driver or other occupant of the vehicle passenger compartment.

Figure 21:
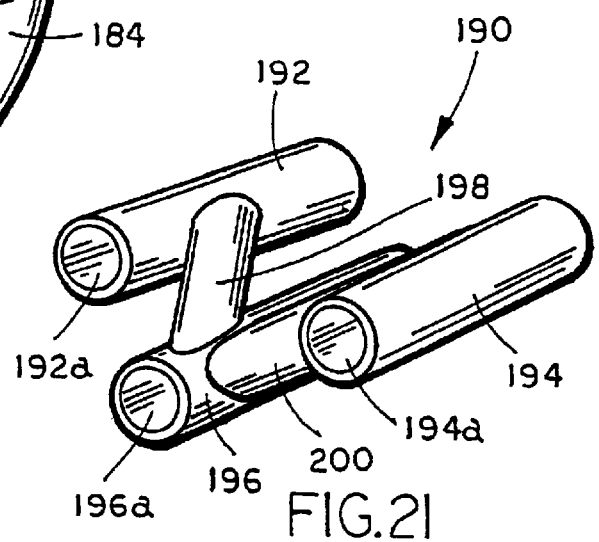
FIG. 21 is a perspective view of a modified rearview mirror support incorporating three sockets for ball pivot members on the rearview mirror housing.

As shown in FIG. 21, a further embodiment 190 of a mirror stay for supporting a rearview mirror assembly such as that shown at 82' or 82" is illustrated. Mirror support or stay 190 includes three support arms or sleeves 192, 194 and 196 which are rigidly joined together by connecting arms 198, 200. Arms 192, 194 are substantially similar in length, while arm 196 is shorter than arms 192, 194. At the forward end of each arm 192, 194, 196 is either a socket 192a, 194a, 196a or a ball pivot member for attachment to the rear surface of a rearview mirror assembly such as that shown at 82, 82' or 82" for proper pivotal adjustment with increased stability and vibrational support. The opposite ends of each of the arms 192, 194 include sockets for receipt of ball pivot members from two separate mounting members or channel mounts such as that shown at 18 adapted to be secured to the interior surface of a windshield. Accordingly, the present invention encompasses the support of a rearview mirror assembly by one or a plurality of rearview mirror supports for increased vibration performance and stability.

With reference to FIGS. 62–72, a further embodiment 700 of a molded plastic mirror stay adapted for slidable mounting on a conventional, windshield mounted attachment member or button and incorporating a socket for receiving a compression fitted, interference mounted ball pivot member from a rearview mirror or other vehicular accessory is illustrated. Mirror stay 700 is preferably molded in one piece from a resinous, polymeric material such as acetal, nylon or a similar engineering polymer, and includes a body 702 having a top surface 704, side surfaces 706, 708, a rear surface 710 facing the interior of the vehicle on which the stay 700 is mounted, a bottom surface 711, and a conical, tapered socket portion 712 adapted to receive a ball pivot member therein via compression or press fitting.

On the forward facing or non-exposed surface intermediate the top surface 704 and sides 706, 708 is a breakaway type, mounting portion 714 adapted to slidably receive a windshield attachment member or button. As is best seen in FIGS. 63 and 65–69, mounting portion or area 714 includes a pair of spaced, opposed side flanges 716, 718 having inclined windshield button engaging surfaces 720, 722. As shown in FIG. 65, flanges 716, 718 taper toward one another in the direction toward top surface 704 while inclined button engaging surfaces 720, 722 taper toward one another as they extend toward the opening therebetween as shown in FIG. 69. The result is a button receiving pocket having a double tapered configuration for tightly and securely receiving the double tapered, wedge shaped windshield button B in a wedge type, interference fit. In order to securely retain the stay 700 on button B when mounted, stay 700 also includes a latch beam member 724 providing an installation tab which extends in cantilevered fashion from the top end 704 of stay 700 downwardly in a direction generally parallel to the outwardly facing rear surface 710 but spaced therefrom as shown in FIGS. 66 and 67. Latch member 724 includes a thicker body portion 726 for providing rigidity and strength which extends into a thinner button engaging securing portion 728 terminating in a shoulder or ledge 730 which engages the bottom end of the windshield button B when fully received in the stay. The lower edge of latch member 724 includes an inclined surface 732 for engaging and camming latch member 724 toward rear wall 710 during installation. At the opposite end of latch member 724, a top wall 734 defines a stop preventing the stay from sliding downwardly off the windshield button. The exposed surface of latch member 724 includes a pair of surfaces 736, 738 which are non-parallel to one another and extend at a slight angle toward apex 740 for engaging and applying a force normal to the engaged surface of the windshield button for secure retention of the button therein. As such, latch member 724 acts as a cantilever type leaf spring firmly holding the button therein between inclined surfaces 720, 722.

Stay 700 also includes a pair of slots 742, 744 in top surface 704 adjacent top wall 734 which enables flanges 716, 718 to flex away from windshield button B upon the application of sufficient force such that the stay will break away and fall from windshield button B upon impact such as during an accident to facilitate injury prevention.

Alternate forms of the breakaway side flanges are shown in FIGS. 70–72. In FIG. 70, side flanges 716a, 718a are formed to include flexibility enhancing elements such as recesses or notches 746, 748 which allow the sides flanges to flex away from the latch member 724 at specified conditions of force input upon impact. Alternately, as shown in FIG. 71, side flanges 716b, 718b may include outer notches 750, 752 providing the side flanges with the ability to flex and allow breakaway action from the windshield button upon specified conditions of force input. Finally, as another alternative in FIG. 72, side flanges 716c, 718c may include notched outer walls having notches 754, 756 allowing the walls or flanges to flex for breakaway action as described above.

In any of the versions of stay 700 described above, a tapered, conical ball member receiving socket 712 is provided including tapered, conical outer surface 758 and an inner passageway 760 which extends entirely through stay 700 to allow the passage of electrical wires or the like to the rearview mirror assembly from the vehicle electrical system. Formed near the outer end of passage 760 is an annular ball socket 762 (FIG. 66) which extends continuously around the interior of four cantilevered ball member engaging flanges or prongs 764. Flanges 764 are defined by axially extending slots 766 at four places, the slots extending generally parallel to the axis of passageway 760. The flanges 764 provide a normal force for friction on the ball pivot member when snap fitted or press fitted therein. The length of the slots can be changed and defined to provide a desired clamping force, the force decreasing as the length of the slots increases. Further, socket 762 is undercut to provide positive engagement of the ball member in the socket during snap in assembly and to prevent pull out.

As shown in FIGS. 73–77, an alternate embodiment 780 of a molded plastic mirror stay including a molded socket for receiving a pivot ball member from a rearview mirror assembly is shown. Stay 780 is adapted for mounting to the header portion or interior roof of a vehicle typically adjacent the upper edge of the windshield and is preferably molded in one piece from a resinous, polymeric material such as acetal, glass and/or mineral-filled nylon, filled polypropylene or a similar engineering polymer of a desired color, and includes a header mounting portion 782, an elongated curved support shaft 784 and a socket portion 786 formed at the free end of the shaft portion. Mounting portion 782 includes an elongated body 788 including a plurality of mounting apertures 790 and a pair of opposed, side recesses 792 adapted to receive spring mounting clips from a mounting bracket secured to the header or roof portion of a vehicle generally above the windshield area. Shaft 784 extends in one piece from the lower edge of mounting body 788 and curves downwardly to a position from which socket portion 786 extends downwardly, preferably at an angle of approximately 100 to 150 degrees to mounting body 788. Socket portion 786 includes a socket 794 formed integrally therein to receive a pivot ball member from the rear, larger side of the socket over which a spring or other retainer member may be mounted.

In order to reduce vibration and provide sufficient support and stiffness for the stay 780, a metallic or other rigid insert 796 (FIG. 77) may be integrally molded within the body of the stay 780 as shown in FIG. 76 such that it extends from header mounting portion 782 through the center of shaft 784 to the position of socket portion 786. Insert 796 includes an enlarged portion 798 received in header mounting portion 782 and shaft reinforcing portion 799 received in shaft 784. Accordingly, reinforcing member 796 provides stiffness and strength for stay 780 when it is mounted to the header above a windshield such that shaft curves downwardly along the inside surface of the windshield to a position from which a rearview mirror or other vehicle accessory may be supported via a ball pivot member received in socket portion 786 thereby reducing vibration and providing a more stable support for the mirror assembly.

Figure 78:
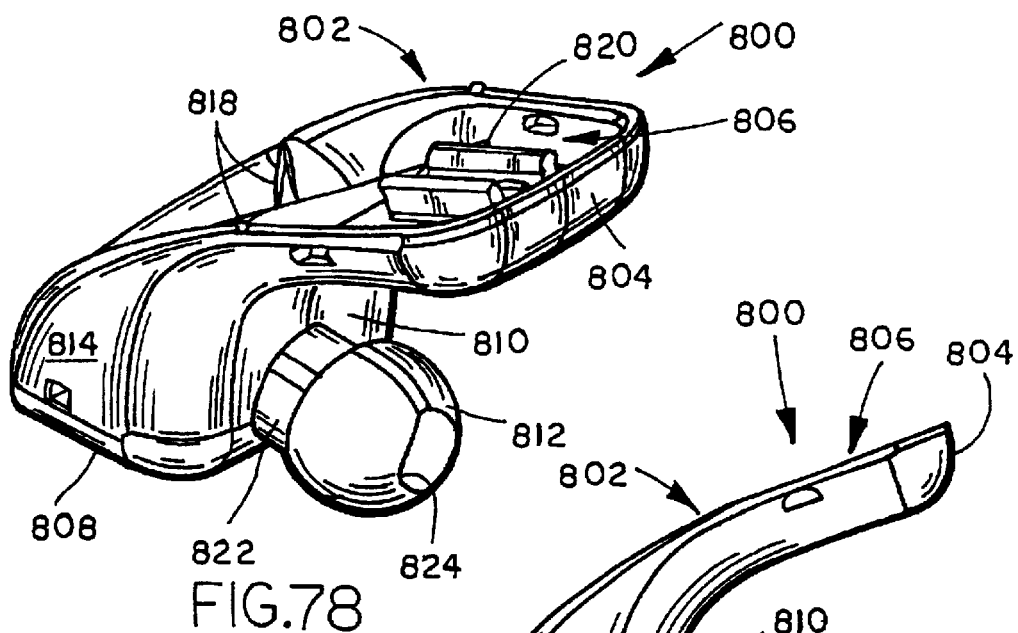
FIG. 78 is a perspective view of a yet further embodiment of a stay of the present invention for supporting a rearview mirror assembly or other vehicle accessory.
Figure 79:
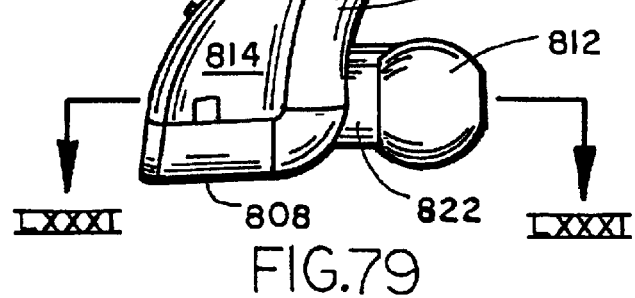
FIG. 79 is a side elevation of the stay of FIG. 78.
Figure 81:
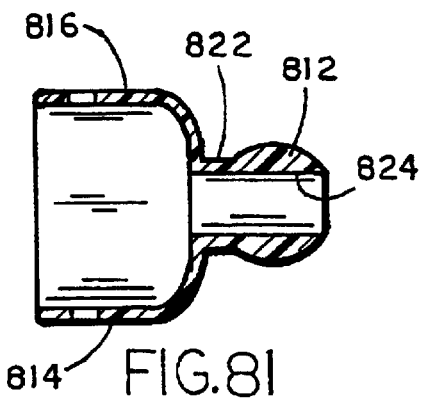
FIG. 81 is a sectional view of the stay taken along plane LXXXI—LXXXI of FIG. 79.
Figure 80:
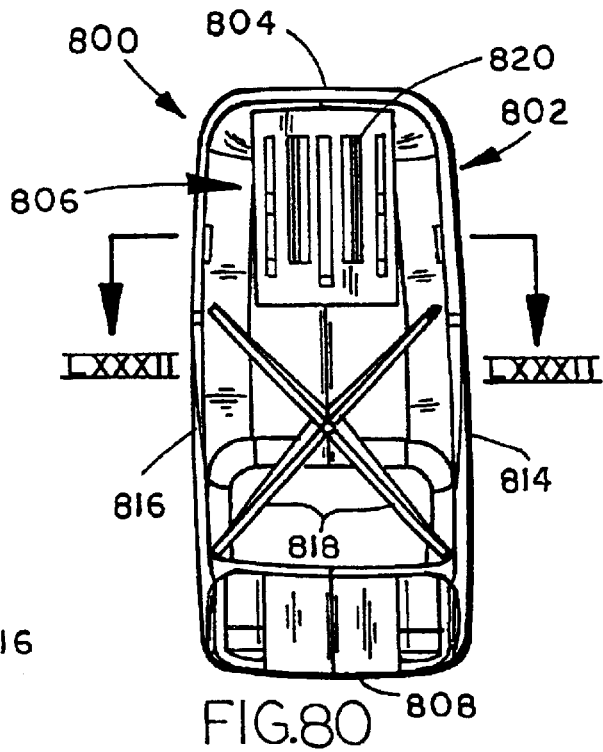
FIG. 80 is a rear elevation of the stay of FIG. 78.
Figure 82:
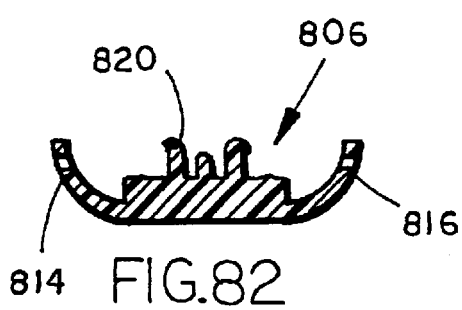
FIG. 82 is a sectional view of the stay taken along plane LXXXII—LXXXII of FIG. 80.

An alternate embodiment 800 of the mirror stay of the present invention is shown in FIGS. 78–82. Mirror stay 800, like mirror stays 700 and 780 is preferably molded in one piece from a resinous, polymeric material such as acetal, glass and/or mineral-filled nylon, filled polypropylene or a similar engineering polymer, and includes a body portion 802 having a top end 804 adjacent a mounting portion 806. Body 802 curves downwardly to a bottom 808 adjacent a ball member support area 810 from which molded pivot ball member 812 extends rearwardly into the passenger compartment of the vehicle when the stay is mounted on or adjacent a vehicle windshield. Body portion 802 also includes sides 814, 816 which, together with top 804 and bottom 808 define a hollow interior which extends forwardly toward the windshield of the vehicle and in which reinforcing ribs 818 are integrally molded for stiffness and support. Within the hollow interior adjacent top 804 and intermediate sides 814, 816 are a series of molded resilient, flexible flanges 820 forming a mount adapted to be secured in a corresponding bracket or mount secured to the vehicle adjacent the windshield. Mounting flanges 820 are of the type shown and described in (insert reference to prior Donnelly or DML patent or application), the description of which is hereby incorporated by reference herein. As is best seen in FIGS. 79, 81 and 82, ball member 812 extends rearwardly from section 810 into the passenger compartment of the vehicle and includes a spherical ball pivot member spaced outwardly from the body of the mirror stay by neck 822. Accordingly, when mounted on or adjacent the windshield, stay 800 extends downwardly along the windshield and provides ball member 812 in position for receipt in a corresponding socket of a rearview mirror assembly to provide adjustment of the mirror assembly for use by the driver of the vehicle. As shown in FIGS. 78 and 81, a passageway 824 may be provided through ball member 812 and neck 822 into the hollow interior of the mirror stay for receipt of electrical wires from the vehicle electrical system leading into the rearview mirror assembly for electrical accessories mounted therein.

As shown in FIGS. 22–24, another form of rearview mirror housing 210 is shown of the type useful with the rearview mirror supports of the present invention as described above. Rearview mirror housing 210 is molded from a resinous plastic material of a desired color such as nylon (glass-filled or unfilled), ABS plastic, or polypropylene (glass-filled or unfilled) and includes a rear housing member 212 and a front bezel or rim 214 adapted to retain a prismatic or other reflective mirror element therein and a day/night toggle actuator, or alternately an electrochromic reflective mirror element when assembled. Mirror housing 210 is adapted to support a four microphone sensor array in which four microphone sensors 216, 218, 220 and 222 are supported within the rear housing portion adjacent the bottom wall of the housing to which access is provided by acoustic porting formed in the mirror housing itself. Specifically, microphone 216 is acoustically accessed through a front acoustic port 216*a* molded through the front surface of bezel/rim 214 and a rear acoustic port 216*b* molded through either the bottom wall of rear housing portion 212 or the bottom wall of bezel 214 or a combination thereof. Hence, rearview mirror housing 210 is provided with a pair of acoustic ports through which sound waves may pass for each microphone sensor mounted within the assembly via porting which is integrally formed upon molding of the mirror housing. Suitable microphone/sound processing systems which may be used with housing 210 include commonly owned, copending, U.S. patents or patent applications Ser. No. 09/382,720, filed Aug. 25, 1999, entitled ACCESSORY MODULE FOR VEHICLE, now U.S. Pat. No. 6,243,003; Ser. No. 09/396,179, filed Sep. 14, 1999, entitled INDICATOR FOR VEHICLE ACCESSORY, now U.S. Pat. No. 6,278,377; and Ser. No. 09/466,010, filed Dec. 17, 1999, entitled INTERIOR REARVIEW MIRROR SOUND PROCESSING SYSTEM, now U.S. Pat. No. 6,420,975, the disclosures of which are hereby incorporated by reference herein.

As will be understood, a wide variety of other rearview mirror assemblies incorporating a wide range of prismatic and electro-optic reflective mirror elements and other electrical components, instruments and displays may be supported with the supports of the present invention. Exemplary is that shown in U.S. patent application Ser. No. 09/244,726, filed Feb. 5, 1999, entitled REARVIEW MIRROR ASSEMBLY INCORPORATING INFORMATION DISPLAY, now U.S. Pat. No. 6,172,613, the disclosure of which is hereby incorporated by reference herein. Such rearview mirror assemblies are often heavier than prior assemblies and benefit from the increased stability and vibration performance provided by the support of the present invention.

Referring now to FIGS. 25–25D, a first embodiment 240 of a vehicle accessory mounting member or channel mount is shown which is adapted to support any one of the rearview mirror supports described above. Mounting member 240 may be formed from metal such as die cast zinc or sintered metal, but preferably is molded from a polymeric resinous material of a desired color such as an engineering plastic including nylon (glass-filled or unfilled), ABS plastic, or polypropylene (glass-filled or unfilled). As above, mounting member 240 may be color matched to one or more of the other components of the rearview mirror assembly. Mounting member 240 is adapted to slidably engage an attachment member or windshield button of the conventional wedge-shaped, double tapered type such as that shown in FIGS. 44 and 44A, or any of those set forth in FIGS. 30–43A or 45 and 45A herein. Mounting member 240 includes a mounting body 242 having an overall wedge shape and including a top end 244, bottom end 246, and opposing sides 248, 250. On the front surface 252, a mounting arm 254 is centrally located at a position approximately one-half of the distance between top end 244 and bottom 246 such that it is generally centered with respect to the position of a windshield mount attaching member B when received between shoulders 260, 262 on rear surface 258 as described below, and extends outwardly at an acute angle to top end 244, projects upwardly away from bottom end 246 and terminates in a spherically-shaped ball pivot member 256. Ball pivot member 256 may be oversized as compared to conventional ball pivot members in rearview mirror supports to provide a larger surface area engaging a corresponding socket for increased frictional resistance to pivoting and thus enable support of heavier and/or larger rearview mirror assemblies. For example, the diameter of an oversized ball pivot member 256 is at least approximately 15.34 millimeters (mm).

At the outer edges of generally planar rear surface 258 are a pair of integral elongated shoulders or receiving members 260, 262 which are joined at their upper ends by top shoulder 264 forming a generally U-shaped wall around the periphery of the rear surface 258. Receiving members 260, 262 include slide surfaces 265, 266 adapted to engage the outer edges of the windshield mounted attaching member or button B such as that shown in FIGS. 25D, 44 and 44A. Surfaces 265, 266 are non-parallel, extend away from one another, and are spaced closest adjacent top end 244 of the mounting member and spaced farthest at the bottom, terminal ends of receiving members 260, 262 adjacent bottom end 246. In addition, surfaces 265, 266 are inclined inwardly toward one another such that a pocket or space adjacent rear surface 258 is formed having a double tapered shape as shown in FIGS. 25B and 25D. A screw receiving aperture 268 extends from front surface 252 through mounting member 242 and opens at rear surface 258 to receive a set screw or retainer 270 to securely attach and retain mounting member 240 to button B when slidably mounted thereon. Screw receiving aperture 268 is positioned between the lower periphery of support arm 254 and bottom surface 246 and is closer to that bottom surface than screw apertures in conventionally known mounting members. The positioning of support arm 254 at the central position of front surface 252 and generally centered with respect to windshield mounted attaching member B on the rear surface 258 and farther from top end 244 than in conventionally known mounting members provides more secure attachment of the rearview mirror support to the windshield surface by reducing the tensile force imparted at the top or uppermost portion of the windshield button B thereby reducing the stress on the adhesive relied upon to secure the attachment member or button to the windshield surface. In addition, the positioning of set screw 270 closer to the bottom end 246 provides more secure attachment to the windshield button by preventing rocking motion of member 240 on the attachment member. Member 240 is assembled on the windshield button by positioning the rear surface 258 adjacent the top end of the wedge-shaped button B with its edges adjacent slide surfaces 264, 266, and sliding the mounting member downwardly over the button after it is attached to the windshield surface until it is firmly seated between receiving members 260, 262 in the manner shown in FIG. 25B. Thereafter, set screw 270 is tightened to secure and retain the mounting member in place.

As shown in FIGS. 26–26D, a second embodiment 275 of the vehicle accessory mounting member of the present invention is illustrated. Like mounting member 240, member 275 includes a metal or plastic mounting body 276 having a top end 278, bottom end 280, opposing sides 282, 284 and front surface 286 from which mounting arm 288 extends from a centrally located position at an upward angle terminating in spherical ball pivot member 290. As above, ball pivot member 290 is preferably oversized for enhanced frictional resistance to movement of a support including a corresponding socket. A U-shaped, upstanding wall 292 extends around the periphery of generally planar rear surface 294 opening adjacent bottom end 280. Instead of non-parallel, inwardly tapered slide surfaces on a wall 290 as in mounting member 240, member 275 includes a pair of non-parallel, elongated slots 296, 298 which receive elongated spring members 300, 302. Slots 296, 298 have their top ends which are adjacent top end 278 closer than their bottom ends which are adjacent bottom end 280. In addition, as will be seen from FIGS. 26B and 26D, the inside surfaces of the spring members which project outwardly beyond rear surface 294 define slide surfaces 300a, 302a which extend inwardly toward one another to form a tapered pocket which receives the correspondingly tapered side surfaces of a wedge-shaped attaching member or windshield button B in the same manner as described above for embodiment 240. In addition, however, the resiliency of the spring members 300, 302 allows them to flex outwardly while being retained in slots 296, 298 by inwardly extending upper flanges 300b, 302b to resiliently and firmly engage the opposing side surfaces of the attachment member on the windshield. When the rearview mirror support or mounting member 275 is impacted, however, the resiliency of spring members 300, 302 allows the entire mounting member and supported rearview mirror to release and break away from the windshield mounted button to prevent injury.

With reference to FIGS. 26E and 26F, a modified, third embodiment 275' of the vehicle accessory mounting member of the present invention is shown. Like mounting member 275, mounting member 275' includes a metal or plastic mounting body 276', top end 278', bottom end 280', opposing sides 282' and 284', and front surface 286' from which mounting arm 288' extends from a centrally located position at an upward angle terminating in spherical ball pivot member 290' which is preferably oversized as described above. A U-shaped, upstanding wall 295' extends around the periphery of a generally planar rear surface 294' opening adjacent bottom end 280. A pair of non-parallel, elongated slots 296', 298' are included which receive a one-piece, elongated spring member 300' having a back member 301 and upstanding spring flanges 303, 305 which project through slots 296', 298'. Like spring members 300, 302 in embodiment 275, the inside surfaces of spring members 303, 305 which project outwardly beyond rear surface 294' define slide surfaces 303a, 305a which extend inwardly toward one another to form a tapered pocket which receives the correspondingly tapered side surfaces of a wedge shaped attaching member or windshield button B in the same manner as described above for embodiments 240 and 275. In addition, the resiliency of spring members 303, 305 allows them to flex outwardly while being retained in slots 296', 298' by means of back member 301 to resiliently and firmly engage the opposing side surfaces of the attachment member on the windshield. In addition, mounting member 275 includes a mirror reflector vibration reducing/dampening element such as a thin foam, rubber or other resilient pad 306 or layer which covers at least a portion of (and preferably substantially the entirety of) the planar surface 294' and forms a cushion between the windshield attachment member or button and the surface 294' when the mount 275' is mounted on the windshield button. Pad 306 is preferably adhered to surface 294' with a suitable adhesive and serves to cushion contact with the windshield button and dampen any vibration which might be transmitted therethrough. Alternately, pad 306 may be formed integrally with mirror mount 275 in the event the mount is injection molded, the cushioning pad being co-injected from a softer material adapted to dampen vibration between the mirror mount and the windshield button.

Figures 27, 27A:
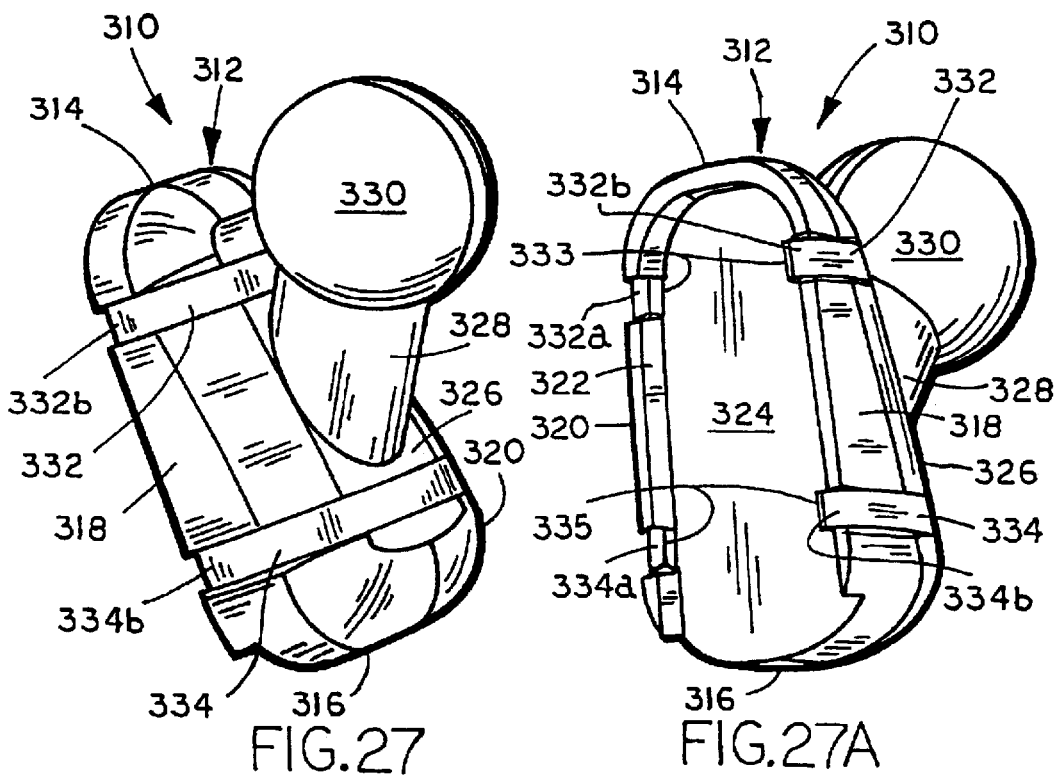
FIG. 27 is a front perspective view of a fourth embodiment of a vehicle accessory mounting member of the present invention.
FIG. 27A is a rear perspective view of the mounting member of FIG. 27.

A fourth embodiment 310 of the vehicle accessory-mounting member of the present invention is shown in FIGS. 27 and 27A. Mounting member 310 includes mounting body 312 having top end 314, bottom end 316, opposing sides 318, 320 and a U-shaped, upstanding wall 322 extending around the periphery of generally planar rear surface 324. A mounting arm 328 extends upwardly at an angle from the center position of front surface 326 in the same manner as support arms 254 and 288 of mounting members 240 and 275. Mounting arm 328 terminates in a spherical ball pivot member 330 for receipt in a rearview mirror support as described above. As above, ball pivot member 330 may be oversized or conventionally sized. Mounting member 310 is retained on a wedge-shaped, double tapered attaching member or windshield button B (FIGS. 44, 44A) by a pair of U-shaped spring bands 332, 334 which are recessed within front surface 326 and extend around sides 318, 320, each spring band includes a pair of free end edges 332a, 332b and 334a, 334b which project outwardly from rear surface 324 through openings in peripheral wall 320. The inside surfaces 333, 335 of these free ends define slide surfaces adapted to resiliently engage the opposing, tapered side surfaces of a wedge-shaped attaching member or windshield button B (FIGS. 44, 44A) in the same manner as surfaces 300a, 302a.

When member 310, or the rearview mirror support or rearview mirror assembly supported thereby, is impacted, the resiliency of spring bands 332, 334 allows those free ends 332a, 332b, 334a, 334b and slide surfaces 333, 335 to release and break away from the attaching member to prevent injury.

Referring now to FIGS. 28–28E, a fifth embodiment 340 of the vehicle accessory mounting member of the present invention is illustrated. Mounting member 340 includes a mounting body 342 again formed from die cast or sintered metal or molded polymeric resinous material and includes a top end 344, bottom end 346, opposing sides 348, 350, and a contoured, raised front surface from which mounting arm 354 extends at an upward angle from a centrally located position midway between the top and bottom ends and terminates in a spherical ball pivot member 356 which may be oversized as desired. A pair of non-parallel, elongated shoulders or receiving members 360, 362 extend outwardly away from one another toward the bottom end 346 in the same manner as for mounting member 240, and define slide surfaces 364, 366 for receiving a wedge-shaped windshield button B as shown in FIGS. 28D and 28E. Slide surfaces 364, 366 are tapered inwardly toward one another and further include reduced thickness areas 368, 370 providing frangible portions adapted to fracture upon application of a sufficient force to the mounting member or rearview mirror assembly such that the mounting member will be released from the windshield mounted attachment member or button upon fracture of the shoulders or receiving members 360, 362. A fastener receiving aperture 372 extends through the body 342 from front surface 352 to the rear surface 358 to receive a fastener such as a set screw adjacent the bottom end of the mounting member for secure retention of the mounting member on the attachment member until fracture of receiving members 360, 362 occurs upon impact. As shown in FIGS. 28 and 28B openings 374 are provided through top end 344 such that electrical conductors or wires may be received therethrough for passage through the mounting member, a rearview mirror support mounted thereon, and into the supported rearview assembly as described above.

With reference to FIGS. 83–85, a sixth embodiment 850 of the vehicle accessory mounting member of the present invention is shown. Mounting member 850 is similar to mounting member 340 except that it is preferably molded in one piece from a resinous, polymeric material such as acetal, glass and/or mineral-filled nylon, filled polypropylene or a similar engineering polymer but does not include frangible side surfaces which breakaway to release the mount from the windshield button upon impact. Mount 850 includes molded body 852 including a top end 854, bottom end 855, opposing sides 856, 858, and a contoured, raised front surface from which mounting arm 860 extends at an upward angle from a centrally located position midway between the top and bottom ends. Arm 860 terminates in a spherical ball member 862 which may be oversized as described above. A pair of nonparallel, elongated shoulders or receiving members 864, 866 extend outwardly away from one another toward the bottom end 888 in the same manner as for mounting member 340 and define inwardly tapered slide surfaces for receiving a wedge shaped windshield button in the same manner as for embodiment 340. In order to strengthen and stiffen the mounting member 850, a formed, sheet metal insert 868 (FIG. 85) is insert molded within the mounting member 850 as shown in FIG. 84. Insert 868 includes a body portion 870, downwardly extending side flanges 872, 874, and an upstanding central flange 876. dimples or depressions 878 are in various portions of the insert body to provide areas into which the moldable material for mounting member 850 can flow to properly imbed the insert therewithin. An aperture 880 from which flange 876 is bent serves the same purpose. A fastener or screw receiving aperture 882 extends through body 852 and insert 868 at aperture 879 as shown in FIG. 84 to receive a fastener such as a set screw to prevent removal of the mounting member when the mounting member is slidably mounted on a wedge shaped windshield button.

A modified seventh form 850' of the molded vehicle accessory mounting member or channel mount of the present invention is shown in FIGS. 86–89. Mounting member 850' is similar to mount 850 except that mounting arm 860' terminating in a preferably oversized spherical ball pivot member 862' extends at an upward angle from a position on mount body 852' which is adjacent the top end 854' of the mount. In addition, the insert 868' includes an upwardly extending flange 876' which reinforces the mounting arm 860' but extends from the top end of the insert. Further, insert 868' includes depressions or recessed areas 878' in upstanding flange 876' and apertures 879' for proper retention of the insert when molded within the mirror mount. A fastener or screw receiving aperture 852' extends through body 852'.

Figure 29:
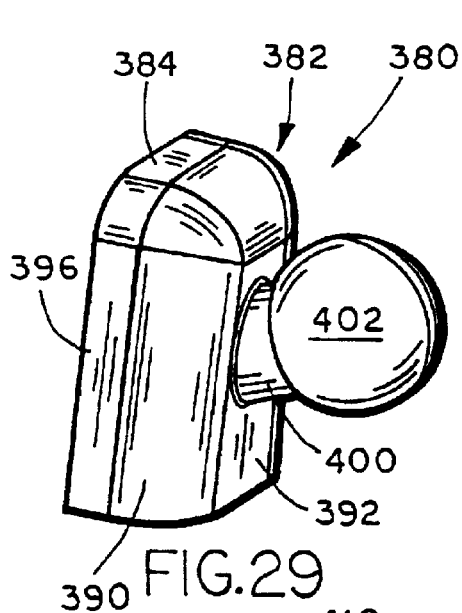
FIG. 29 is a front perspective view of a eighth embodiment of a vehicle accessory mounting member of the present invention.
Figure 29A:
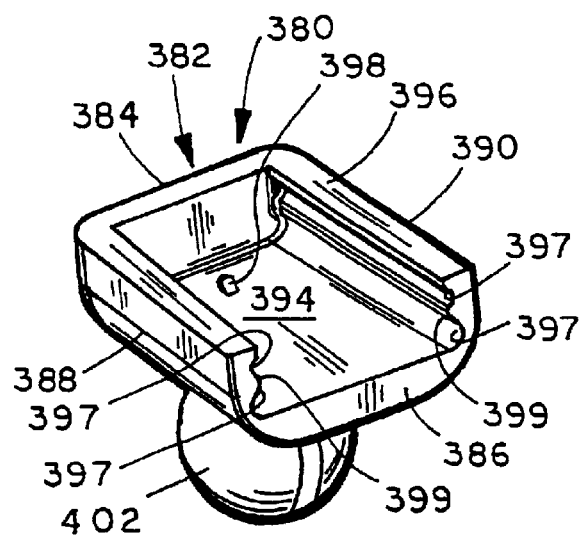
FIG. 29A is a bottom, rear perspective of the mounting member of FIG. 29.

Referring now to FIGS. 29–29H, an eighth embodiment 380 of the vehicle accessory mounting member or channel mount of the present invention is shown. Mounting member 380 includes a mounting body 382 having a top end 384, bottom end 386, opposing sides 388, 390, front surface 392 and generally planar rear surface 394. Rear surface 394 is recessed to define an upstanding, U-shaped peripheral wall 396 which opens adjacent bottom end 386. The internal surfaces of opposing side portions of side walls 396 are formed with a pair of parallel, recessed channels 397 separated by an elongated ridge 399. At the upper end of rear surface 394, adjacent top end 384 is an inclined projection 398 adapted to receive and secure spring member 410 as described below. As with the other embodiments of the accessory mounting member, a mounting arm 400 is formed integrally with body 382 and extends outwardly and upwardly from a centered position on front surface 392 terminating in a spherical ball pivot member 402 which may be oversized or conventionally sized as above.

Figure 29B:
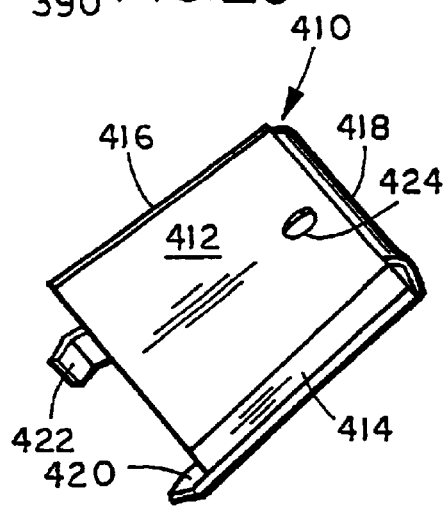
FIG. 29B is a rear perspective view of a spring member adapted for insertion and receipt in the mounting member of FIGS. 29 and 29A.
Figure 29C:
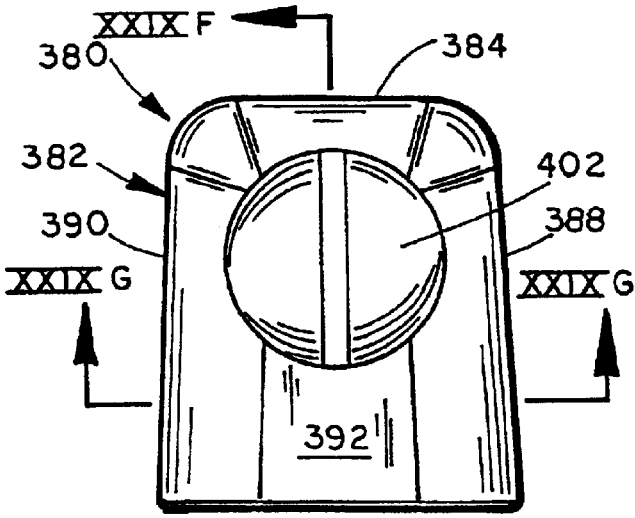
FIG. 29C is a front elevation of the mounting member of FIG. 29 incorporating the spring member of FIG. 29B.

Received within the upstanding wall 396 on rear surface 394 is a one-piece spring member 410 best seen in FIGS. 29B, D, E and I. Spring member 410 is formed from resilient metal such as spring steel and includes a generally planar base 412, a pair of upstanding side flanges 414, 416 adapted to receive a windshield mounting button therebetween and a front or upper flange 418. The configuration of channels 397 and ridge 399 on wall 396 is adapted to correspond to the shape of side flanges 414, 416 which are bent inwardly and upwardly to define slide surfaces 414a, 416a which receive the windshield attachment member. Slide surfaces 414a, 416a are inwardly tapered toward one another and are non-parallel to one another being closer together at the end adjacent front flange 418 than at the opposite end which is adapted to be adjacent bottom end 386 when spring member 410 is mounted in body 382. At the rear end of each of the side flanges 414, 416 in alignment with slide surfaces 414a, 416a is an inwardly extending rear flange 420, 422 which helps to confine the windshield mounting button within the spring member when mounted. In addition, base 412 includes an elongated aperture 424 adapted to be received over projection 398 upon installation of spring member 410 in body 382.

Figure 29D:
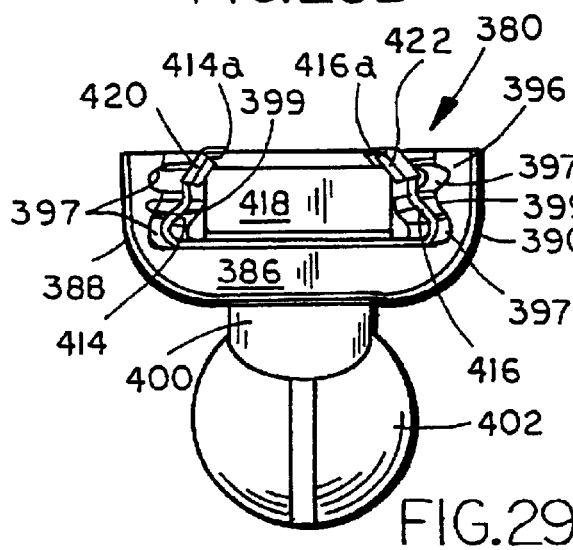
FIG. 29D is a bottom elevation of the mounting member of FIG. 29 including the spring member of 29B.
Figure 29E:
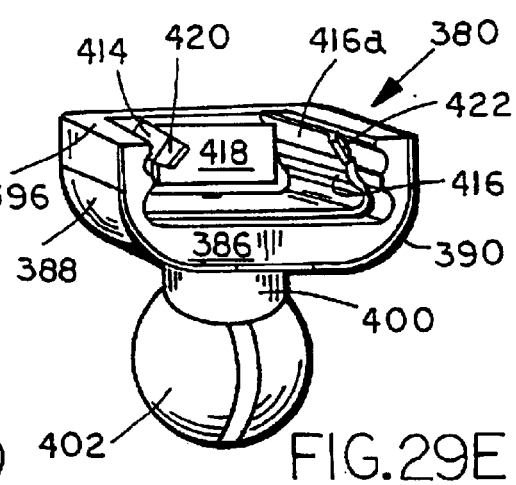
FIG. 29E is a bottom perspective view of the mounting member assembly of FIG. 29D.

Accordingly, when mounted over an attachment member or windshield button B as shown in FIG. 29H, the inclined side surfaces of the attachment member engage slide surfaces 414a, 416a and the rearmost inner edges of rear flanges 420, 422 as the mounting member is slid downwardly over the windshield attachment member. As formed, front flange 418 of spring member 410 is bent upwardly intermediate side flanges 414, 416 as shown in FIGS. 29D, 29E and 29G. However, when the top end of the windshield attachment member or button engages front flange 418 with sufficient force upon sliding insertion, flange 418 is flexed forwardly until it no longer separates side flanges 414, 416 and slide surfaces 414a, 416a resiliently snap inwardly against the inwardly tapered sides of windshield attachment member B as shown in FIG. 29H. In such position, rear flanges 420, 422 confine the button within the spring member and prevent the mounting member and spring member combination from "walking off" the button during use. When slide surfaces 414a, 416a flex inwardly against the sides of the attachment member, an audible click or verification is heard indicating to the installer that installation is complete.

FIG. 90 illustrates a modified ninth form 380' similar to mounting member 380 except that one piece spring member 410' includes a pair of apertures 430 instead of one elongated aperture 424. Mounting body 382' of mounting member 380' is adapted to be molded in one piece from a resinous polymeric material such as acetal, glass and/or mineral filled nylon, filled polypropylene or a similar engineering material with one piece spring member 410' insert molded therewithin such that the molding material flows through apertures 430 to encase the generally planar base 412' of the spring member and retain the spring in position generally as described above for embodiment 380. A windshield button B may then be slidably received within the spring member in the same manner as described above for embodiment 380.

A tenth embodiment 900 of the vehicle accessory mounting member or channel mount of the present invention is shown in FIGS. 91–94. Mounting member 900 includes a body portion 902 preferably molded in one piece from a resinous, polymeric material such as acetal, glass and/or mineral-filled nylon, filled polypropylene or a similar engineering polymer, or formed from sintered metal or the like and includes a top end 904, bottom end 906, opposing sides 908, 910 and a contoured, raised front surface from which mounting arm 912 extends at an upward angle adjacent top end 904. Mounting arm 912 terminates in a spherical ball pivot member 914 which may be oversized if desired as described above. A pair of nonparallel, elongated shoulders or receiving members 916, 918 extend outwardly away from one another toward the bottom end 906 in the same manner as described above for mounting members 240, 340, 850 and 850', and define slide surfaces 920, 922 for receiving a wedge shaped windshield button B in the manner described above. Slide surfaces 920, 922 are tapered inwardly toward one another and further include reduced thickness areas 921, 923 providing frangible portions adapted to fracture upon application of a sufficient force to the mounting member or rearview mirror assembly such that the mounting member will be released from the windshield mounted attachment member or button upon fracture of the shoulders or receiving members 916, 918. Instead of a set screw receiving aperture extending through body 902 for retention of the mounting member on the windshield button, mounting member 900 includes a lever 924 also preferably molded from a resinous plastic material and pivotally mounted within an aperture 926 extending through the central portion of the body 902. Lever 924 includes an engaging flange 928 extending at an acute angle to an operating flange 930 and an enlarged finger engaging portion 932 at the terminal end of flange 930. A pair of parallel, stub axles 934 extend in opposite directions from either side of the lever at the junction of flanges 928, 930 for receipt in pockets formed within aperture 926 to pivotally mount the lever therein as shown in FIG. 93.

In operation, when mount 900 is slidably received over a windshield button via shoulders 916, 918, and the windshield button is fully received within the mirror mount, pivotal lever 924 is pivoted via flange 930 and engaging portion 932 from the position shown in phantom in FIG. 92 to that shown in solid in FIGS. 92 and 93. In such position, engaging flange 928 which has a length slightly greater than the thickness of body 902 at that point engages the outer surface of the windshield button to frictionally engage the button surface and retain the button within flanges 916, 918 and prevent the mirror mount from being slidably removed from the windshield button. In the event the mirror mount receives a sufficient force or impact, the frangible shoulders 916, 918 will fracture allowing release of the mounting member from the windshield button. Lever 924, thus, eliminates the need for a separate retaining screw.

Referring now to FIGS. 30–43A, various embodiments of a windshield mounted attachment member are shown to which the vehicle accessory mounting members and rearview mirror supports described above are assembled for supporting interior rearview mirror assemblies in cantilevered fashion from the interior windshield surface of a vehicle. Each of these attachment members is adapted to provide an increased adhesive securing area for attachment to the windshield surface in order to support the heavier weights of more modern, multi component rearview mirror assemblies. These increased sized attachment members provide larger, wider and more effective support areas which more effectively resist the tensile peeling force applied to the attachment member from the rearview mirror support and mirror assemblies.

As shown in FIGS. 30 and 30A, a first embodiment 450 of the attachment member includes a circular base member 452 through which a plurality of apertures 454 are formed in order to reduce the overall weight of the attachment member. Centered on one side of circular base member 452 is an upstanding circular projection having a diameter less than the diameter of circular base 452. Projection 456 can be secured to base 452 by welding or the like or the entire attachment member can be sintered or formed from powdered metal or die cast from material such as zinc in one piece.

A modified embodiment 450' of attachment member 450 is shown in FIGS. 31 and 31A wherein base member 452' includes a central aperture 455 in addition to apertures 454 as in member 450. A circular projection 456 is centered on and secured to base member 452'.

With reference to FIGS. 32 and 32A, another form 460 of the attachment member is shown including a general keyhole shape having a generally circular base 462 having a rectangular flange projection 464 from its top circumferential portion extending outwardly therefrom. Flange 464 is adapted to extend upwardly when the attachment member is secured to the windshield surface by a suitable adhesive. As in prior embodiments, a circular projection 466 can be welded to the top surface of base 462 or the entire attachment member can be sintered or otherwise formed from metal in one piece.

In FIGS. 33 and 33A, embodiment 470 of the attachment member is similar to embodiment 460 and includes a base 462' having a wider flange 464' formed thereon. Overall, base 464' of member 470 has the shape of a rectangle with one end rounded.

In FIGS. 34 and 34A, embodiment 480 of the attachment member is similar to embodiments 450 and 450' except that circular base member 482 to which circular projection 484 is secured does not include any weight reducing apertures therethrough.

With reference to FIGS. 35–37A, embodiments 490, 500 and 510 of the attachment members each include an enlarged base 492, 502, 512 of an irregular shape to which a circular projecting member 494, 504, 514 is secured on one surface. Specifically, base member 492 has the shape of an elongated, truncated triangle, while base members 502 and 512 have the shape of a triangle with their apexes rounded. In addition, circular projecting member 514 has a diameter smaller than the width of base 512 while projecting members 494 and 504 have a diameter larger than the width of their respective base members.

In FIGS. 38–41A, the attachment members include base members formed in the shape of a T, cross, X or X with an additional cross member. Thus, in embodiment 520, base member 522 is in the shape of a T to which circular projecting member 524 is secured on one surface.

In embodiment 530, base member 532 is in the shape of a cross with circular projecting member 534 secured on one surface thereof.

In embodiment 540, base member 542 is in the shape of a cross with an additional leg member 544 to which circular projecting member 546 is secured on one surface.

In embodiment 550, base member 552 is in the shape of an X to which circular projecting member 554 is secured on one surface.

In embodiment 560, base member 562 is in the shape of a rectangle to which a circular projecting member 564 having a diameter equivalent to the width of the rectangle is secured.

In embodiment 570, in FIGS. 43 and 43A, base member 572 is generally circular but includes a pair of diametrically opposed rectangular flanges 574 extending outwardly therefrom. A circular projection 576 having a diameter less than the diameter of the main portion of base 572 is secured to one side.

In each of the above embodiments 450–570 of the attachment member, in place of the circular projection to which a vehicle accessory mounting member is adapted to be secured, a wedge-shaped, double tapered mounting body such as that shown in FIGS. 44 and 44A may be secured in place of the circular projection. Such wedge-shaped mounting member B is of the type described above in connection with the various embodiments of the vehicle accessory mounting members and has non-parallel sides which are inwardly tapered to retain the mounting members thereon. Similarly, as shown in FIGS. 45 and 45A, a polygonal, preferably hexagonal projection C may also be substituted in place of the circular projections or wedge-shaped double tapered mounting projection B.

Figure 95:
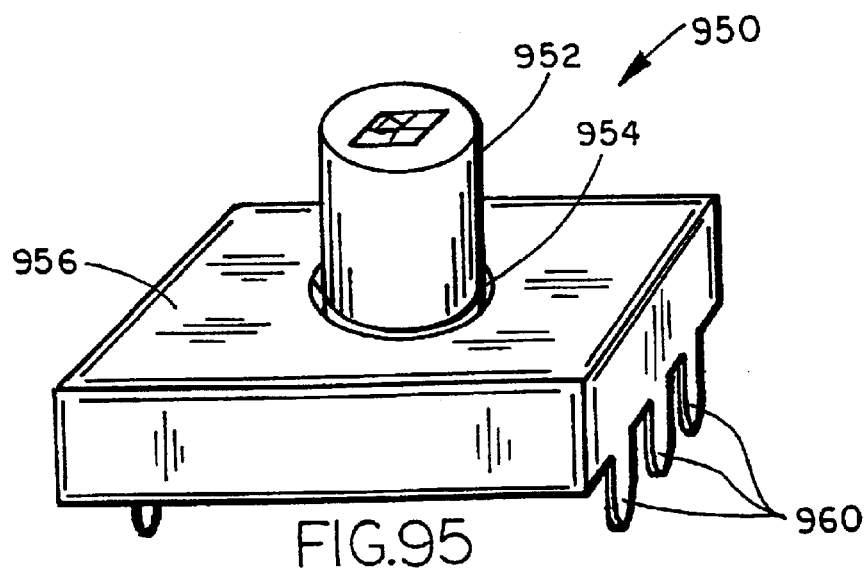
FIG. 95 is a perspective view of an electrical indicator switch useful with the present invention.
Figure 96:
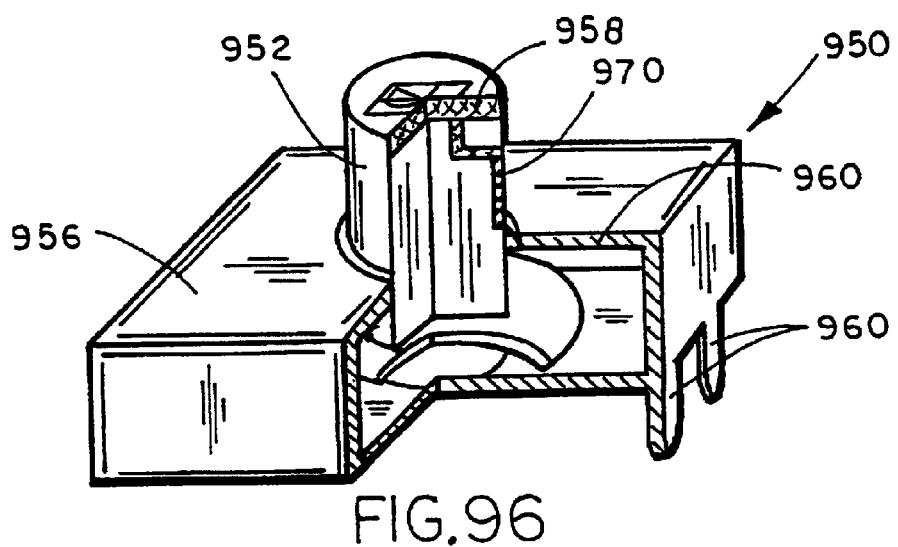
FIG. 96 is a cutaway, perspective view of the switch of FIG. 95 shown with portions cutaway.
Figure 97:
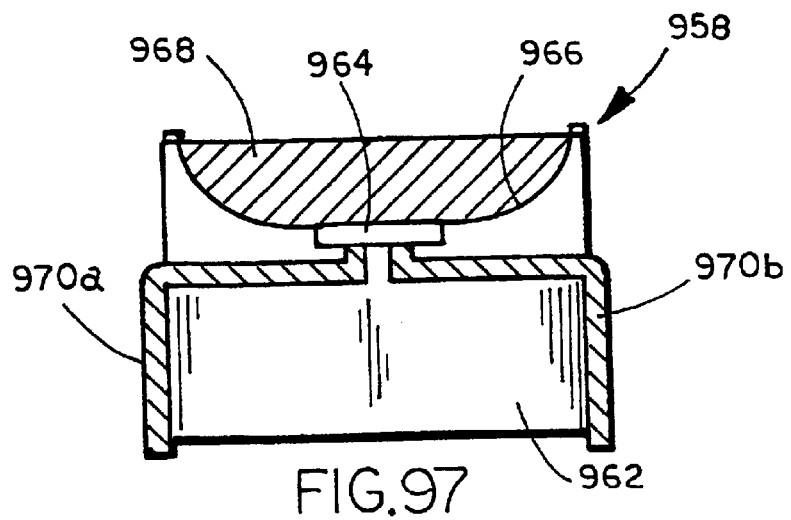
FIG. 97 is a sectional view of a portion of the plunger of the switch of FIGS. 95 and 96.

Referring now to FIGS. 95–97, one form 950 of a suitable electrical switch of the type which may be used in rearview mirror assembly such as that described above at 80 is shown. Switch 950 includes a light emitting diode (LED) integrated into the actuator/plunger of the switch to illuminate indicia and indicate the switch function on the switch actuator or plunger as described below. Switch 950 is of the type known as a circular dome or tactile dome switch with an integrated LED.

As shown in FIGS. 95 and 96, switch 950 includes a slidable plunger 952 received through aperture 954 in a rectangular or square switch housing 956. Plunger 952 includes an LED indicator on its upper end which indicates the function of the switch when mounted in a rearview mirror assembly. Plunger 952 is adapted to be engaged by the finger of an operator to depress or move the switch plunger to operate the switch. Switch plunger 952 is generally cylindrical in shape and is adapted to slide axially in circular aperture 954 into and out of the switch housing 956. Switch housing 956 includes electrical contacts 960 which are connected through appropriate bus bars to the slidable plunger 952 as is explained more fully below.

As shown in FIG. 97, the LED indicator 958 includes a housing 962 adapted to be received on and connect to plunger 952. A suitable LED 964 (such as are disclosed in U.S. application Ser. No. 09/793,002, filed Feb. 26, 2001, entitled VIDEO MIRROR SYSTEM INCORPORATING AN ACCESSORY MODULE, now U.S. Pat. No. 6,690,268, and U.S. Provisional Patent Application Ser. No. 60/315,384, filed Aug. 28, 2001, entitled IMPROVED VEHICULAR LIGHTING SYSTEM, the disclosures of which are hereby incorporated by reference herein in their entireties) is mounted within the center area of a recess 966 in the upper end of housing 962. Transparent polymeric material such as epoxy material or acrylic material is placed over LED 964 in recess 966 to form a solid window having a surface generally flush with the upper end of housing 962. An appropriate icon or other indicia may be formed in or on epoxy 968. Suitable electrical leads 970a, 970b extend outwardly and downwardly along the sides of housing portion 962 for engagement with leads 960 in the housing 956 when the plunger is depressed and operated.

When switch 950 is operated by depressing or moving plunger 952, leads 970 slidably engage electrical contacts 960 to energize LED 964 and backlight any icon or other indicia which is formed or provided in the epoxy backfill 968 within recess 966. Switch 950, therefore, eliminates the need for separate mounting of icon or indicia bearing elements, LEDs and switch members and provides an integral backlit information illuminating electrical switch having long life due to the use of a solid-state LED in a compact switch unit which may be easily mounted in a single operation for use in an electrical assembly such as a rearview mirror.

Accordingly, the present invention provides improved rearview mirror supports, vehicle accessory mounting members integrated with such supports and attachment members/windshield mounting buttons having increased size for adherence to the inside surface of a windshield to support the rearview mirror support and vehicle accessory mounting member as well as the rearview mirror assemblies cantilevered therefrom in proper fashion for increased stability, increased vibration performance and reduced tensile peeling stress.

The embodiments of the invention in which an exclusive property or privilege is claimed are as follows:

1. An interior rearview mirror assembly suitable for use in a vehicle comprising:

a rearview mirror mount formed from polymeric material having a first color, said rearview mirror mount adapted for attachment to one of a windshield portion of the vehicle and a header portion of the vehicle;

a rearview mirror housing, said housing formed from polymeric material having a second color, and a reflective rearview mirror element included in said housing;

a rearview mirror support formed from polymeric material having a third color;

a first pivot element formed from polymeric material having a fourth color;

a second pivot element formed from polymeric material having a fifth color;

said support being pivotally attached to said mirror mount by said first pivot element, said rearview mirror housing being pivotally attached to said support by said second pivot element;

at least one of said first and second pivot elements comprising a ball pivot member, said support having a socket which receives and frictionally engages said ball pivot member, said support including a spring receiving surface and an external spring member mounted on said spring receiving surface for enhanced frictional resistance to movement of said ball pivot member in said socket;

at least one electrical accessory included in said rearview mirror housing, said assembly including electrical conductors for electrically connecting said electrical accessory to the vehicle electrical system, said conductors extending through said first and second pivot elements and said mirror support to said rearview mirror housing;

wherein each of said mirror mount, said mirror support, said rearview mirror housing, said first pivot element, and said second pivot element is formed in its respective color by molding from polymeric material of that color.

2. The rearview minor assembly of claim 1 wherein said first, second, third, fourth, and fifth colors are substantially the same color.

3. The rearview mirror assembly of claim 2 wherein said substantially the same color comprises black.

4. The rearview mirror assembly of claim 1 wherein at least two of said mirror mount, said mirror support, said rearview mirror housing, said first pivot element and said second pivot element are molded from polymeric materials of different colors.

5. The rearview mirror assembly of claim 1 wherein said support has two ends, one of said ends including said socket, the other of said ends comprising a ball pivot member.

6. The rearview mirror assembly of claim 1 wherein said support comprises a hollow sleeve having two open ends, said socket included at one of said ends.

7. The rearview mirror assembly of claim 6 wherein the other of said two ends of said support also includes a socket which receives and frictionally engages a ball pivot member comprising the other of said first and second pivot elements.

8. The rearview mirror assembly of claim 1 wherein said support includes an end surface at one end of said support, said socket being spaced inwardly from said end surface, said external spring member being positioned immediately adjacent said end surface.

9. The rearview mirror assembly of claim 8 wherein said external spring member comprises an annular split ring.

10. The rearview mirror assembly of claim 8 wherein said one end of said support includes a plurality of axially extending slots defining flanges therebetween, said flanges being compressible by said external spring member which is received thereover.

11. The rearview mirror assembly of claim 1 wherein said electrical conductors extend through said rearview mirror support.

12. The rearview mirror assembly of claim 11 wherein each of said first and second pivot elements includes a wire passageway therethrough.

13. The rearview mirror assembly of claim 12 wherein said electrical conductors comprise wiring extending through said wire passageways through said first and second pivot elements.

14. The rearview mirror assembly of claim 13 wherein said mirror mount also includes a wire passageway therein, said wiring also extending through said wire passageway in said mirror mount.

15. The rearview mirror assembly of claim 1 wherein said rearview mirror support includes a cable-way through which said electrical conductors pass.

16. The rearview mirror assembly of claim 15 wherein said cable-way comprises a hollow housing on the exterior of said support.

17. The rearview mirror assembly of claim 16 wherein said cable-way is formed integrally with said support.

18. The rearview mirror assembly of claim 17 wherein said cable-way is formed by molding said cable-way in said support.

19. The rearview mirror assembly of claim 15 wherein said cable-way includes a cover which may be opened to insert said electrical conductors therein and closed over said conductors.

20. The rearview mirror assembly of claim 19 including a fastener for holding said cover in a closed position.

21. The rearview mirror assembly of claim 19 wherein said cable-way comprises a trough extending at least partially along said support, said cover being closeable over said trough to retain said conductors therein.

22. The rearview mirror assembly of claim 1 wherein said rearview mirror mount includes a means on one surface for pivotal attachment to said support, and cooperating receiving members on another surface which engage a windshield mounted attachment member on the inside surface of the windshield of the vehicle on which said assembly is mounted.

23. The rearview mirror assembly of claim 22 wherein said means for pivotal attachment to said support comprise a projection including a ball pivot member forming said first pivot element.

24. The rearview mirror assembly of claim 23 wherein said mirror mount includes a body having an interior surface facing the interior of the vehicle when mounted on the vehicle, said mounting projection extending from said interior surface at a position centered with respect to the position of said receiving members.

25. The rearview mirror assembly of claim 22 wherein said mirror mount further includes a fastener for securing said mirror mount to the windshield mounted attachment member.

26. The rearview mirror assembly of claim 22 wherein said mirror mount further includes a securing lever which is movable between a first release position and a second securing position, said lever adapted to engage the windshield mounted attachment member when moved to said second securing position and said receiving members engage the windshield attachment member to retain the mirror mount on the windshield mounted attachment member.

27. The rearview mirror assembly of claim 26 wherein said mirror mount includes a body having an aperture therethrough in which said securing lever is pivotally mounted, said securing lever including an engaging member and an operating member, said lever being pivotable with said operating member to cause said engaging member to engage against the windshield mounted attachment member when received by said cooperating receiving members.

28. The rearview mirror assembly of claim 27 including a stiffening insert molded within said mirror mount.

29. The rearview mirror assembly of claim 28 wherein said stiffening insert includes a section extending into said mounting member.

30. The rearview mirror assembly of claim 22 wherein said cooperating receiving members are included on a forward facing surface of said mirror mount which faces the windshield when mounted on the vehicle, said receiving members comprising spaced slide surfaces for slidably receiving the windshield mounted attachment member when mounted thereon.

31. The rearview mirror assembly of claim 30 wherein said mirror mount includes a top and a bottom, said slide surfaces being inclined inwardly toward one another and being spaced closer to one another adjacent said top of said mounting member to engage and retain a wedge shaped, double-tapered windshield mounted attachment member.

32. The rearview mirror assembly of claim 31 wherein said slide surfaces comprise resilient spring flanges for releasably engaging the windshield mounted attachment member.

33. The rearview mirror assembly of claim 32 wherein said resilient spring flanges are included on a spring member mounted on said forward facing surface.

34. The rearview mirror assembly of claim 33 wherein said spring member is slidably received between spaced side walls on said forward facing surface.

35. The rearview mirror assembly of claim 33 wherein said spring member is insert molded on said forward facing surface of said mirror mount.

36. The rearview mirror assembly of claim 32 wherein said resilient spring flanges are formed separately and secured to said mirror mount.

37. The rearview mirror assembly of claim 32 wherein said resilient spring flanges are formed by a pair of spaced spring bands, each spring band extending around said mirror mount and having ends extending beyond said forward facing surface for engagement with the windshield attachment member.

38. The rearview mirror assembly of claim 31 wherein said slide surfaces are formed on spaced shoulders having frangible portions adapted to release upon application of sufficient force such as during an impact to allow release of said mirror mount from the windshield mounted attachment member.

39. The rearview mirror assembly of claim 22 wherein said mirror mount further includes a vibration reducing dampening element on said another surface adjacent said receiving members for engaging the windshield mounted attachment member when said mirror mount is secured thereto.

40. The rearview mirror assembly of claim 39 wherein said vibration reducing dampening element comprises a resilient cushion.

41. The rearview mirror assembly of claim 40 wherein said cushion comprises a pad formed from at least one of foam material and rubber.

42. The rearview mirror assembly of claim 1 wherein said electrical conductors also extend through said mirror mount.

43. The rearview mirror assembly of claim 1 wherein said electrical accessory comprises an electro-optic mirror element.

44. The rearview mirror assembly of claim 1 wherein said electrical accessory comprises an electrical circuit board.

45. The rearview mirror assembly of claim 1 wherein said electrical accessory comprises at least one microphone.

46. An interior rearview mirror assembly suitable for use in a vehicle comprising:
- a rearview mirror mount formed from polymeric material having a first color, said rearview mirror mount adapted for attachment to one of a windshield portion of the vehicle and a header portion of the vehicle;
- a rearview mirror housing, said housing formed from polymeric material having a second color, and a reflective rearview mirror element included in said housing;
- a rearview mirror support formed from polymeric material having a third color;
- a first pivot element formed from polymeric material having a fourth color;
- a second pivot element formed from polymeric material having a fifth color;
- said support being pivotally attached to said mirror mount by said first pivot element, said rearview mirror housing being pivotally attached to said support by said second pivot element;
- at least one of said first and second pivot elements comprising a ball pivot member, said support having a socket which receives and frictionally engages said ball pivot member, said support comprising a hollow sleeve having two open ends, said socket included at one of said ends, the other of said two ends of said support also including a socket which receives and frictionally engages a ball pivot member comprising the other of said first and second pivot elements, said support including a spring receiving surface, and an external spring member mounted on said spring receiving surface for enhanced frictional resistance to movement of a ball pivot member in one of said sockets;
- at least one electrical accessory included in said rearview mirror housing, said assembly including electrical conductors for electrically connecting said electrical accessory to the vehicle electrical system, said conductors extending through said first and second pivot elements and said mirror support to said rearview mirror housing;
- wherein each of said mirror mount, said mirror support, said rearview mirror housing, said first pivot element, and said second pivot element is formed in its respective color by molding from polymeric material of that color.

47. The rearview mirror assembly of claim 46 wherein said support includes an end surface at each end, each of said sockets being spaced inwardly from said end surface in its respective end of said support, said assembly including a pair of external spring members, each of said external spring members being positioned immediately adjacent said end surface at its respective support end.

48. The rearview mirror assembly of claim 47 wherein said external spring members each comprise an annular split ring.

49. The rearview mirror assembly of claim 47 wherein each end of said support includes a plurality of axially extending slots defining flanges therebetween, said flanges at each end of said support being compressible by said external spring member which is received thereover.

50. The rearview mirror assembly of claim 46 further including a vibration dampening member positioned within said hollow sleeve intermediate said sockets.

51. The rearview mirror assembly of claim 46 further including a stiffening insert molded within said hollow sleeve.

52. The rearview mirror assembly of claim 46 wherein said hollow sleeve is rectilinear.

53. The rearview mirror assembly of claim 46 herein said two ends of said support extend at an angle to one another.

54. The rearview mirror assembly of claim 46 wherein said hollow sleeve includes an interior space therewithin, said assembly including another electrical accessory which is mounted within said interior space of said hollow sleeve.

55. An interior rearview mirror assembly suitable for use in a vehicle comprising:
- a rearview mirror mount formed from polymeric material having a first color, said rearview mirror mount adapted for attachment to one of a windshield portion of the vehicle and a header portion of the vehicle;
- a rearview mirror housing, said housing formed from polymeric material having a second color, and a reflective rearview mirror element included in said housing;
- a rearview mirror support formed from polymeric material having a third color;
- a first pivot element formed from polymeric material having a fourth color;
- a second pivot element formed from polymeric material having a fifth color;
- said support being pivotally attached to said mirror mount by said first pivot element, said rearview mirror housing being pivotally attached to said support by said second pivot element;
- at least one electrical accessory included in said rearview mirror housing, said assembly including electrical conductors for electrically connecting said electrical accessory to the vehicle electrical system, said conductors extending through said first and second pivot elements and said mirror support to said rearview mirror housing;
- said electrical conductors comprising electrical bus bars molded within said rearview mirror support;
- wherein each of said mirror mount, said mirror support, said rearview mirror housing, said first pivot element, and said second pivot element is formed in its respective color by molding from polymeric material of that color.

56. An interior rearview mirror assembly suitable for use in a vehicle comprising:
- a rearview mirror mount formed from polymeric material having a first color, said rearview mirror mount adapted for attachment to one of a windshield portion of the vehicle and a header portion of the vehicle;
- a rearview mirror housing, said housing formed from polymeric material having a second color, and a reflective rearview mirror element included in said housing;
- a rearview mirror support formed from polymeric material having a third color;
- a first pivot element formed from polymeric material having a fourth color;
- a second pivot element formed from polymeric material having a fifth color;
- said support being pivotally attached to said mirror mount by said first pivot element, said rearview mirror housing being pivotally attached to said support by said second pivot element;
- at least one of said first and second pivot elements comprising a ball pivot member, said support having a socket which receives and frictionally engages said ball pivot member, said support comprising a hollow sleeve having two open ends, said socket included at one of said ends, the other of said two ends of said support also including a socket which receives and frictionally engages a ball pivot member comprising the other of said first and second pivot elements, said support including a spring receiving surface and an external spring member mounted on said spring receiving surface for enhanced frictional resistance to movement of a ball pivot member in one of said sockets;

said first, second, third, fourth and fifth colors being substantially the same color;

each of said mirror mount, said mirror support, said rearview mirror housing, said first pivot element, and said second pivot element being formed in said substantially the same color by molding from polymeric material of that color.

57. The rearview mirror assembly of claim 56 wherein said support includes an end surface at each end, each of said sockets being spaced inwardly from said end surface in its respective end of said support, said assembly including a pair of external spring members, each of said external spring members being positioned immediately adjacent said end surface at its respective support end.

58. The rearview mirror assembly of claim 57 wherein said external spring members each comprise an annular split ring.

59. The rearview mirror assembly of claim 57 wherein each end of said support includes a plurality of axially extending slots defining flanges therebetween, said flanges at each end of said support being compressible by said external spring member which is received thereover.

60. The rearview mirror assembly of claim 56 further including a vibration dampening member positioned within said hollow sleeve intermediate said sockets.

61. The rearview mirror assembly of claim 56 further including a stiffening insert molded within said hollow sleeve.

62. The rearview mirror assembly of claim 56 wherein said rearview mirror support includes an interior space therewithin, said assembly including an electrical accessory which is mounted within said interior space of said support.

63. An interior rearview mirror assembly suitable for use in a vehicle comprising:

a rearview mirror mount formed from polymeric material having a first color, said rearview mirror mount adapted for attachment to one of a windshield portion and a header portion of the vehicle;

a rearview mirror housing, said housing formed from polymeric material having a second color, and a reflective rearview mirror element included in said housing;

a rearview mirror support formed from polymeric material having a third color;

a first pivot element formed from polymeric material having a fourth color;

a second pivot element formed from polymeric material having a fifth color;

said support being pivotally attached to said mirror mount by said first pivot element, said rearview mirror housing being pivotally attached to said support by said second pivot element;

said first, second, third, fourth, and fifth colors being substantially the same color;

each of said mirror mount, said mirror support, said rearview mirror housing, said first pivot element, and said second pivot element being formed in said substantially the same color by molding from polymeric material of that color;

said assembly including electrical conductors extending through said rearview mirror support, said electrical conductors comprising electrical bus bars molded within said rearview mirror support.

64. An interior rearview mirror assembly suitable for use in a vehicle comprising:

a rearview mirror mount formed from polymeric material having a first color, said rearview mirror mount adapted for attachment to one of a windshield portion and a header portion of the vehicle;

a rearview mirror housing, said housing formed from polymeric material having a second color, and a reflective rearview mirror element included in said housing;

a rearview mirror support formed from polymeric material having a third color;

a first pivot element formed from polymeric material having a fourth color;

a second pivot element formed from polymeric material having a fifth color;

said support being pivotally attached to said mirror mount by said first pivot element, said rearview mirror housing being pivotally attached to said support by said second pivot element;

at least one of said first and second pivot elements comprises a ball pivot member, said support having a socket which receives and frictionally engages said ball pivot member, said support including a spring receiving surface and an external spring member mounted on said spring receiving surface for enhanced frictional resistance to movement of said ball pivot member in said socket;

said first, second, third, fourth, and fifth colors being substantially the same color;

each of said mirror mount, said mirror support, said rearview mirror housing, said first pivot element, and said second pivot element being formed in said substantially the same color by molding from polymeric material of that color.

65. The rearview mirror assembly of claim 64 including electrical conductors extending through said rearview mirror support.

66. The rearview mirror assembly of claim 65 wherein each of said first and second pivot elements includes a wire passageway therethrough.

67. The rearview mirror assembly of claim 66 wherein said electrical conductors comprise wiring extending through said wire passageways through said first and second pivot elements.

68. The rearview mirror assembly of claim 67 wherein said mirror mount also includes a wire passageway therein, said wiring also extending through said wire passageway in said mirror mount.

69. The rearview mirror assembly of claim 64 wherein said support includes an end surface at one end of said support, said socket being spaced inwardly from said end surface, said external spring member being positioned immediately adjacent said end surface.

70. The rearview mirror assembly of claim 64 wherein said assembly includes electrical conductors extending through said rearview mirror support; said rearview mirror support including a cable-way through which said electrical conductors pass.

71. The rearview mirror assembly of claim 64 wherein said rearview mirror mount includes a means on one surface for pivotal attachment to said support, and cooperating receiving members on another surface which engage a windshield mounted attachment member on the inside surface of the windshield of the vehicle on which said assembly is mounted.

72. The rearview mirror assembly of claim 71 wherein said means for pivotal attachment to said support comprise a projection including a ball pivot member forming said first pivot element.

73. The rearview mirror assembly of claim 72 wherein said mirror mount includes a body having an interior surface facing the interior of the vehicle when mounted on the vehicle, said mounting projection extending from said interior surface at a position centered with respect to the position of said receiving members.

74. The rearview mirror assembly of claim 71 wherein said mirror mount further includes a fastener for securing said mirror mount to the windshield mounted attachment member.

75. The rearview mirror assembly of claim 71 wherein said mirror mount further includes a securing lever which is movable between a first release position and a second securing position, said lever adapted to engage the windshield mounted attachment member when moved to said second securing position and said receiving members engage the windshield attachment member to retain the mirror mount on the windshield mounted attachment member.

76. The mirror assembly of claim 75 including a stiffening insert molded within said mirror mount.

77. The rearview mirror assembly of claim 71 wherein said cooperating receiving members are included on a forward facing surface of said mirror mount which faces the windshield when mounted on the vehicle, said receiving members comprising spaced slide surfaces for slidably receiving the windshield mounted attachment member when mounted thereon.

78. The rearview mirror assembly of claim 77 wherein said mirror mount includes a top and a bottom, said slide surfaces being inclined inwardly toward one another and being spaced closer to one another adjacent said top of said mounting member to engage and retain a wedge shaped, double-tapered windshield mounted attachment member.

79. The rearview mirror assembly of claim 78 wherein said slide surfaces comprise resilient spring flanges for releasably engaging the windshield mounted attachment member.

80. The rearview mirror assembly of claim 71 wherein said mirror mount further includes a vibration reducing dampening element on said another surface adjacent said receiving members for engaging the windshield mounted attachment member when said mirror mount is secured thereto.

81. An interior rearview mirror assembly suitable for use in a vehicle comprising:
- a rearview mirror mount formed from polymeric material having a first color, said rearview mirror mount adapted for attachment to one of a windshield portion and a header portion of the vehicle;
- a rearview mirror housing, said housing formed from polymeric material having a second color, and a reflective rearview mirror element included in said housing;
- a rearview mirror support formed from polymeric material having a third color;
- a first pivot element formed from polymeric material having a fourth color;
- a second pivot element formed from polymeric material having a fifth color;
- said support being pivotally attached to said mirror mount by said first pivot element, said rearview mirror housing being pivotally attached to said support by said second pivot element;
- at least one of said first and second pivot elements comprising a ball pivot member, said support having a socket which receives and frictionally engages said ball pivot member, said support comprising a hollow sleeve having two open ends, said socket included at one of said ends, the other of said two ends of said support also includes a socket which receives and frictionally engages a ball pivot member comprising the other of said first and second pivot elements, said support including a spring receiving surface and an external spring member mounted on said spring receiving surface for enhanced frictional resistance to movement of a ball pivot member in one of said sockets;
- at least two of said mirror mount, said mirror support, said rearview mirror housing, said first pivot element and said second pivot element being molded from polymeric materials of different colors;
- each of said mirror mount, said mirror support, said rearview mirror housing, said first pivot element, and said second pivot element being formed in its respective color by molding from polymeric material of that color.

82. The rearview mirror assembly of claim 81 wherein said support includes an end surface at each end, each of said sockets being spaced inwardly from said end surface in its respective end of said support, said assembly including a pair of external spring members, each of said external spring members being positioned immediately adjacent said end surface at its respective support end.

83. The rearview mirror assembly of claim 82 wherein said external spring members each comprise an annular split ring.

84. The rearview mirror assembly of claim 82 wherein each end of said support includes a plurality of axially extending slots defining flanges therebetween, said flanges at each end of said support being compressible by said external spring member which is received thereover.

85. The rearview mirror assembly of claim 81 further including a vibration dampening member positioned within said hollow sleeve intermediate said sockets.

86. The rearview mirror assembly of claim 81 further including a stiffening insert molded within said hollow sleeve.

87. An interior rearview mirror assembly suitable for use in a vehicle comprising:
- a rearview mirror mount formed from polymeric material having a first color, said rearview mirror mount adapted for attachment to one of a windshield portion and a header portion of the vehicle;
- a rearview mirror housing, said housing formed from polymeric material having a second color, and a reflective rearview mirror element included in said housing;
- a rearview mirror support formed from polymeric material having a third color;
- a first pivot element formed from polymeric material having a fourth color;
- a second pivot element formed from polymeric material having a fifth color;
- said support being pivotally attached to said mirror mount by said first pivot element, said rearview mirror housing being pivotally attached to said support by said second pivot element;

at least two of said mirror mount, said mirror support, said rearview mirror housing, said first pivot element and said second pivot element being molded from polymeric materials of different colors;

each of said mirror mount, said mirror support, said rearview mirror housing, said first pivot element, and said second pivot element being formed in its respective color by molding from polymeric material of that color;

said assembly including electrical conductors extending through said rearview mirror support, said electrical conductors comprising electrical bus bars molded within said rearview mirror support.

88. An interior rearview mirror assembly suitable for use in a vehicle comprising:

a rearview mirror mount formed from polymeric material having a first color, said rearview mirror mount adapted for attachment to one of a windshield portion and a header portion of the vehicle;

a rearview mirror housing, said housing formed from polymeric material having a second color, and a reflective rearview mirror element included in said housing;

a rearview mirror support formed from polymeric material having a third color;

a first pivot element formed from polymeric material having a fourth color;

a second pivot element formed from polymeric material having a fifth color;

said support being pivotally attached to said mirror mount by said first pivot element, said rearview mirror housing being pivotally attached to said support by said second pivot element;

at least one of said first and second pivot elements comprising a ball pivot member, said support having a socket which receives and frictionally engages said ball pivot member, said support including a spring receiving surface and an external spring member mounted on said spring receiving surface for enhanced frictional resistance to movement of said ball pivot member in said socket;

at least two of said mirror mount, said mirror support, said rearview mirror housing, said first pivot element and said second pivot element being molded from polymeric materials of different colors;

each of said mirror mount, said mirror support, said rearview mirror housing, said first pivot element, and said second pivot element being formed in its respective color by molding from polymeric material of that color.

89. The rearview mirror assembly of claim 88 including electrical conductors extending through said rearview mirror support.

90. The rearview mirror assembly of claim 89 wherein each of said first and second pivot elements includes a wire passageway therethrough.

91. The rearview mirror assembly of claim 90 wherein said electrical conductors comprise wiring extending through said wire passageways through said first and second pivot elements.

92. The rearview mirror assembly of claim 90 wherein said mirror mount also includes a wire passageway therein, said wiring also extending through said wire passageway in said mirror mount.

93. The rearview mirror assembly of claim 88 wherein said rearview mirror support includes an interior space therewithin, said assembly including an electrical accessory which is mounted within said interior space of said support.

94. The rearview mirror assembly of claim 88 wherein said support includes an end surface at one end of said support, said socket being spaced inwardly from said end surface, said external spring member being positioned immediately adjacent said end surface.

95. The rearview mirror assembly of claim 88 wherein said assembly includes electrical conductors extending through said rearview mirror support; said rearview mirror support including a cable-way through which said electrical conductors pass.

96. The rearview mirror assembly of claim 88 wherein said rearview mirror mount includes means on one surface for pivotal attachment to said support, and cooperating receiving members on another surface which engage a windshield mounted attachment member on the inside surface of the windshield of the vehicle on which said assembly is mounted.

97. The rearview mirror assembly of claim 96 wherein said means for pivotal attachment to said support comprise a projection including a ball pivot member forming said first pivot element.

98. The rearview mirror assembly of claim 97 wherein said mirror mount includes a body having an interior surface facing the interior of the vehicle when mounted on the vehicle, said mounting projection extending from said interior surface at a position centered with respect to the position of said receiving members.

99. The rearview mirror assembly of claim 98 wherein said mirror mount further includes a fastener for securing said mirror mount to the windshield mounted attachment member.

100. The rearview mirror assembly of claim 98 wherein said mirror mount further includes a securing lever which is movable between a first release position and a second securing position, said lever adapted to engage the windshield mounted attachment member when moved to said second securing position and said receiving members engage the windshield attachment member to retain the mirror mount on the windshield mounted attachment member.

101. The rearview mirror assembly of claim 100 including a stiffening insert molded within said mirror mount.

102. The rearview mirror assembly of claim 96 wherein said cooperating receiving members are included on a forward facing surface of said mirror mount which faces the windshield when mounted on the vehicle, said receiving members comprising spaced slide surfaces for slidably receiving the windshield mounted attachment member when mounted thereon.

103. The rearview mirror assembly of claim 102 wherein said mirror mount includes a top and a bottom, said slide surfaces being inclined inwardly toward one another and being spaced closer to one another adjacent said top of said mounting member to engage and retain a wedge shaped, double-tapered windshield mounted attachment member.

104. The rearview mirror assembly of claim 103 wherein said slide surfaces comprise resilient spring flanges for releasably engaging the windshield mounted attachment member.

105. The rearview mirror assembly of claim 96 wherein said mirror mount further includes a vibration reducing dampening element on said another surface adjacent said receiving members for engaging the windshield mounted attachment member when said mirror mount is secured thereto.

* * * * *

UNITED STATES PATENT AND TRADEMARK OFFICE
CERTIFICATE OF CORRECTION

PATENT NO. : 6,877,709 B2 Page 1 of 1
APPLICATION NO. : 10/032401
DATED : April 12, 2005
INVENTOR(S) : Philip A. March et al.

It is certified that error appears in the above-identified patent and that said Letters Patent is hereby corrected as shown below:

Column 13,
Lines 26, 27 and 30, insert -- ; -- after "2000".
Line 36, "disclosure" should be -- disclosures --.

Column 34,
Line 34, "minor" should be -- mirror --.

Column 38,
Line 3, "herein" should be -- wherein --.

Column 41,
Line 29, insert -- rearview -- before "mirror".

Signed and Sealed this

Twenty-seventh Day of June, 2006

JON W. DUDAS
*Director of the United States Patent and Trademark Office*